(12) United States Patent  (10) Patent No.: US 7,493,369 B2
Horvitz et al.  (45) Date of Patent: Feb. 17, 2009

(54) COMPOSABLE PRESENCE AND AVAILABILITY SERVICES

(75) Inventors: Eric J. Horvitz, Kirkland, WA (US); Paul B. Koch, Seattle, WA (US); Johnson T. Apacible, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 10/881,429

(22) Filed: Jun. 30, 2004

(65) Prior Publication Data

US 2004/0249776 A1  Dec. 9, 2004

Related U.S. Application Data

(63) Continuation-in-part of application No. 10/609,972, filed on Jun. 30, 2003, now Pat. No. 7,233,933, and a continuation-in-part of application No. 09/894,087, filed on Jun. 28, 2001, now abandoned.

(51) Int. Cl.
*G06F 15/16* (2006.01)
(52) U.S. Cl. ............................ 709/207; 709/204; 706/4; 706/10; 706/11; 706/12; 715/207
(58) Field of Classification Search ................. 709/207; 706/10, 11, 4
See application file for complete search history.

(56) References Cited

U.S. PATENT DOCUMENTS 5,493,692 A  2/1996 Theimer et al.
5,544,321 A  8/1996 Theimer et al.
5,555,376 A  9/1996 Theimer et al.

(Continued)

OTHER PUBLICATIONS

Czerwinski, Cutrell and Horvitz, "Instant Messaging: Effects of Relevance and Time," In S. Turner, P. Turner (Eds), People and Computers XIV; Proceedisngs of HCI 2000, Sunderland, UK, Sep. 2000, vol. 2, British Computer Society, p. 71-76.*

(Continued)

*Primary Examiner*—Yves Dalencourt
(74) *Attorney, Agent, or Firm*—Amin, Turocy & Calvin, LLP

(57) ABSTRACT

The present invention relates to a system and methodology to facilitate collaboration and communications between entities such as between parties to a communication, automated applications and components, and/or combinations thereof. The systems and methods of the present invention include a service that supports collaboration and communication by learning predictive models that provide forecasts of one or more aspects of a user's presence and availability. Presence forecasts include a user's current location or future locations at different levels of location precision and of the availability to users of different devices or applications. Availability assessments include inferences about the cost of interrupting a user in different ways and a user's current or future access to one or more communication channels that may be supported by one or more devices with appropriate capabilities. The predictive models are constructed via statistical learning methods from data collected by considering user activity and proximity from multiple devices, in addition to analysis of the content of users' calendars, the time of day, and day of week, for example. Beyond ambient data collection, users can provide input via batch input tools or via intermittent probes of their situation and context. Various applications are provided that employ the presence and availability information supplied by the models in order to facilitate collaboration and communications between entities.

38 Claims, 49 Drawing Sheets

U.S. PATENT DOCUMENTS

| | | | |
|---|---|---|---|
| 5,603,054 | A | 2/1997 | Theimer et al. |
| 5,611,050 | A | 3/1997 | Theimer et al. |
| 5,659,593 | A | 8/1997 | Tzvieli et al. |
| 5,812,865 | A | 9/1998 | Theimer et al. |
| 5,930,828 | A | 7/1999 | Jensen et al. |
| 6,021,403 | A | 2/2000 | Horvitz et al. |
| 6,246,376 | B1 * | 6/2001 | Bork et al. ............ 343/760 |
| 6,262,730 | B1 * | 7/2001 | Horvitz et al. ............ 715/707 |
| 6,466,232 | B1 | 10/2002 | Newell et al. |
| 6,499,021 | B1 * | 12/2002 | Abu-Hakima ............ 706/10 |
| 6,513,046 | B1 | 1/2003 | Abbott, III et al. |
| 6,549,915 | B2 | 4/2003 | Abbott, III et al. |
| 6,747,675 | B1 | 6/2004 | Abbott, III et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,978,258 | B2 | 12/2005 | Chithambaram |
| 7,305,437 | B2 | 12/2007 | Horvitz et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2001/0045949 | A1 * | 11/2001 | Chithambaram et al. .... 345/418 |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott et al. |
| 2002/0054174 | A1 | 5/2002 | Abbott et al. |
| 2002/0076025 | A1 | 6/2002 | Liversidge et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0159750 | A1 * | 10/2002 | Jasinschi et al. ............ 386/46 |
| 2003/0046401 | A1 | 3/2003 | Abbott et al. |
| 2003/0154476 | A1 | 8/2003 | Abbott, III et al. |
| 2004/0117443 | A1 | 6/2004 | Barsness |
| 2005/0034078 | A1 | 2/2005 | Abbott et al. |

OTHER PUBLICATIONS

Eric Horvitz, et al., Coordinate: Probabilistic Forecasting of Presence and Availability, Proceedings of the 18th Conference on Uncertainty and Artificial Intelligence, Jul. 2002, pp. 224-233, Morgan Kaufmann Publishers, Edmonton, Alberta.

Metcalfe, Bob."After 35 Years of Technology Crusades, Bob Metcalfe Rides Off Into the Sunset." (Sep. 2000) Infoworld, web pp. 1-4, at http://www.infoworld.com/AppDev/1161/IWD000925opmetcalfe_cto.

Horvitz, et al. "Attention sensitive Alerting" (Jul. 1999) Proceedings of UAI '99 Conference on Uncertainty and AI, Morgan Kaufman: San Francisco, pp. 305-313.

Horvitz. "Principles of Mixed Initative User Interfaces" Artificial Intelligence Journal, 126: 159-196, Elsevier Science (Feb. 2001).

9800787, Jan. 8, 1998, Datalink Systems Corporation.

* cited by examiner

COMPOSABLE PRESENCE AND AVAILABILITY SERVICES

REFERENCE TO RELATED APPLICATIONS

This application is a continuation in part of U.S. patent application Ser. No. 10/609,972 filed on Jun. 30, 2003, which is now U.S. Pat. No. 7,233,933, entitled METHODS AND ARCHITECTURE FOR CROSS-DEVICE ACTIVITY MONITORING, REASONING, AND VISUALIZATION FOR PROVIDING STATUS AND FORECASTS OF A USERS' PRESENCE AND AVAILABILITY, the entirety of which is incorporated herein by reference. This application is also a continuation in part of U.S. patent application Ser. No. 09/894,087 filed on Jun. 28, 2001, which is now abandoned, entitled METHODS FOR AND APPLICATIONS OF LEARNING AND INFERRING THE PERIODS OF TIME UNTIL PEOPLE ARE AVAILABLE OR UNAVAILABLE FOR DIFFERENT FORMS OF COMMUNICATION, COLLABORATION, AND INFORMATION ACCESS, the entirety of which is incorporated herein by reference.

TECHNICAL FIELD

The present invention relates generally to computer systems, and more particularly to a system and method that supports collaboration and communication by collecting data from one or more devices, and that learns predictive models that provide forecasts of users' presence and availability. More specifically, the methods and architecture provide information to people or communication agents about the current or future status of a user's presence and availability, wherein the information can be provided at multiple locations and/or relating to the user's access to one or more devices or channels of communication.

BACKGROUND OF THE INVENTION

Although electronic calendar systems for storing reminders and creating contacts with others about meeting times and locations provide one type of opportunity for people to collaborate, a great deal of collaboration is based on opportunistic communication arranged under uncertainty. This informal coordination between people often depends on peoples' shared understandings about current and future locations and activities of friends and associates. Even with employment of online group calendar systems, for example, people are often challenged with trying to understand how available others are for a respective collaboration such as knowing what the current status of someone they are trying to contact. However, knowing a person's current status does not necessarily facilitate future or desired collaboration between communicating parties.

In just one example, conventional e-mail systems provide an example of communications and message coordination difficulties between parties. In one possible scenario, an employee may be situated in a foreign country or remote region, wherein voice communications via telephone or other medium is not always possible. The employee may have indicated beforehand to fellow workers, supervisors and loved ones that e-mail provides the most reliable manner in which the employee will actually receive and be able to subsequently respond to a message. Although, conventional e-mail systems can indicate that a transmitted message has been received and opened by the employee, and can include a predetermined/pre-configured reply such as "On vacation for one week", or "Out of the office this afternoon"—assuming the employee remembers to configure the e-mail system, there is currently no automatically generated indication provided to the message sender when and/or how long it will be before the employee may actually respond. Thus, if a home crisis situation were to occur or an important business message needed to get through, message senders can only guess when the employee will potentially receive the message and hope that the message is received and responded to in a timely manner. Similar difficulties arise when attempting to schedule meetings with parties that are difficult to determine whether or not they can attend a meeting set for some time in the future.

As is common in everyday situations, messages are transmitted with varying degrees of urgency, importance, and priority. Often, key meetings need to be arranged at a moments notice in order to address important business or personal issues. Consequently, one or more messages are directed to one or more parties to indicate the urgency of the meeting. Also, messages are often communicated over multiple communications modalities in order to attempt to reach potential parties. For example, a business manager may send e-mails to key parties and follow the e-mail with phone calls, pages or faxes to the parties, wherein voice mails are typically left for non-answering parties. Unfortunately, the manager is often unsure whether non-responding parties have received the messages and is often unable to determine with any degree of confidence when all parties may be available to meet. Therefore, even though modern communications systems have enabled messages to be rapidly transmitted anywhere in the world over a plurality of mediums, there is a need for a system and methodology to provide improved coordination, communication, and collaboration between parties and to mitigate uncertainty associated with when and/or how long it will be before a message recipient receives a particular message.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that support collaboration and communication by learning predictive models that provide forecasts of users' presence and availability. In one aspect, a set of configuration tools and schemas are provided that allows users to configure a set of channels for defining database and analysis of a user's presence and availability. Various methods allow users or administrators to flexibly define locations, devices, and, more generally channels that represent important conduits for information and communication to coalesce while allowing the forecasting service to be generalized.

In one aspect of the present invention, a coordinate schema is provided to facilitate communications between parties. The schema can be employed to define or describe settings of users, devices, locations, parameters and so forth that relate presence and availability forecasting between users. The schema is also employed for linking locations, channels and devices that determine and/or provide presence information. Various user interfaces are provided that supply configuration or dynamic data to the schema. In general, the schema includes tables and fields relating to such aspects user information, computer information, location information, device information, device availability, binding information, channel information (e.g., instant messenger, email, cell phone) wireless signals and access information, GPS location information, actual locations as indicated by permanently installed devices, computer activity information (e.g., application on top or at focus), meeting information, calendar information and so forth.

Data can be collected in accordance with the forecasting service by considering user activity and proximity from multiple devices, in addition to analysis of content of users' calendars, time of day, and day of week, for example, wherein the data is employed to construct one or more learning models to forecast users' presence and availability. The present invention facilitates real-time, peri-real time, and/or long-term planning for messaging and collaboration by providing probabilistic predictions about current and future states of users to authorized persons and/or automated applications (e.g., states such as time until someone will arrive or leave a location, will be at a location for at least time t, time will have access to a device, time will review e-mail, time will finish a conversation in progress, time will attend a meeting, and so forth). Predictions received by such persons or applications can then be employed to facilitate more efficient and timely communications between parties since parties or systems attempting to communicate can be given forecasts or clues to possible periods or devices in which to reach the user based upon trained observances of past user activities.

In one aspect of the present invention, a Bayesian inference system is provided that supports availability forecasting machinery and systems within the framework of various automated applications. To build general predictive models, data is collected or aggregated regarding a user's activity and location from multiple sources, including data about a user's activities on multiple devices in addition to data from a calendar, for example. Also, forecasts can be generalized with respect to presence and absence to other events of interest to support collaboration and communication. For example, it may be desirable for users or applications to understand if and when a user will access messages waiting in their inbox, or to identify a suitable future time to interrupt the user with a notification.

Other aspects include forecasting when a user will have easy access to computing systems of communication devices with particular capabilities. For example, automated systems or other users may desire to know when a user will likely have easy access to a computer with full video conferencing abilities. Furthermore, the present invention provides sophisticated models for handling multiple contextual clues such as details captured in calendar information, rather than simply conditioning on the existence of a meeting.

The forecasted presence and availability information described above can be utilized by many applications. For example, the present invention can be employed to facilitate meetings, coordination and communications between message senders and receivers, wherein general prediction models are constructed from past presence, actions, and calendar of a user to forecast the timing of a user's availability status for receiving messages, receiving communications and/or participating in meetings. Such inferences can be utilized to report or display the user's status to colleagues globally and/or selectively (depending on the colleague's relationship with the user), and can be employed in a variety of applications such as automated meeting or interactive communications schedulers or re-schedulers, smart caching systems and communication relay systems.

Other applications of the invention are feasible, including finer grained inferences other than the notion of availability. For example, the present invention can employ similar methods to reason about the amount of time until a user will be available for a particular kind of interaction or communications, based on patterns of availability and context. For example, the expected time until a user, who is currently traveling in automobile will be available for a voice and/or videoconference can be determined by learning statistics and building models which can infer this particular kind of availability. In another example, it can be determined when a user will be available to be interrupted with a particular class of alert or notification, based on patterns of availability, and inferences about the workload and associated cost of an interruption.

In another aspect of the present invention, the predictive component on availability is utilized to estimate when a user will likely be in a setting where he/she can or will review messages deemed as urgent and received by a user's system are answered with an adaptive out-of-office message, such as when the message will likely be unseen for some amount of time and/or the message is at least of some urgency, and/or is from one or more people of particular importance to the user. Such selective messages can be populated with dynamically computed availability status, centering for example, on a forecast of how long it will be until the user will likely review a message such as an e-mail, or be available to review the message, or be in a particular situation (e.g., "back in the office"). Other aspects can include determining the time until a user will review different kinds of information, based on review histories, and the time until the user will be in one or more types of settings, each associated with one or more types of feasible communications. Such information can be transmitted to a message sender regarding the user's ability or likelihood to engage in communications, or respond within a given timeframe.

The present invention can employ the information regarding the user's likelihood of return or current availability in other systems and processes. This may include voice mail systems, calendaring systems, scheduling systems, automated maintenance systems, automated agents, and user tracking systems in order to provide useful information feedback to message senders and/or systems regarding the likelihood of establishing contact and making informed decisions based upon the user's expected presence and availability.

In another aspect of the present invention, systems and methods are provided that build and use models of a user's attentional focus and workload as part of harnessing the role of interruptions on users. These methods can reason about a user's workload from observed events and, more specifically, infer the cost of interruption to users associated with different kinds of alerting and communications. Such models of interruption fuse together information from multiple sensory channels, including desktop events, analysis of calendar information, visual pose, and ambient acoustical analyses, for example.

Models can be constructed to infer a user's state of interruptability from multiple event sources, and, that can provide a well-characterized expected cost of interruption. This can include coupling of models of attention with event systems that provide streams of events, including desktop activity and sensory observations. Also, the present invention can infer an expected cost of interruption, given a probability distribution over attention and a utility assessment that encodes preferences about the costs of interruption in different situations in addition to the learning of models of attention and interruptablity from data. A learning paradigm is processed along with a set of tools (e.g., interruption workbench), wherein learned models are reviewed, and experiments provided that probe the classification accuracy of the models. A "model ablation" study is also considered, removing from consideration perceptual sensing, and including the discriminatory power of events representing interactions with a client computing system and calendar information, for example.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIGS. 4-47 illustrate exemplary user interfaces and models for configuring presence locations, channels, and devices and providing presence information in accordance with an aspect of the present invention.

DETAILED DESCRIPTION OF THE INVENTION

Figure 1:
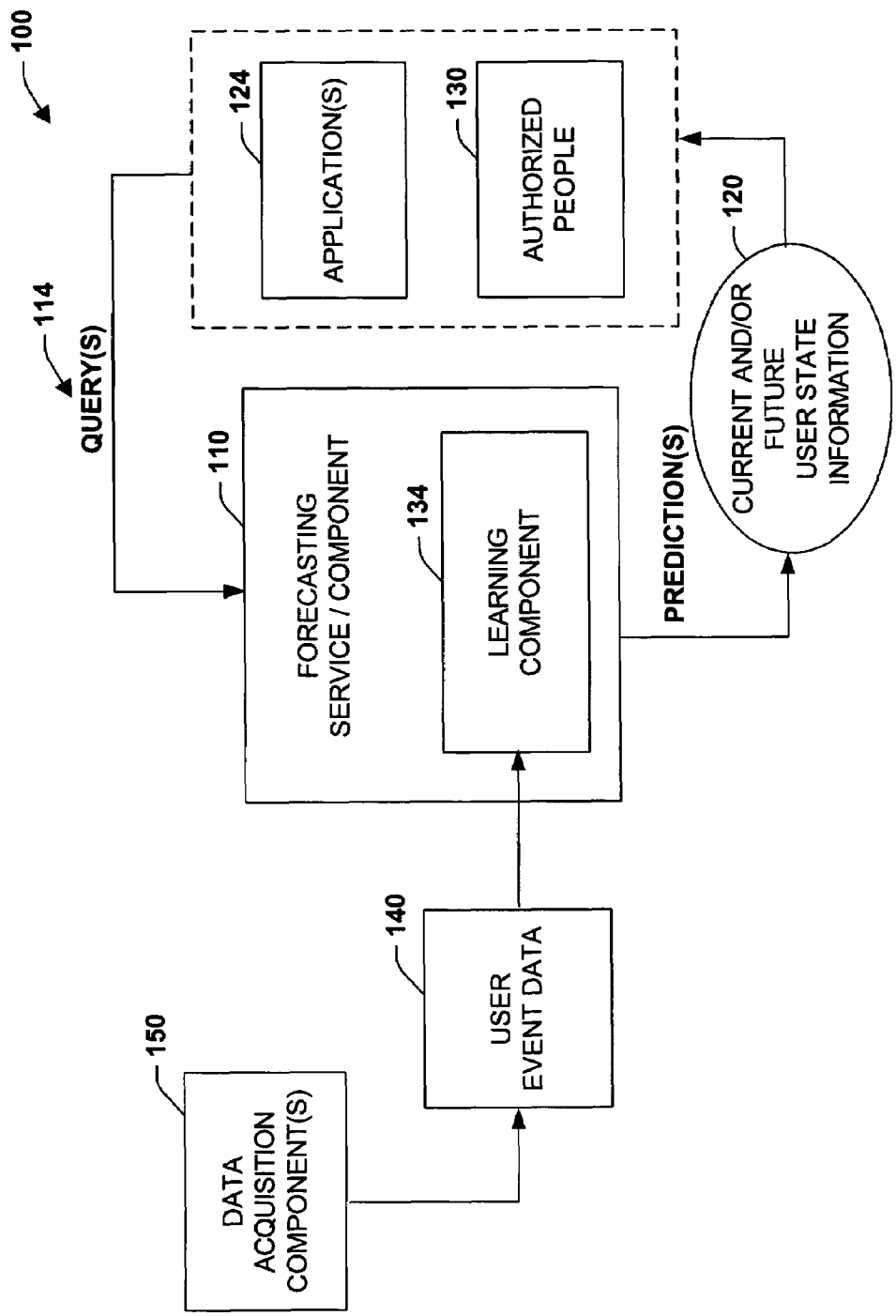
FIG. 1 is a schematic block diagram of a forecasting system in accordance with an aspect of the present invention.

The present invention relates to a system and methodology to facilitate collaboration and communications between entities such as between automated applications, parties to a communication and/or combinations thereof. The systems and methods of the present invention include a service (e.g., web service, automated application) that supports collaboration and communication by learning predictive models that provide forecasts of one or more users' presence and availability. Also, various user interfaces and schemas are provided to allow users to configure various components of the system and provide status relating to the user's availability and presence. The predictive models are constructed from data collected by considering user activity and proximity from multiple devices, in addition to analysis of the content of users' calendars, the time of day, and day of week, for example. Various applications are provided that employ the presence and availability information supplied by the models in order to facilitate collaboration and communications between entities.

Some example applications can include automated meeting or interactive communications schedulers or re-schedulers, smart caching systems, communication systems, audio systems, calendaring systems, scheduling systems, notification systems, messaging systems, automated maintenance systems, automated agents, video systems, digital assistants, and user tracking systems, for example, in order to provide useful information to message senders and/or systems regarding the likelihood of establishing contact and making informed decisions based upon the user's expected presence and availability.

As used in this application, the terms "component," "service," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 illustrates presence and availability forecasting in accordance with an aspect of the present invention. A forecasting service 110 (or forecasting component) receives one or more queries 114 regarding an identified user's (or users) presence or availability and generates one or more predictions relating to current and/or future states 120 of the identified user or users. The query 114 and returned states 120 are generated and received by one or more automated applications and/or authorized people 130, however, it is to be appreciated that the state information 120 can be generated without receiving the query 114 (e.g., a scheduling system that automatically sends manpower availability reports to managers at a predetermined interval). In general, the query 114 is originated by the applications, the authorized people 130, or other entities in order to obtain answers regarding the presence, availability, location, communications capability, device availability and so forth of the identified user or users. It is noted however, that complementary information may also be queried and answered respectively such as instead of presence information, the forecasting service 110 can provide how long a person is expected to be absent, or instead of availability information, how long a person may be unavailable, for example.

The query 114 may be directed to the forecasting service 110 to determine a plurality of different user states 120 such as for example:

The time until the user will arrive at or leave a location;
The time until the user will be at a location for at least time t;
The time until the user will have easy access to a device (e.g., full desktop system);
The time until the user will review e-mail or other message;
The time until the user will finish a conversation in progress;
Likelihood user will attend a meeting;
Expected cost of interruption over time; and including substantially any time, location, device, and/or communication-based prediction or answer.

In order to generate the state information 120, the forecasting service 110 employs a learning component 134 that can include one or more learning models for reasoning about the user states 120. These models for predicting users' presence, activities, and component usage can employ a variety of statistical models for learning from data and real-time inference, including models relying on time-series methods, such as ARMA and ARIMA approaches as is well understood in the forecasting literature, and links to richer dependency models, as described in P. Dagum, P., A. Galper, E. Horvitz, A. Seiver, Uncertain reasoning and forecasting, International Journal of Forecasting 11(1):73-87, March 1995—ftp://ftp.research.microsoft.com/pub/ejh/ijf.pdf, and graphical probabilistic models, including Bayesian networks and temporal variants, including dynamic Bayesian networks and continuous time Bayesian networks. Continuous time Bayesian networks (CTBNs) describe structured stochastic processes with finitely many states that evolve over continuous time. A CTBN is a directed (possibly cyclic) dependency graph over a set of variables, each of which represents a finite state, continuous time Markov process whose transition model is a function of its parents and are described in more detail below with respect to FIGS. 2-16. For further details on CTBN's, See "Learning Continuous Time Bayesian Networks" *Proceedings of the Nineteenth International Conference on Uncertainty in Artificial Intelligence* (pp. 451-458), Uri Nodelman, Christian R. Shelton, and Daphne Koller (2003). Simpler models can also be employed, including naïve Bayesian classifiers, Support Vector Machines (SVMs), and Hidden Markov Models, for example.

Although elaborate reasoning models can be employed in accordance with the present invention, it is to be appreciated that other approaches can also utilized. For example, rather than a more thorough probabilistic approach, deterministic assumptions can also be employed (e.g., no desktop activity for X amount of time may imply by rule that user is not at work). Thus, in addition to reasoning under uncertainty as is described in more detail below, logical decisions can also be made regarding the status, location, context, focus, and so forth of users and/or associated devices.

The learning component 134 can be trained from a user event data store 140 that collects or aggregates data from a plurality of different data sources associated with one or more users. Such sources can include various data acquisition components 150 that record or log user event data (e.g., cell phone, accelerometer, acoustical activity recorded by microphone, Global Positioning System (GPS), electronic calendar, vision monitoring equipment, desktop activity and so forth). Before proceeding with a more detailed discussion of the presence and availability forecasting of the present invention, it is noted that the forecasting service 110 can be implemented in substantially any manner that supports predictions and query processing. For example, the forecasting service 110 could be implemented as a server, a server farm, within client application(s), or more generalized to include a web service(s) or other automated application(s) that provide answers to automated systems 124 and/or authorized people 130.

It is noted that the present invention can determine and share specific types of situations and their properties per a contacting agent or user's interest in the current status and in forecasts of presences and availabilities. These distinctions can include:

(1) locations, (e.g., user will return to their office within x minutes, user, currently sensed in office, will leave their office within x minutes, will be at location x within t minutes, etc.), (2) interruptability (e.g., deterministic costs for different settings or for different kinds of interruptions in different settings, or a probability distribution over the different potential costs of interrupting a user in different ways in different settings, either via consideration of general levels of interruptability or via specific costs assigned to situations and interruptions, or the overall expected cost of interruption under uncertainty, computed from a probability distribution over costs or interruptability states, e.g., computing that the expected cost of taking a phone call is $5.00, reviewing an alert on desktop, $1.50, etc.), (3) availability of communication channels (user will have cell phone available, office phone available, pager available, desktop system with large display that is networked, desktop system with MS NetMeeting software available), (4) other situations (e.g., user's conversation in office will likely end in x minutes.)

Communications channels can be reasoned about directly or can be derived by linking channels with location. For example, links between channels and locations can be determined at set up time (or derived over time via monitoring) that the office contains the following channels: hardwired telephone, full-desktop systems with large display running with the following software applications: MS Office, MS NetMeeting, etc.). Such information about channels linked to locations can be stored in location and device schema, for example.

Relating to data models or schema, the present invention also provides methods (including easy-to-use user interfaces) for adding devices and locations to consideration of the system, making it easy for users to set up Coordinate services as described in more detail below with respect to FIG. 2. When a device is added, a user describes the device type, capturing channel information, etc., and location, e.g., this machine is at my office desk, versus this machine is a mobile laptop with a wireless access or this cell phone is always with me at these hours, etc. When a location is added, all devices that are available are associated with the location. Rich XML-based schema or data models can be provided for capturing device and location information. Device schema, location schema, and other schema provide rich templates for capturing properties of locations and devices. As can be appreciated, user interface and methods can be provided that interact with the schema and methods of the present invention for adding and removing devices and locations (and other monitored information, if desired).

It is further noted that the systems and methods of the present invention can also consider and process location information, gleaned from 802.11 signals and interfaces as one example. For example, a map of a corporate campus can be provided that maps current assess points being seen (APs) with building location to indicate the user's location. At home, the system determines a home wireless is available and thus, the system determines when the user is home. Also, GPS signals can be processed for areas outside of wireless access.

Figure 2:
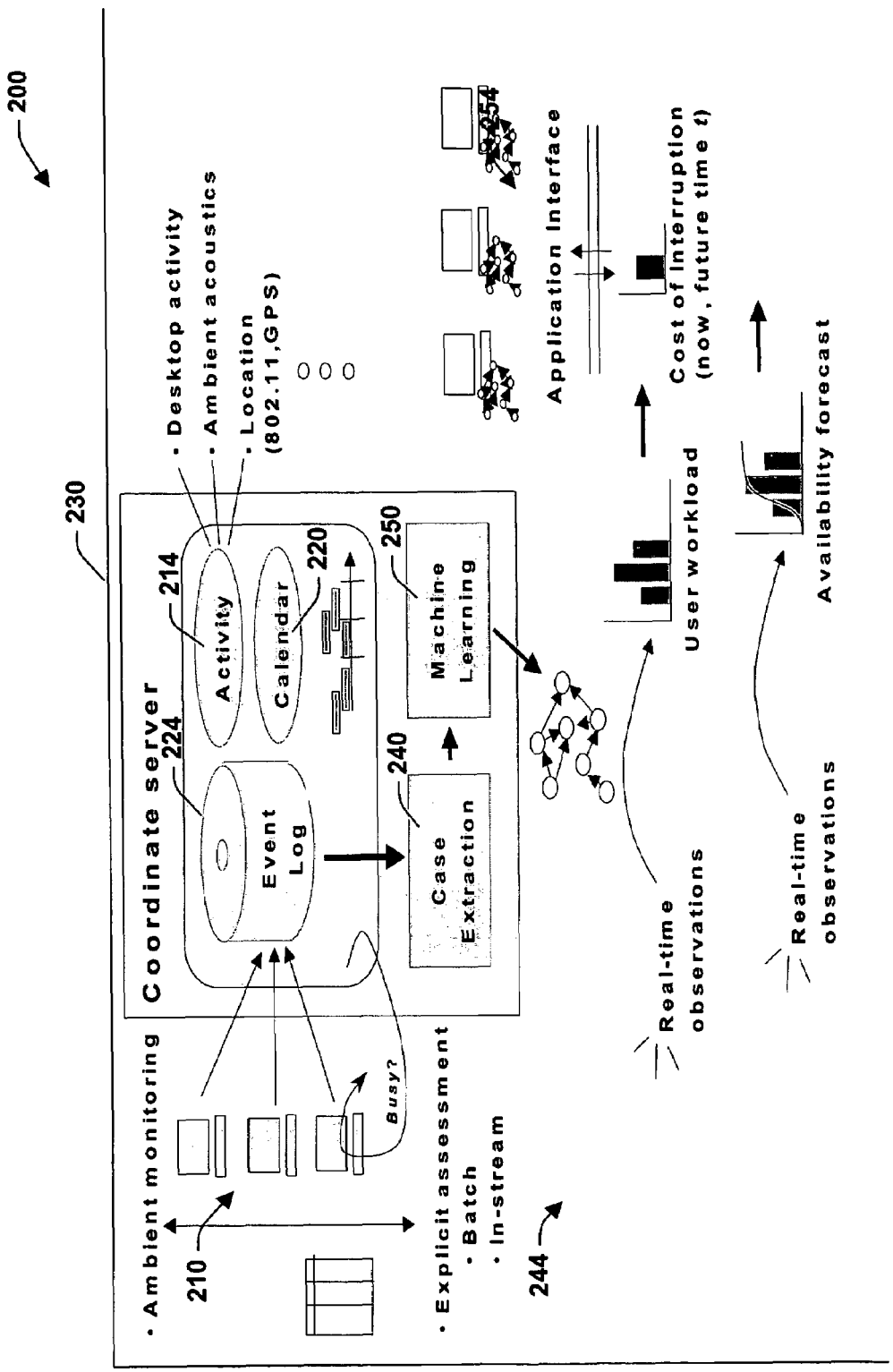
FIG. 2 is a schematic diagram of a Coordinate system in accordance with an aspect of the present invention.

Referring now to FIG. 2, a system 200 illustrates a Coordinate system 200 (also referred to as Coordinate 200) in accordance with an aspect of the present invention. The system 200 can include components that allow the system to be configured to gather data and perform inferences about the availability of different communication channels, presence at different locations, and overall availability associated with a current cost of interruption. Configuration tools (described below) allow the system to collect data from users in real time at 210 and to perform inference about the current and future availability of communication channels, location of the user, and workload or "cost of interruption" of users. The system 210 monitors ambient data as well as provides assessment tools that can capture user tags on data. It can acquire information from users, in one shot assessment settings (e.g., users fill out forms such as how busy they are in different appointments drawn from their calendars), or by performing in-stream, assessment via experience sampling (e.g., probing users for their states or context at different times, such as asking users how busy they currently are at random times within intervals determined by user preferences).

In one aspect, the Coordinate system 200 can be built as a server-based service written in C# or other language and built on top of a .NET development environment (or any commercially available development environment). The Coordinate system 200 includes a central database, networking facilities, device provisioning interfaces and controls, and Bayesian machine learning tools, for example. The system 200 can serve as a facility for use by automated proxies that provide information to collaboration and communication services for users rather than to be queried directly by users. However, a query interface as described below enables people or systems to directly query the forecasting or availability service provided by the Coordinate system 200.

The Coordinate system 200 is generally composed of four core components, however more or less than four components may be employed. A data-acquisition component 210 (or components) executes on multiple computers, components, or devices that a user is likely to employ. This component 210 detects computer usage activity 214, calendar information 220, time information, video, acoustical, position information from 802.11 wireless signal strength and/or GPS data when these channels are available (can also include input from substantially any electronic source). The data-acquisition component 210 includes a signal-processing layer that enables users to configure and define parameters of audio and video sources utilized to define user(s) presence. This information can be cached locally and sent to a Coordinate data-coalescence component 224 (also referred to as Event Log or Event database) running on a central Coordinate server 230.

In general, multiple dimensions of a user's activities across multiple devices, and appointment status, as encoded in a calendar, are stored in a relational database. Start and stop times of interactions of different interactions and appointment status are encoded as distinct dimensions in a database. Static and dynamically constructed predictive models can be gleaned by making queries for information across these multiple dimensions of the database. Queries can be created dynamically, based on the current situation (e.g., the time of day and day of week and current transition status of a user for key transitions), and the predictive goal associated with a desired forecast (e.g., time until a communication channel will become available if it is not currently available).

Several procedures can be employed to build predictive models, including time series models such as those employing autoregression analysis, and other standard time series methods as commonly known, including such techniques as ARIMA models (e.g., See P. Dagum, P., A. Galper, E. Horvitz, A. Seiver, Uncertain reasoning and forecasting, International Journal of Forecasting 11(1):73-87, March 1995 (http://research.microsoft.com/~horvitz/FORECAST.HTM) for a review of alternate methods. Other methods include dynamic Bayesian networks and Continuous Time Bayesian Networks, two example forms of temporal Bayesian-network representation and reasoning methodology.

In one approach to reasoning with information from such a presence database, the present invention can learn Bayesian networks dynamically by acquiring a set of appropriate matching cases for a situation from the database, via appropriate querying of the database, and then employing a statistical analysis of the cases (e.g., employing a Bayesian-network learning procedure that employs model structure search to compose the best predictive model conditioned on the cases), and then using this model, in conjunction with a specific query at hand to make target inferences. In such a real-time learning approach, rather than attempting to build a large static predictive model for all possible queries, the method focuses analysis by constructing a set of cases 240 from the event database 224 that is consistent with a query at hand. This approach allows custom-tailoring of the formulation and discretization of variables representing specific temporal relationships among such landmarks as transitions between periods of absence and presence and appointment start and end times, as defined by the query. These cases 240 are fed to a learning and inference subsystem 250, which constructs a Bayesian network that is tailored for a target prediction. The Bayesian network is used to build a cumulative distribution over events of interest. In one aspect, the present invention employs a learning tool to perform structure search over a space of dependency models, guided by a Bayesian model score to identify graphical models with the greatest ability to predict the data. As noted above, substantially any type of learning system or process may be employed in accordance with the present invention. For example, one learning process that can be employed was developed by Chickering et al. in a publicly available paper on the Internet or other sources entitled "A Bayesian Approach to Learning Bayesian Networks with Local Structure" (MSR-TR-97-07, August 1997).

The Coordinate system 200 logs periods of presence and absence in the event log 224. Events are typically annotated by the source devices 210, whereby devices are defined by respective capabilities and locations. For example, a user can specify that certain devices have full-video conferencing abilities. The tagging of events by specific devices, indexed by capabilities allows the system 200 to forecast a probability distribution over the time until the user will have access to different kinds of devices without making a special plan. When these devices are assigned to fixed locations, such forecasts can be used to forecast a user's location. Coordinate's event system can monitor histories of a user's interaction with computing systems, including applications that are running on a system, applications that are now in focus or that have just gone out of focus. As an example, the system can identify when a user is checking email or reviewing a notification. Thus, moving beyond presence and absence, Coordinate 200 supports such forecasts as the time until a user will likely review email (or other communication), given how much time has passed since he or she last reviewed email. The system 200 also can consider the time until a user will engage an application or cease using the application. Thus, the system 200 can be queried when a user will likely access his or her email inbox given the time they last accessed their inbox. As the system 200 also detects conversations, other aspects include predicting when a current conversation is likely to end.

The system provides forecasts $p(t_e|E, \xi)$, where $t_e$ is the time until an event of interest occurs, and evidence E includes proximal activity context, the time of day, day of week, and multiple attributes representing the nature of active calendar items under consideration. The proximal activity context represents one or more salient recent transitions among landmark states, based on the query. Such conditioning captures a modeling assumption that times until future states are strongly dependent on the timing of the most recent key landmarks. For predictions about the time until a user who has been absent will return to their office, or return to their office and remain for at least some time t, the proximal activity context is the period of time since the user transitioned from present to absent. For the forecasts about how long it will be before a user who is present will leave their office, or, more specifically, will be away for at least some time t, the proximal activity context is taken as the time since the user transitioned from absent to present.

Figure 3:
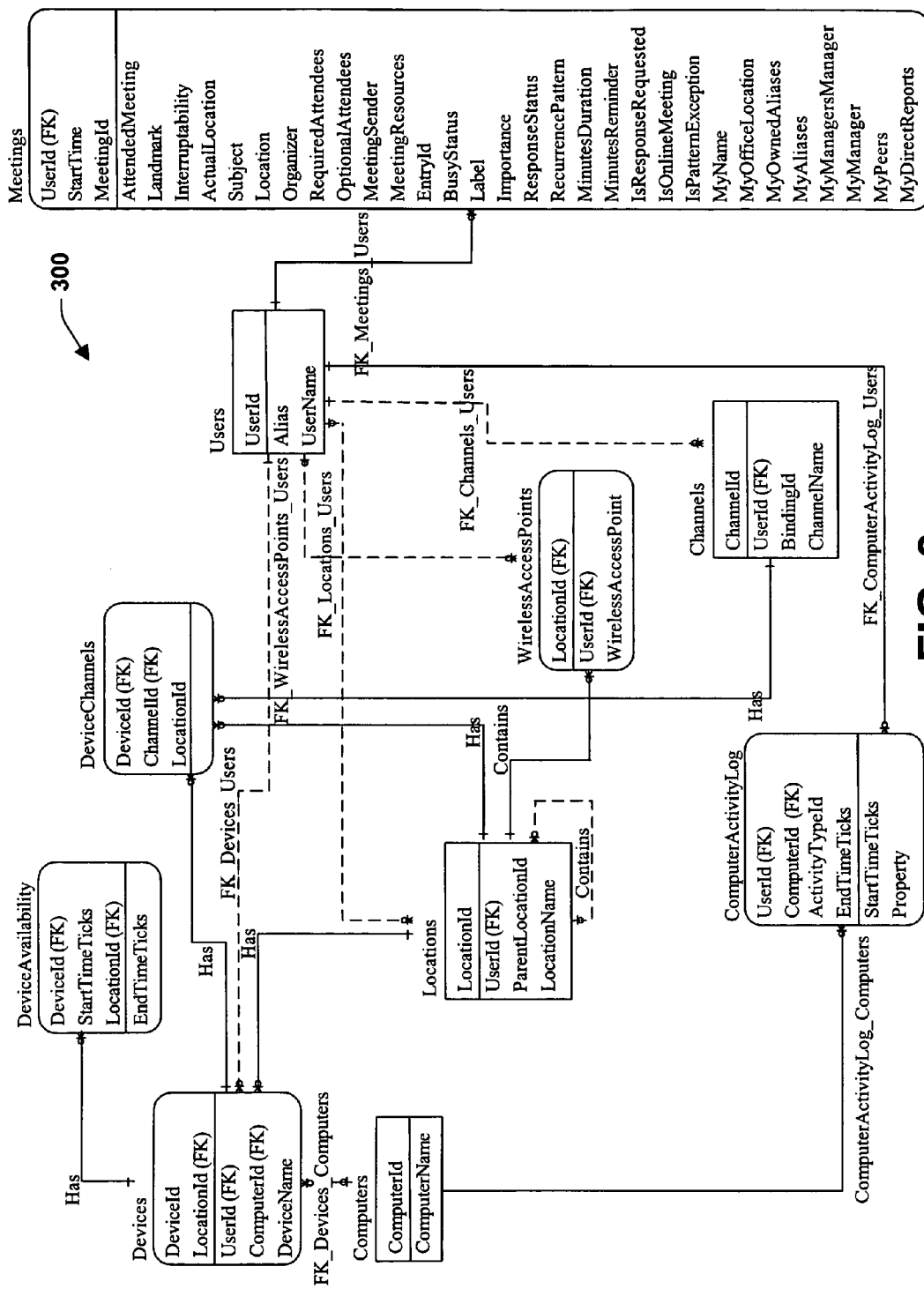
FIG. 3 illustrates an exemplary schema for locations, channels, and devices in accordance with an aspect of the present invention.

Before proceeding with a discussion of FIG. 3, it is noted that one or more graphical user interfaces can be provided in accordance with the present invention. It is further noted that the respective interfaces depicted can be provided in various other different settings and context. As an example, the applications and/or models discussed herein can be associated with a desktop development tool, mail application, calendar application, and/or web browser although other type applications can be utilized. These applications can be associated with a Graphical User Interface (GUI), wherein the GUI provides a display having one or more display objects (not shown) including such aspects as configurable icons, buttons, sliders, input boxes, selection options, menus, tabs and so forth having multiple configurable dimensions, shapes, colors, text, data and sounds to facilitate operations with the applications and/or models. In addition, the GUI can also include a plurality of other inputs or controls for adjusting and configuring one or more aspects of the present invention and as will be described in more detail below. This can include receiving user commands from a mouse, keyboard, speech input, web site, remote web service, pattern recognizer, face recognizer, and/or other device such as a camera or video input to affect or modify operations of the GUI.

Turning to FIG. 3, a coordinate schema 300 is illustrated in accordance with an aspect of the present invention. The schema 300 is employed to define or describe settings of users, devices, locations, parameters and so forth for relating the presence and availability forecasting described above. The schema 300 is also employed for linking locations, channels and devices that determine and/or provide presence information. Various user interfaces are described in more detail below that supply configuration or dynamic data to the schema 300. In general, the schema 300 includes tables and fields relating to such aspects user information, computer information, location information, device information, device availability, binding information, channel information (e.g., instant messenger, email, cell phone) wireless locations and access information, computer activity information (e.g., application on top or at focus), meeting information, calendar information and so forth.

The schema 300 can cooperate with various interfaces that facilitate communications in accordance with the present invention. These can include methods to allow for querying about time until use of device or availability of a channel, methods to allow for querying about user presence: current and expected time of availability, for example, methods to query for a user's cost of interruption (COI) and methods to query for a user's current available channels among other methods.

The following description provides more details on an exemplary data schema 300 in accordance with the present invention for defining key attributes used in data collection, machine learning, automated reasoning, and display or use of the inferences.

| | | Schema | | |
|---|---|---|---|---|
| Table | Users | PRIMARY KEY (UserId) | | |
| | UserId | int | 4 | identity |
| | Alias | varchar | 256 | |
| | INDEX(Alias) - unique | | | |
| Table | Computers | PRIMARY KEY (ComputerId) | | |
| | ComputerId | int | 4 | identity |
| | ComputerName | varchar | 256 | |
| | INDEX(ComputerName) - unique | | | |
| Table | Locations | PRIMARY KEY (LocationId) | | |
| | LocationId | int | 4 | identity |
| | UserId | int | 4 | foreign key, NULL |
| | ParentLocationId | int | 4 | foreign key (self), NULL |
| | LocationName | varchar | 256 | |
| | INDEX(UserId, ParentLocationId, LocationName) - unique | | | |
| Table | Devices | PRIMARY KEY (DeviceId) | | |
| | DeviceId | int | 4 | identity |
| | UserId | int | 4 | foreign key |
| | ComputerId | int | 4 | foreign key, NULL |
| | LocationId | int | 4 | foreign key, NULL |
| | DeviceName | varchar | 256 | |
| | INDEX(UserId, ComputerId, DeviceName) - unique | | | |
| Table | DeviceAvailability | PRIMARY KEY (DeviceId, StartTimeTicks) | | |
| | DeviceId | int | 4 | foreign key |
| | StartTimeTicks | int | 4 | |
| | EndTimeTicks | int | 4 | |
| Table | Bindings | PRIMARY KEY (BindingId) | | |
| | BindingId | tinyint | 1 | identity |
| | BindingName | varchar | 256 | |
| | Presence | | | |
| | Email | | | |
| | RemotePresence | | | |
| | PresenceAndConnected | | | |
| | Conversation | | | |
| Table | Channels | PRIMARY KEY (ChannelId) | | |
| | ChannelId | int | 4 | identity |
| | UserId | int | 4 | foreign key |
| | BindingId | tinyint | 1 | foreign key |

-continued

Schema

|  |  |  |  |  |
|---|---|---|---|---|
|  | ChannelName | varchar | 256 |  |
|  | INDEX(UserId, ChannelName) - unique |  |  |  |
| Table | ChannelAvailability | PRIMARY KEY(ChannelId, StartTimeTicks) |  |  |
|  | ChannelId | int | 4 | foreign key |
|  | StartTimeTicks | int | 4 |  |
|  | EndTimeTicks | int | 4 |  |
| Table | DeviceChannels | PRIMARY KEY (DeviceId, ChannelId) |  |  |
|  | DeviceId | int | 4 | foreign key |
|  | ChannelId | int | 4 | foreign key |
| Table | WirelessAccessPoints | NO PRIMARY KEY |  |  |
|  | UserId | int | 4 | foreign key, NULL |
|  | WirelessAccessPoint | bigint | 8 |  |
|  | LocationId | int | 4 | foreign key |
|  | INDEX(UserId, WirelessAccessPoint) - unique, clustered |  |  |  |
| Table | ActivityTypes | PRIMARY KEY (ActivityTypeId) |  |  |
|  | ActivityTypeId | tinyint | 1 |  |
|  | ActivityTypeName | varchar | 256 |  |
| CollectingData |  |  |  |  |
| NetworkConnection |  |  |  |  |
| Presence |  |  |  |  |
| RemoteConnection |  |  |  |  |
| OutlookWindow |  |  |  |  |
| ApplicationWindow |  |  |  |  |
| Location |  |  |  |  |
| Wireless |  |  |  |  |
| Audio |  |  |  |  |
| BusyPopup |  |  |  |  |
| ApplicationText |  |  |  |  |
| IpAddress |  |  |  |  |
| GPS |  |  |  |  |
| Table | ComputerActivityLog | PRIMARY KEY (UserId, ComputerId, ActivityTypeId, EndTimeTicks) |  |  |
|  | UserId | int | 4 | foreign key |
|  | ComputerId | int | 4 | foreign key |
|  | ActivityTypeId | tinyint | 1 | foreign key |
|  | EndTimeTicks | bigint | 8 |  |
|  | StartTimeTicks | bigint | 8 |  |
|  | Property | varchar | 8000 | default('') |
| Table | Meetings | PRIMARY KEY (UserId, StartTime, MeetingId) |  |  |
|  | UserId | int | 4 | foreign key |
|  | StartTime | datetime | 8 |  |
|  | MeetingId | int | 4 | identity |
|  | AttendedMeeting | tinyint | 1 |  |
|  | Landmark | tinyint | 1 |  |
|  | Interruptability | tinyint | 1 |  |
|  | ActualLocation | tinyint | 1 |  |
|  | CreationTime | datetime | 8 |  |
|  | ReplyTime | datetime | 8 |  |
|  | LastModificationTime | datetime | 8 |  |
|  | Subject | varchar | 256 |  |
|  | Location | varchar | 256 |  |
|  | Organizer | varchar | 256 |  |
|  | RequiredAttendees | text | 16 |  |
|  | OptionalAttendees | text | 16 |  |
|  | MeetingSender | varchar | 256 |  |
|  | MeetingResources | text | 16 |  |
|  | PlaySoundFile | varchar | 256 |  |
|  | EntryId | char | 140 |  |
|  | SearchKey | char | 32 |  |
|  | BusyStatus | tinyint | 1 |  |
|  | Label | tinyint | 1 |  |
|  | Importance | tinyint | 1 |  |
|  | ResponseStatus | tinyint | 1 |  |
|  | Status | tinyint | 1 |  |
|  | Sensitivity | tinyint | 1 |  |
|  | RecurrencePattern | tinyint | 1 |  |
|  | MessageSize | int | 4 |  |
|  | MinutesDuration | int | 4 |  |
|  | MinutesReminder | int | 4 |  |
|  | IsReminderOn | bit | 1 |  |
|  | IsReminderPlaySoundOn | bit | 1 |  |
|  | IsResponseRequested | bit | 1 |  |
|  | IsOnlineMeeting | bit | 1 |  |
|  | IsPatternException | bit | 1 |  |
|  | MyName | varchar | 256 |  |
|  | MyOfficeLocation | varchar | 256 |  |
|  | MyOwnedAliases | text | 16 |  |

-continued

| | Schema | | | |
|---|---|---|---|---|
| | MyAliases | text | 16 | |
| | MyManagersManager | varchar | 256 | |
| | MyManager | varchar | 256 | |
| | MyPeers | text | 16 | |
| | MyDirectReports | text | 16 | |
| Table | UserPermissions | NO PRIMARY KEY | | |
| | UserId | int | 4 | foreign key |
| | PermittedUserId | int | 4 | foreign key, NULL |
| | INDEX(UserId) | | | |
| | INDEX(PermittedUserId) | | | |
| Table | InterruptionCosts | NO PRIMARY KEY | | |
| | UserId | int | 4 | foreign key |
| | High | int | 4 | |
| | Medium | int | 4 | |
| | Low | int | 4 | |
| | INDEX(UserId) - unique, clustered | | | |

The basic, or atomic, observations represented above can be composed into sets of higher-level features, including combinations that are built from boolean statements from multiple features, including predicates about durations, temporal patterns of activity, and persistence. Such higher-level features can be discovered via search, clustering, or provided as handcrafted definitions. The features can be encoded directly or via, heuristic search procedures, or combination rules stored in an event definition module. Higher-level features can enhance machine learning and reasoning by reducing the parameter space and also by identifying the discriminatory power of the combination features.

As examples, features considered by the Coordinate system, including several atomic and higher-level features, such as temporal pattern features include:

Time and Day
  Time of day—the time the prediction is being made
  Day of week—the date the prediction is being made
  Weekend—whether the prediction is being made on a weekend Activities
  Current application—the name of the application in current use
  Time current application—how long the currently used application has been used without pause for greater than t seconds.
  Previous application—name of the previously used application
  Time previous application—how long was the previously used application used without pause for t seconds.
  k-minute horizon application switches—how many times has the user switched among unique applications in the k minutes, where these features for detecting various degrees of multitasking are generated for several values of k.
  Current title—The visible title of the window in the title bar of the active application
  Time current title—how long has the current application had the current title
  Previous title—Previous title of the current application
  Time previous title—how long had the current application had it's previous title
  k-minute title switches—how many title switches have been observed in the last k minutes for different k's.
  Is present—is the user currently present
  Time present—if the user is present, how long has the user been present
  Time absent—if the user is absent, how long have they been absent
  Computer—which computer was the user last observed as using
  Location—where is the computer that the user was last observed using
  Is reading mail—special application focus on email; is the user reading email
  Time reading mail—if the user is reading email, how long has the user been reading email
  Time not reading mail—if the user is not reading email, how long has it been since they read email Sensory and Perceptual Information
  Is conversing—is the user currently having a conversation, as detected by a conversation detector?
  Time conversation—Given a conversation, how long has the conversation been going on
  Time silence—if the user is not having a conversation, how long has it been since the last conversation was detected
  Wireless—what was the Wireless access point MAC address when the user was last observed
  Visual presence—does a vision-based head pose tracking system sense a user in the near proximity
  Visual pose focus duration—how long has the vision-based head pose tracking system reported that a user has remained focused on a primary display (with some tolerance t for glance away)
  Visual pose focus away—how long has the vision-based head pose tracking system reported that a user has remained focused away from a primary display (with some tolerance t for glance away)
  k-minute visual pose focus pattern—how many times has the vision-based head pose tracking system has reported that the has user shifted from looking at a primary display to looking away from a primary display with k minutes.

Meeting Properties
  Meeting start—if there is a meeting in the user's calendar that is currently taking place, when did it start
  Meeting end—if there is a meeting in the user's calendar that is currently taking place, when does it end
  My role—if there is a meeting in the user's calendar that is currently taking place, what is the user's role in the meeting
  Manager's manager—if there is a meeting in the user's calendar that is currently taking place, what is the user's manager's manager role in the meeting Manager—if there is a meeting in the user's calendar that is currently taking place, what is the user's manager's role in the meeting Peers—if there is a meeting in the user's calendar that is currently taking place, what role do the users' peers have at the meeting Direct reports—if there is a meeting in the user's calendar that is currently taking place, what role do the user's direct reports have a the meeting Total attendees—if there is a meeting in the user's calendar that is currently taking place, how many attendees are there Meeting location—if there is a meeting in the user's calendar that is currently taking place, where is the meeting taking place Busy status—if there is a meeting in the user's calendar that is currently taking place, what is the busy status assigned to in Outlook Duration—if there is a meeting in the user's calendar that is currently taking place, how long is the meeting Recur pattern—if there is a meeting in the user's calendar that is currently taking place, does it recur in the calendar, and if so in what kind of pattern Response status—if there is a meeting in the user's calendar that is currently taking place, how did the user respond to the meeting request Response requested—if there is a meeting in the user's calendar that is currently taking place, did the person setting up the meeting request acknowledgment that the user would attend Reminder on—if there is a meeting in the user's calendar that is currently taking place, did the user set a reminder for the meeting Reminder time—if there is a meeting in the user's calendar that is currently taking place, how long in advance was the reminder set for Attendees—if there is a meeting in the user's calendar that is currently taking place, what is the list of people attending the meeting Meeting sender—if there is a meeting in the user's calendar that is currently taking place, who sent the meeting request Subject—if there is a meeting in the user's calendar that is currently taking place, what is the meeting's subject line Location string—if there is a meeting in the user's calendar that is currently taking place, what is the meetings location line FIGS. 4-19 illustrate exemplary user interfaces for configuring/linking presence locations, channels, and devices, wherein some of the interfaces also provide presence information to outside entities. Various configurable tools can be invoked in the Coordinate system, wherein here are many potential controls for such configuration tools for a general forecasting availability system. It is to be appreciated that the following interfaces are but one example of many possible implementations for configuration tools that may be employed with the subject invention.

Figure 4:
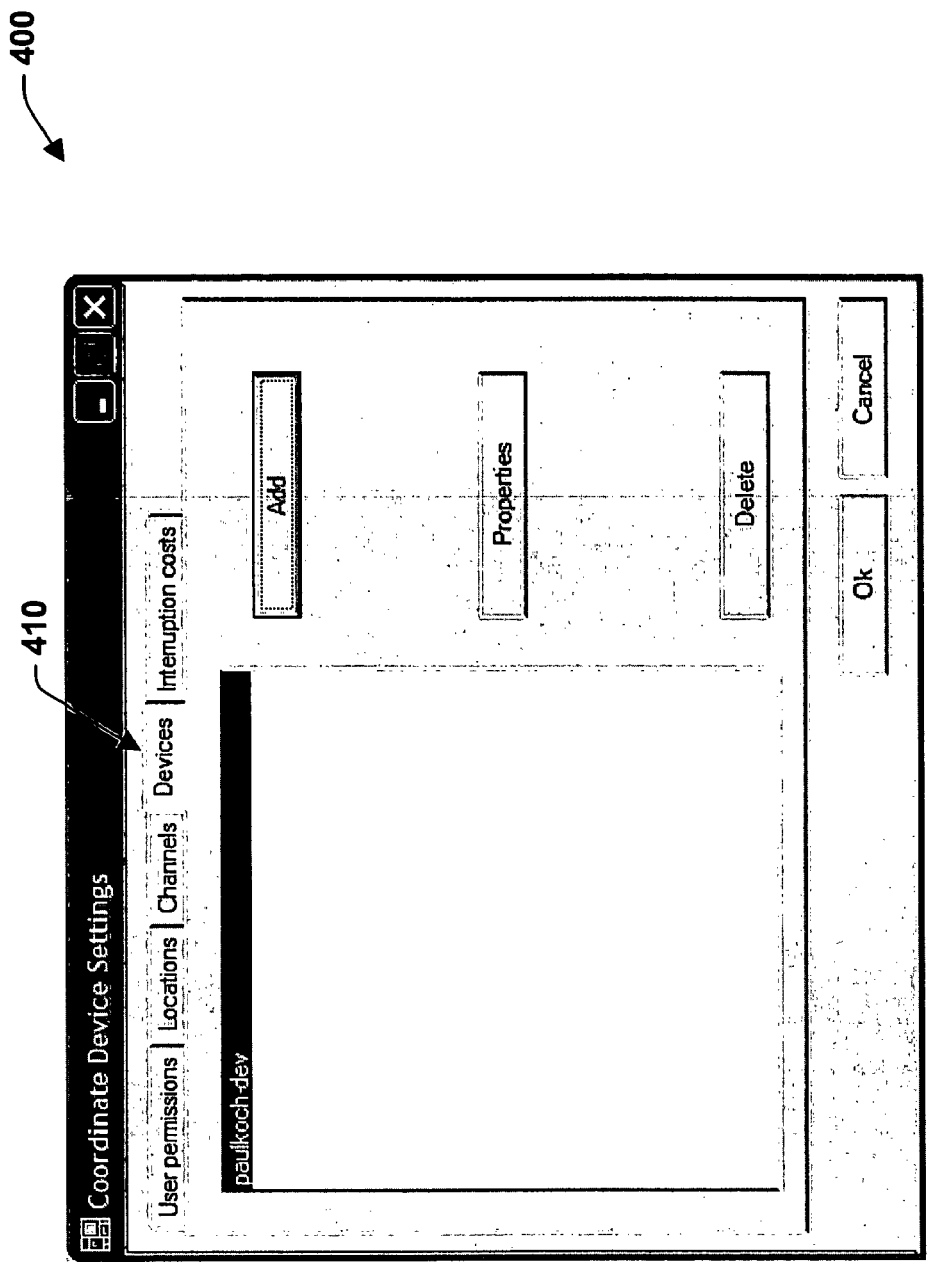

In one aspect, an interface 400 of FIG. 4 depicts a window of options that can be brought up, with different dimensions for set up represented by tabs. In this case, a "devices" tab is selected at 410. From this control 410, the names and properties of multiple devices that a user has access to can be input. Paulkoch-dev is an example name of a machine added to the system at 420. After a properties button 430 is selected, the user can enter key properties about the nature, location, and availability of the device that has been added. All communication channels associated with this machine are now added.

Figure 5:
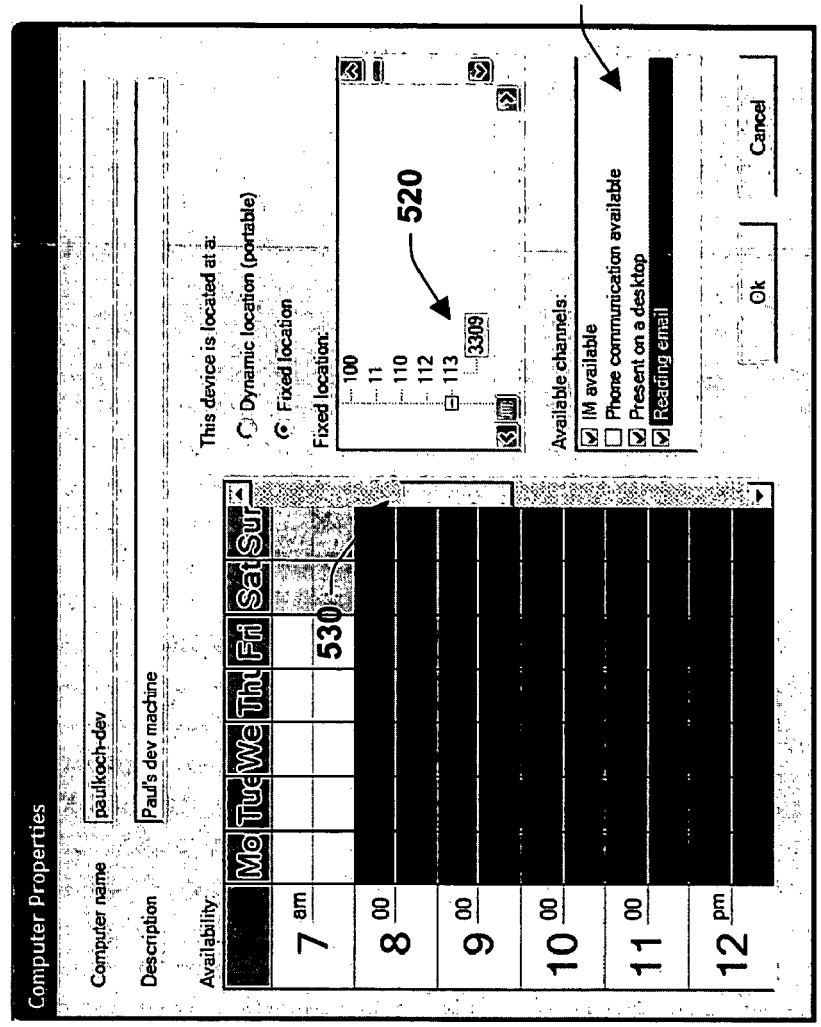

In one example interface 500 shown in FIG. 5, a machine is assigned to several communication channels at 510, including instant messaging, presence on a desktop machine, and active usage of email. At 520, the machine is indicated to be fixed in the world (versus being a mobile device) at location Bldg 113 in room 3309. The availability of the machine to the user by time is also indicated. In this case, a user slides a cursor 530 over a surface representing time of day by days, and via a drag and select operation, indicates the times that the machine is available in defining a channel. This time can be considered as a logical constraint on top of statistical inferences.

Figure 6:
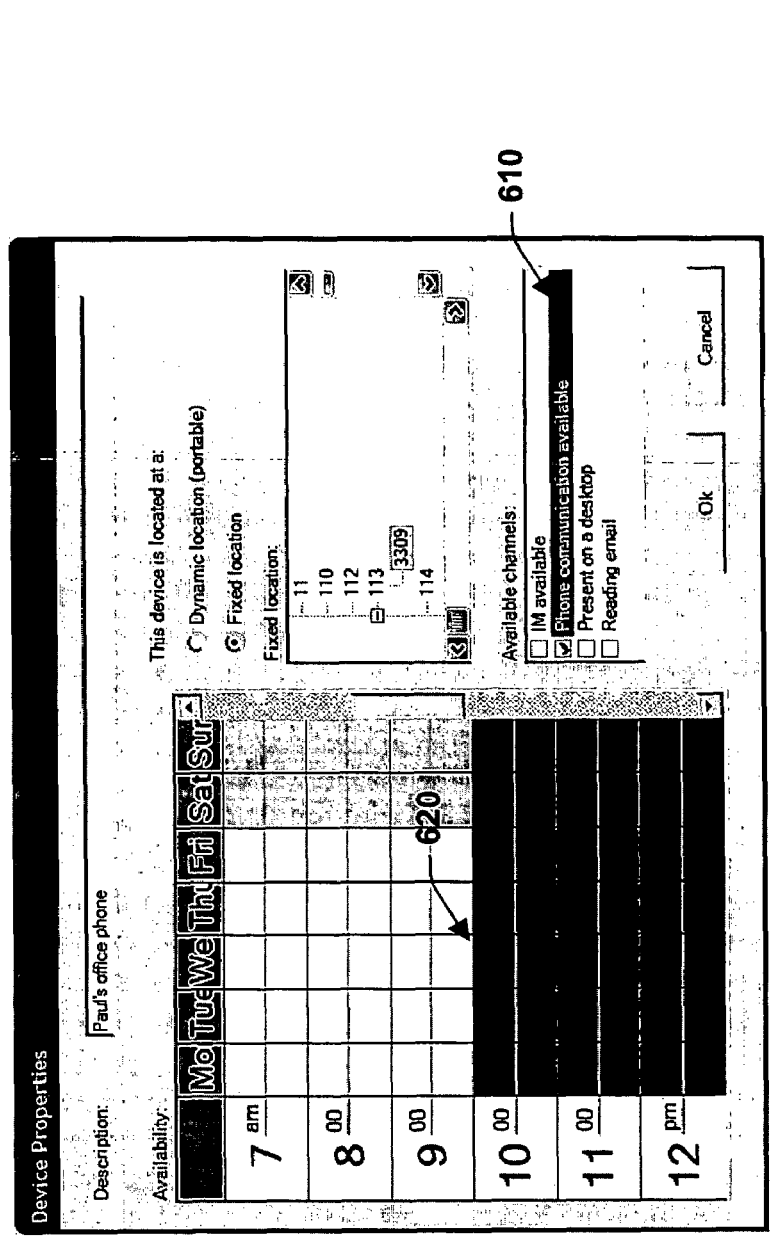
Figure 7:
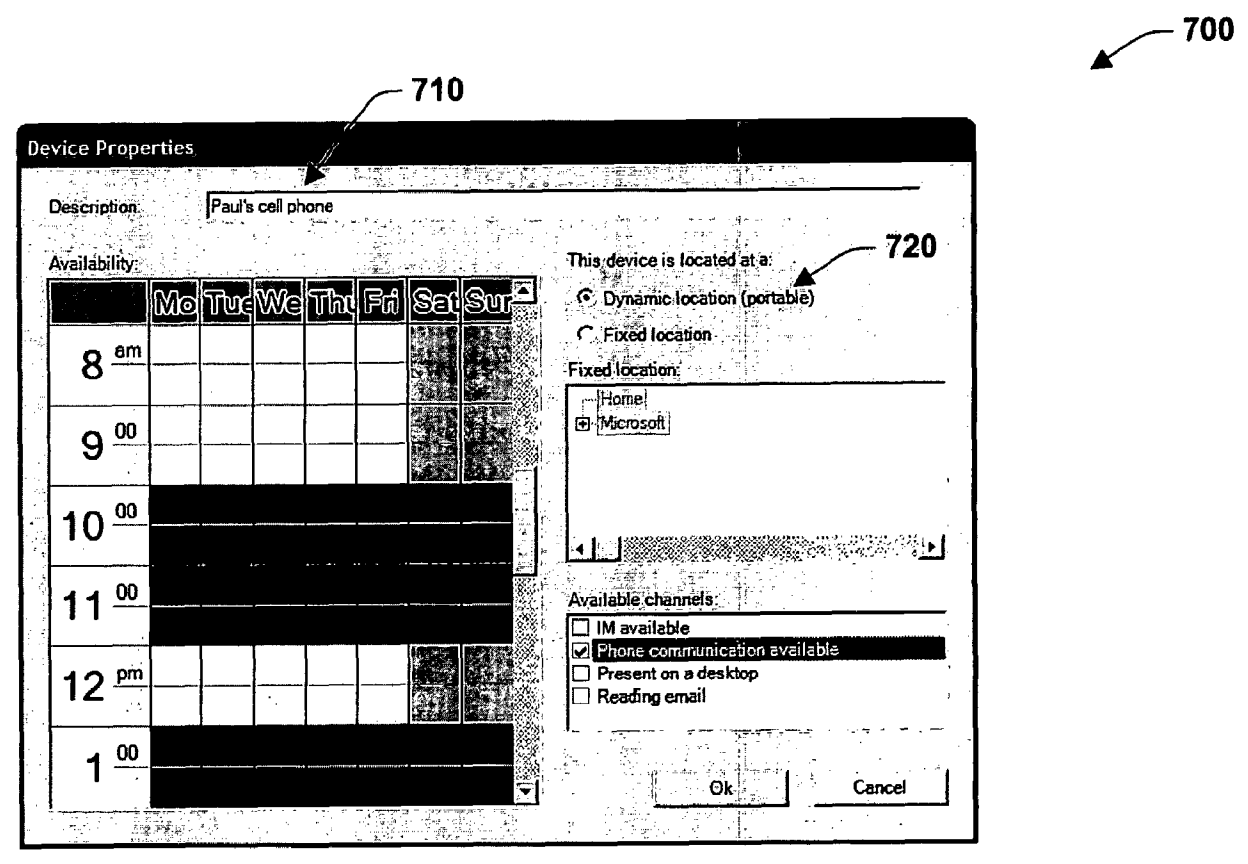
Figure 8:
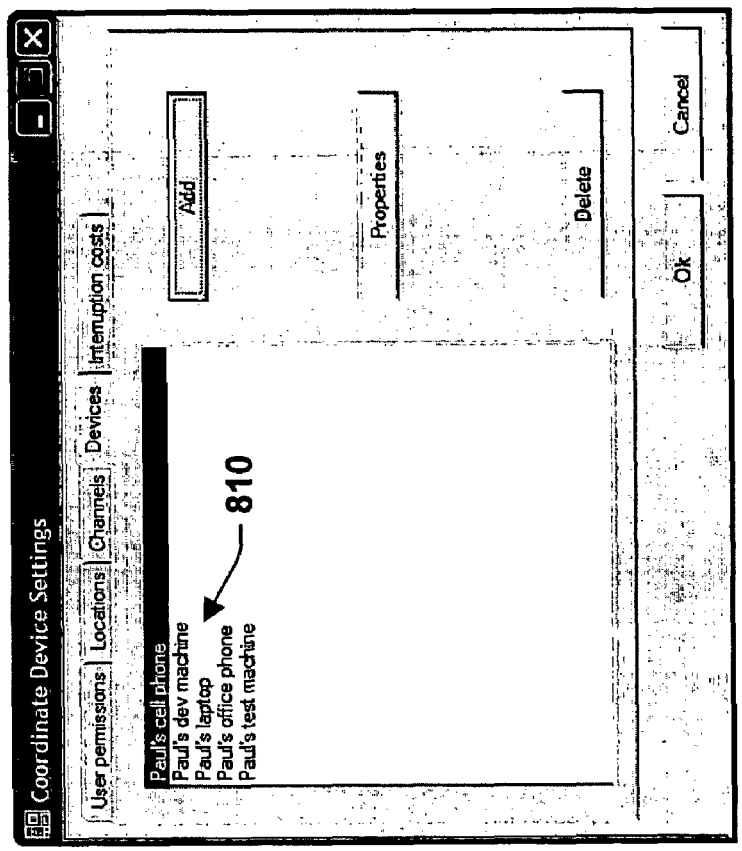

Proceeding to FIG. 6, a phone is added at 610, named "Paul's office phone." Paul's office phone is linked to a fixed location, and a communication channel, "Phone communication." Times of the availability of the device are listed with the shading of a region of time at 620. At FIG. 7, a cell phone, named "Paul's cell phone" is added at 710. The device is noted to be at a dynamic location at 720 (that is, it is mobile), and that it provides phone communication. The times that the device is available are also listed. The two phones are combined to define the availability of the abstraction of voice channel via a disjunction as either device's availability can make the voice channel available. After several more computers are added, the top-level list of devices appears as in the interface 800 of FIG. 8, with a laptop, two fixed desktop machines, a cell phone, and an office phone, for example, at 810.

Figure 9:
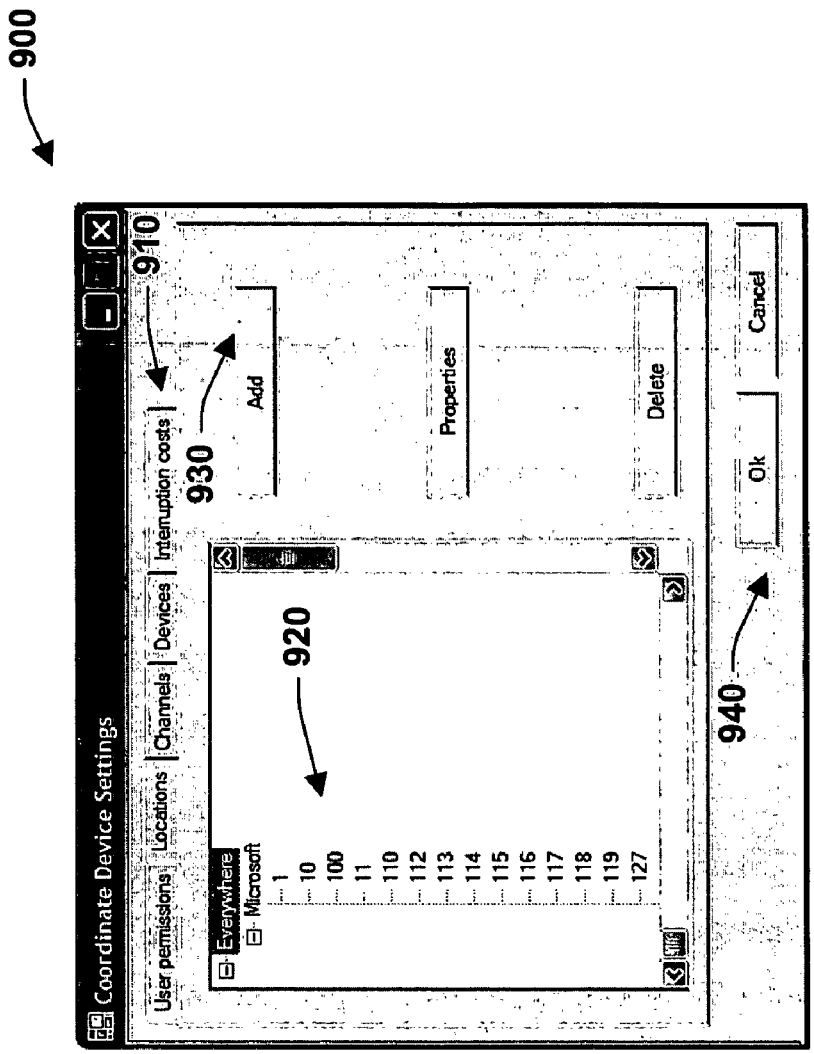

FIG. 9 illustrates an example configuration interface 900 to setup locations, channels, devices, user permissions, and interruption costs. Beyond adding devices and their properties, configuring the system, also includes specifying locations of interest that the user desires the system to consider, e.g., from a list of locations, including locations referring to home, and buildings at an organization. Some of these may have already been added as properties of devices. At 910, tabs are provided that correlate to respective location, channels, and device configurations. At 920, a user has configured various locations hierarchically under an example heading "Everywhere" which includes an example corporation e.g., Microsoft, wherein various numbers represent example building locations. It is to be appreciated that other locations can be defined and that other techniques for naming locations can be provided (e.g., names of buildings versus numbers). Buttons to the right of reference numeral 920 at 930 allow user's to add or delete properties or features which are described in more detail below. Other input buttons 940 enable users to accept, cancel, or apply various settings.

Figure 10:
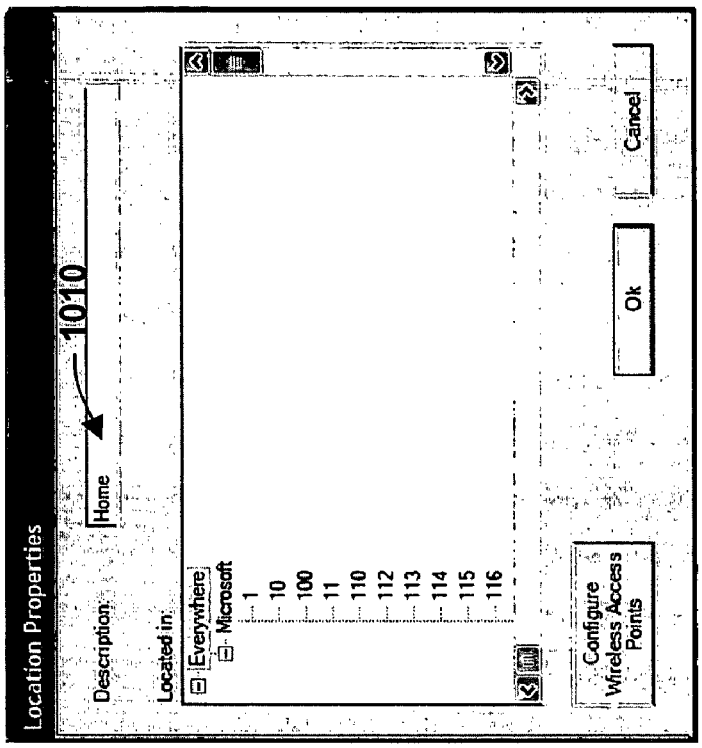
Figure 11:
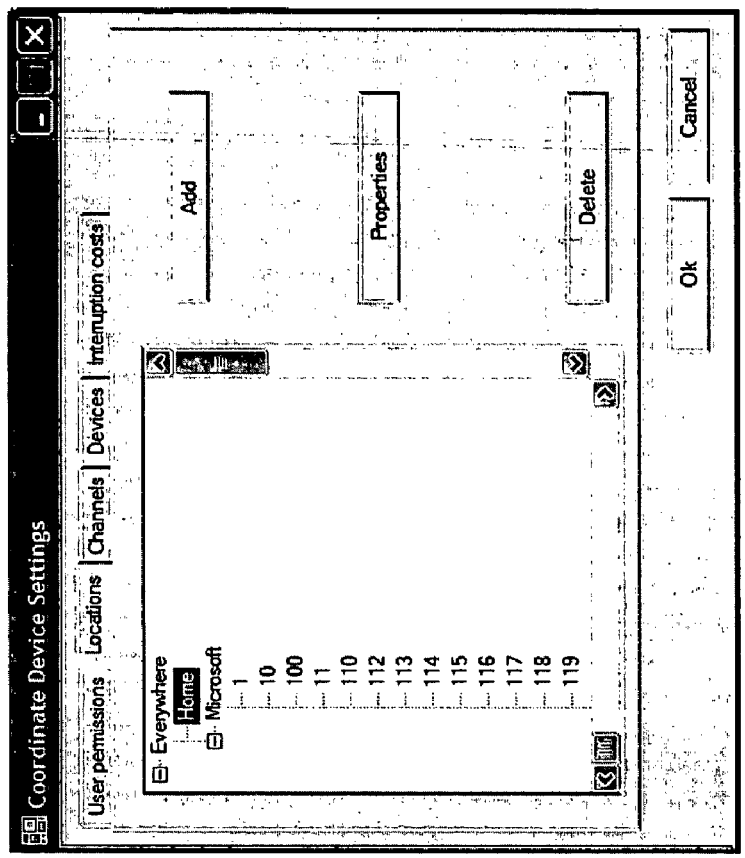

Proceeding to FIG. 10, an interface 1000 illustrates adding a location property by selecting a properties button from the previous interface 1000. Beyond pre-configured choices from an existing ontology that the system knows about, users can add new locations and name them with expressive labels. In this example, a new location property is defined and is illustrated as e.g., "Home" at 1010. Thus, in this example, the user is defining a location that applies to an environment outside of their work environment. At FIG. 11, an interface 1100 illustrates the "Home" location at 1010 added to the hierarchy that was added from the interface of FIG. 10. These locations can be added to a database for logging and reasoning.

Figure 12:
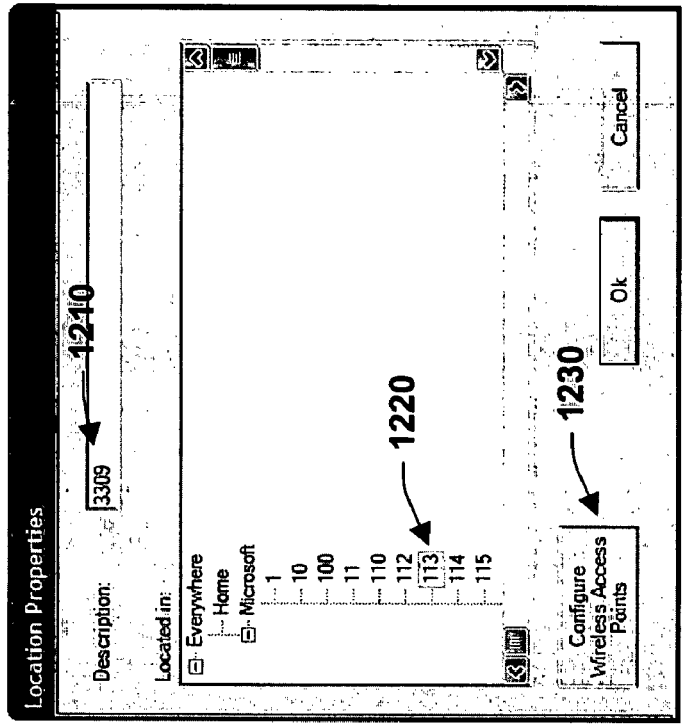
Figure 13:
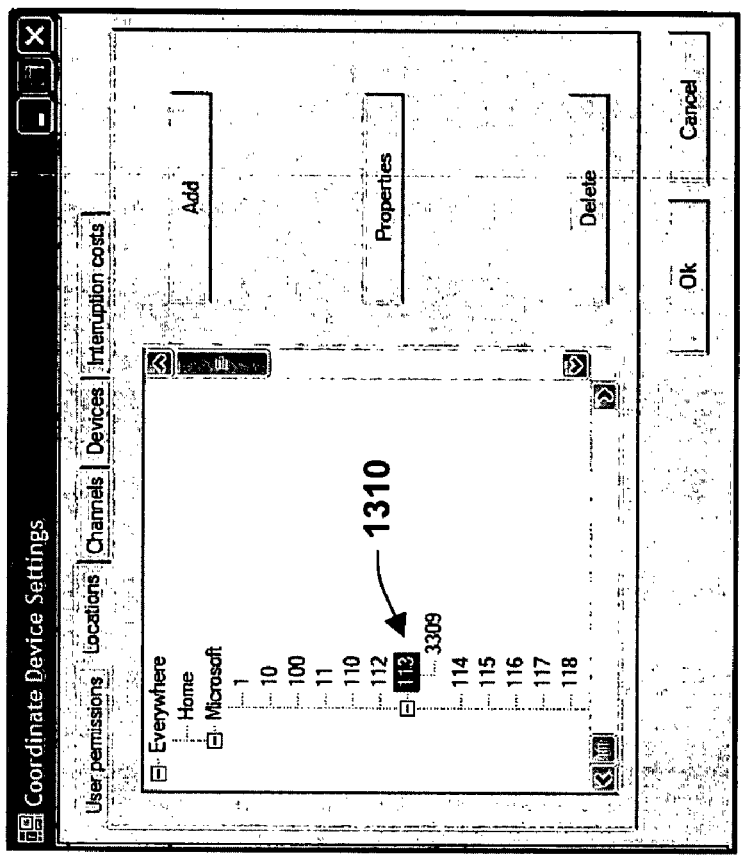

FIGS. 12 and 13 illustrate how a location within a location can be defined. For example, the interface 1200 depicts an example room number within a building being defined at 1210 (e.g., 3309) which is being associated with a building location (e.g., 113) at 1220. Also, a button 1230 can be provided to configure wireless access points which is described in more detail below. FIG. 13 shows an interface 1300 depicting the room location "3309" added to the hierarchy under the building 113 at reference numeral 1310. Locations can be added to existing locations in a hierarchical manner if desired. For example, a user's office may be added to a building location. Locations are displayed with the appropriate hierchicalization, in this case, via indenting.

Figure 14:
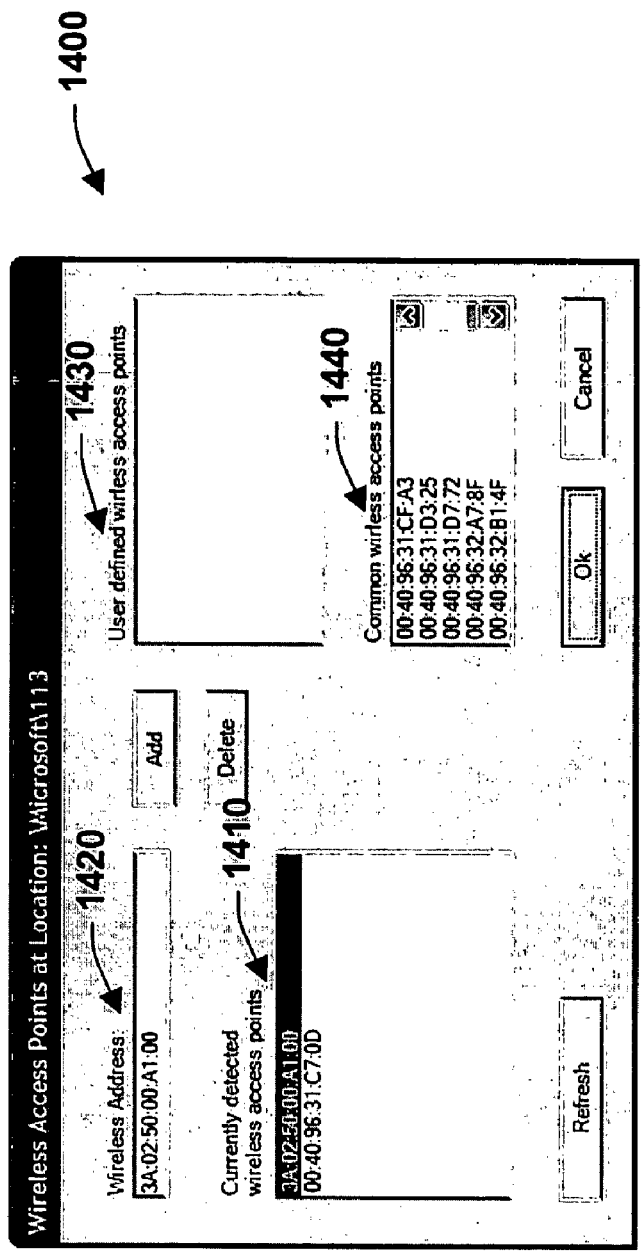
Figure 15:
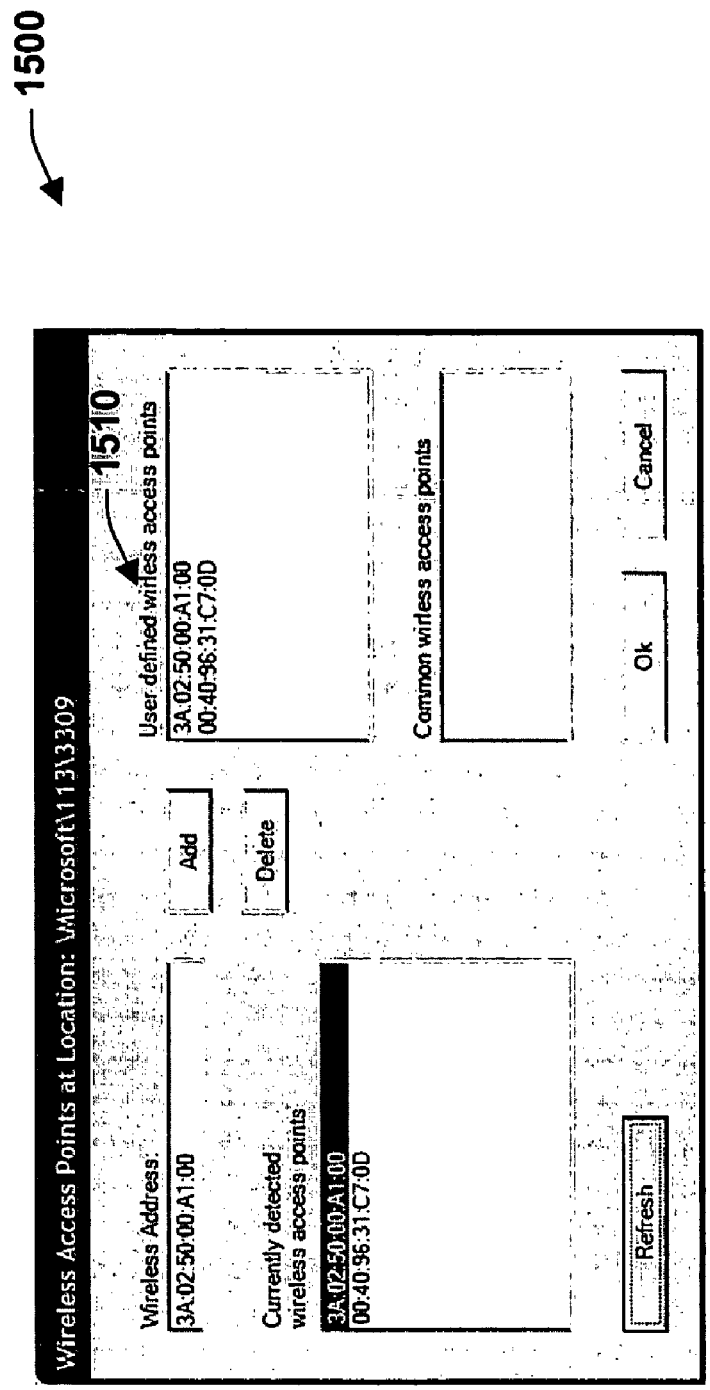

FIG. 14 depicts an interface 1400 for configuring wireless access points at a building location (e.g., building 113). If wireless or GPS is available, the information can be added (i.e., the longitude and latitude). The information can also be sensed automatically when the user is at the location of interest, and then associated with fixed locations. In this case, two wireless association points are detected automatically at 1410, and users can add one or more points as associated with the location. This interface can automatically determine or detect available communications with respect to a given location. The interface 140000 includes a field 1420 for declaring wireless addresses, a field 1430 depicting user defined addresses, and a field 1440 showing common address or access points within a location which are shared among users at a given location. A similar concept is illustrated in FIG. 15, wherein an interface 1500 depicts wireless access point configuration for a location in a location (e.g., building 113, room 3309). As can be appreciated, the present invention can support multiple layers of granularity with respect to defining locations within locations within locations and so forth. In this example, some user defined access points have been declared at 1510.

Figure 16:
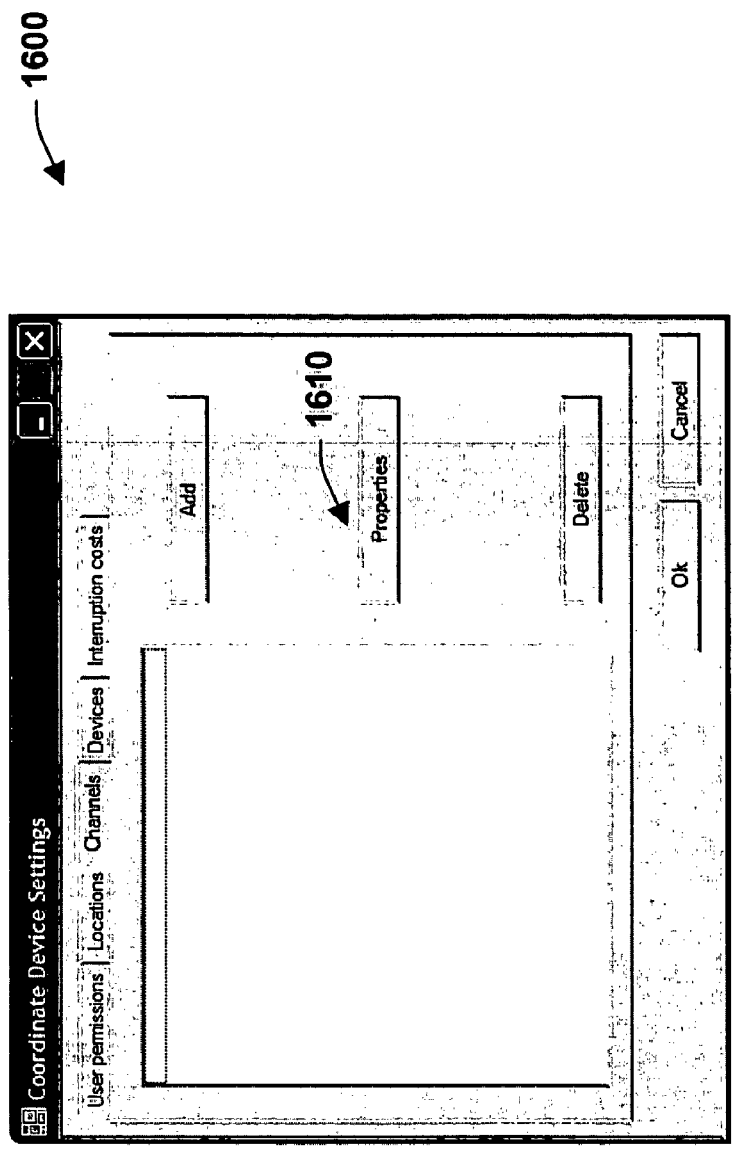

FIG. 16 illustrates an example interface 1600 for configuring various channels of communications. Explicit channels of communication can be added. These channels can be the distinctions that learning and reasoning occurs about for use in coordinating and routing communications and collaboration. Data can be collected about the availabilities of these channels over time and forecasts can be created on demand of users or agents that use the forecasts. Channels may be input to systems in an organization by default, or a base list of standard channels may be included that can be extended by users or administrators. Such channels can include e-mail, voice mail, instant messenger, or substantially any electronic communications technique associated with images, video, and/or audio.

Figure 17:
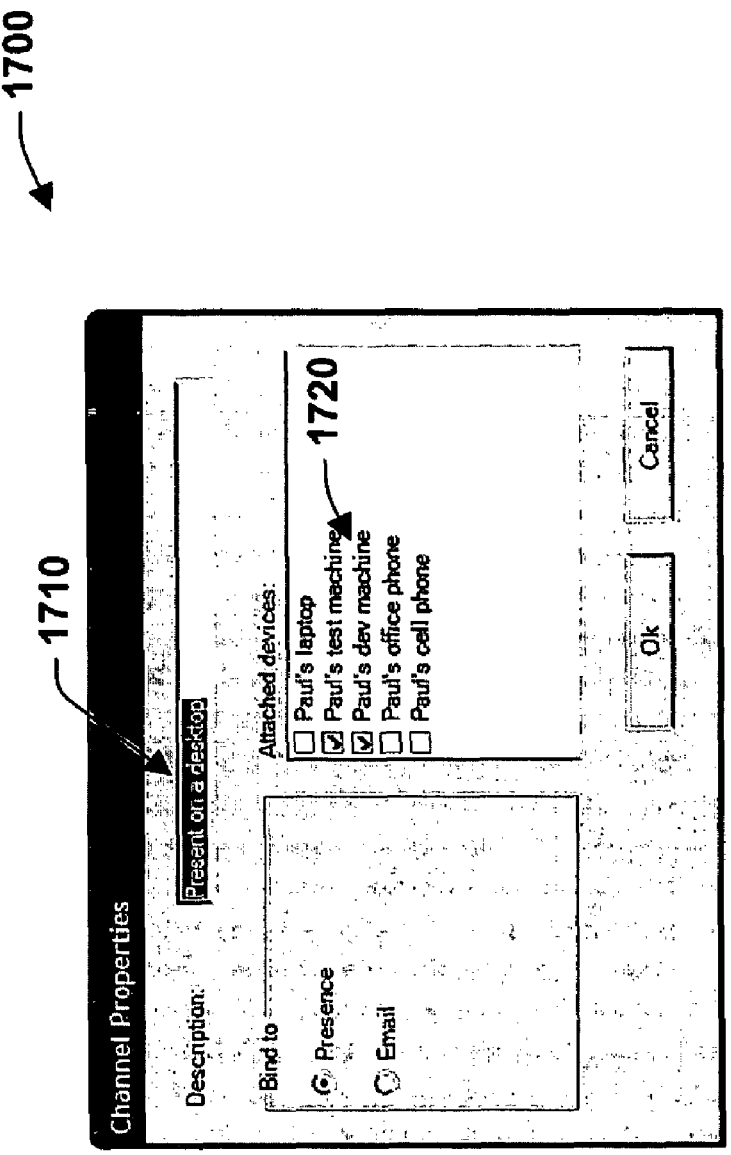
Figure 18:
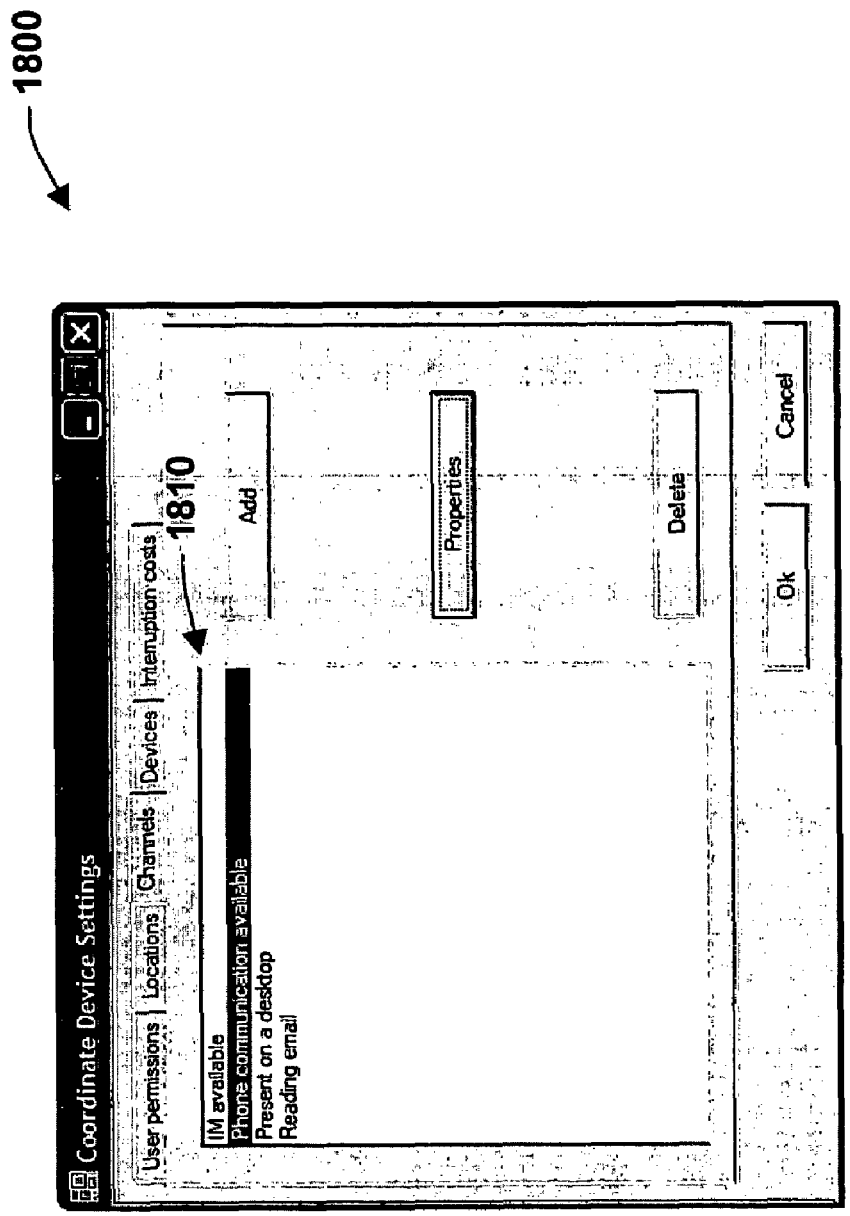

If a properties button is selected at 1610, channel properties can be configured as depicted by the interface 1700 in FIG. 17. In this case, a user is configuring how the term "Presence" is defined for the user. For example, at 1710, present on a desktop is defined as connection to a test or development machine as selected by the user at 1720. In this example however, presence for the desktop is not defined as also having access to a laptop, office phone, or cell phone. In this case, the channel of "Presence on desktop" refers to presence on a desktop computing device. This condition is true when Paul is either active on his test machine or active on his dev machine. This disjunction is specified by considering all of Paul's computing devices and checking the dev machine and test machine. The user tells the system to consider these conditions true when bound to general "presence," on these devices, referring to the sensing of activity on them. FIG. 18 is an interface 1800 that illustrates other channels added for learning and reasoning includes phone communication, actively engaged in email review ("reading email") and Instant Messaging (IM) available at 1810, for example.

Figure 19:
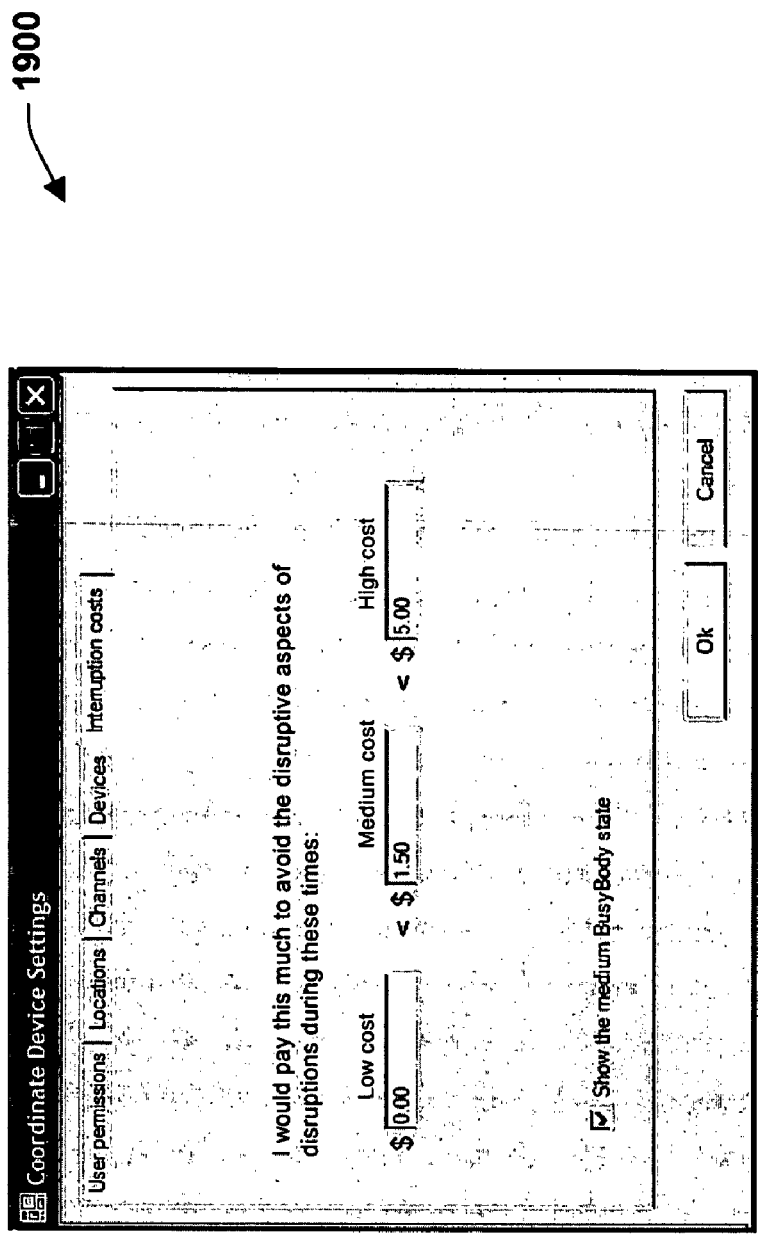
Figure 20:
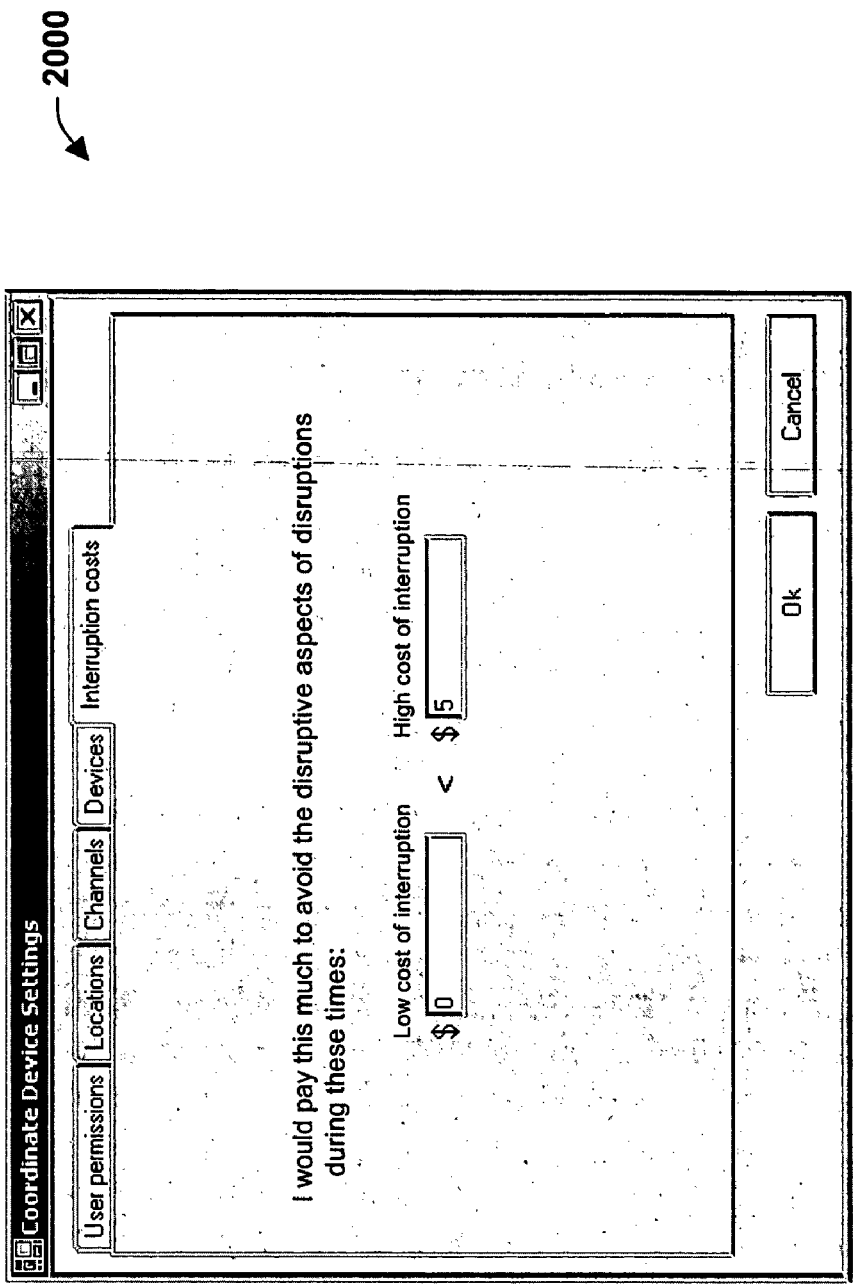
Figure 21:
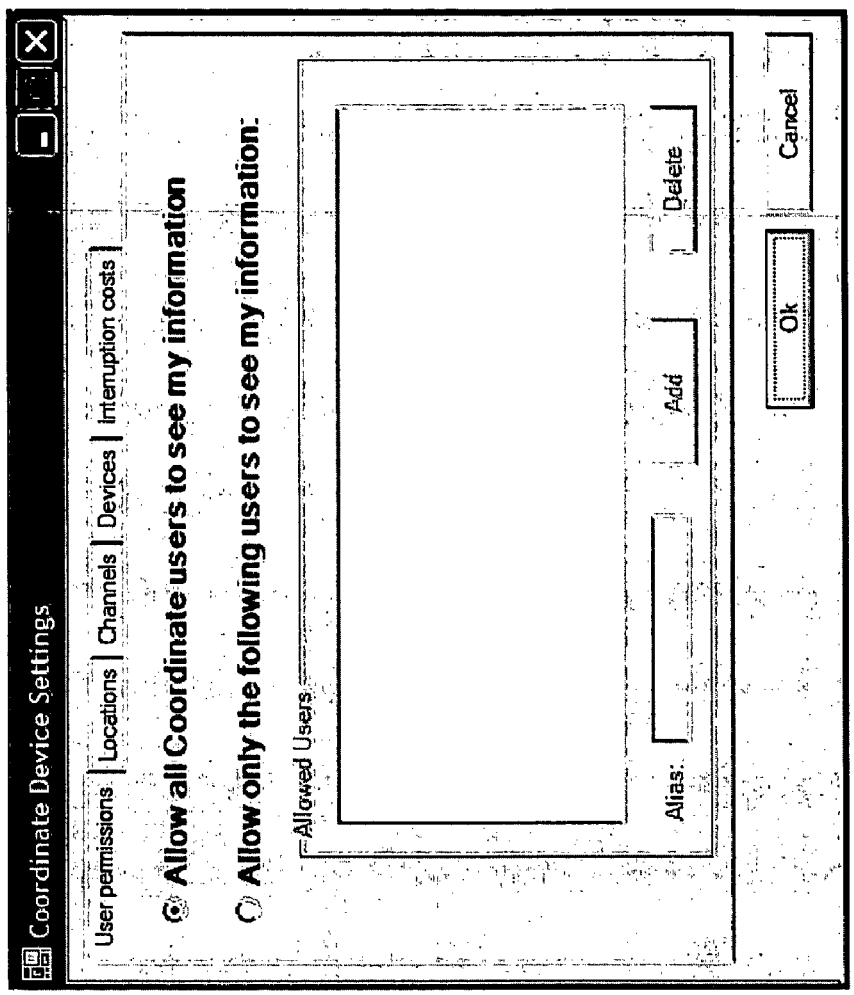

FIG. 19 is an interface 1900 that illustrates a view onto interruption costs that allows users to assign costs to being in a high, medium, or low cost of interruptability state. Varying numbers of states can be assigned, e.g., low and high, or low, medium, and high. For each state, a user provides a dollar value of the cost they would be willing to pay to avoid the costly aspects of being interrupted in the different states. More generally, a control can be shared that allows these states to be assigned for different types of alerts, e.g., real-time interaction on the telephone versus a quick pop up email. FIG. 20 shows an example of a binary, low vs. high assessment of the cost of interruption.

Figure 22:
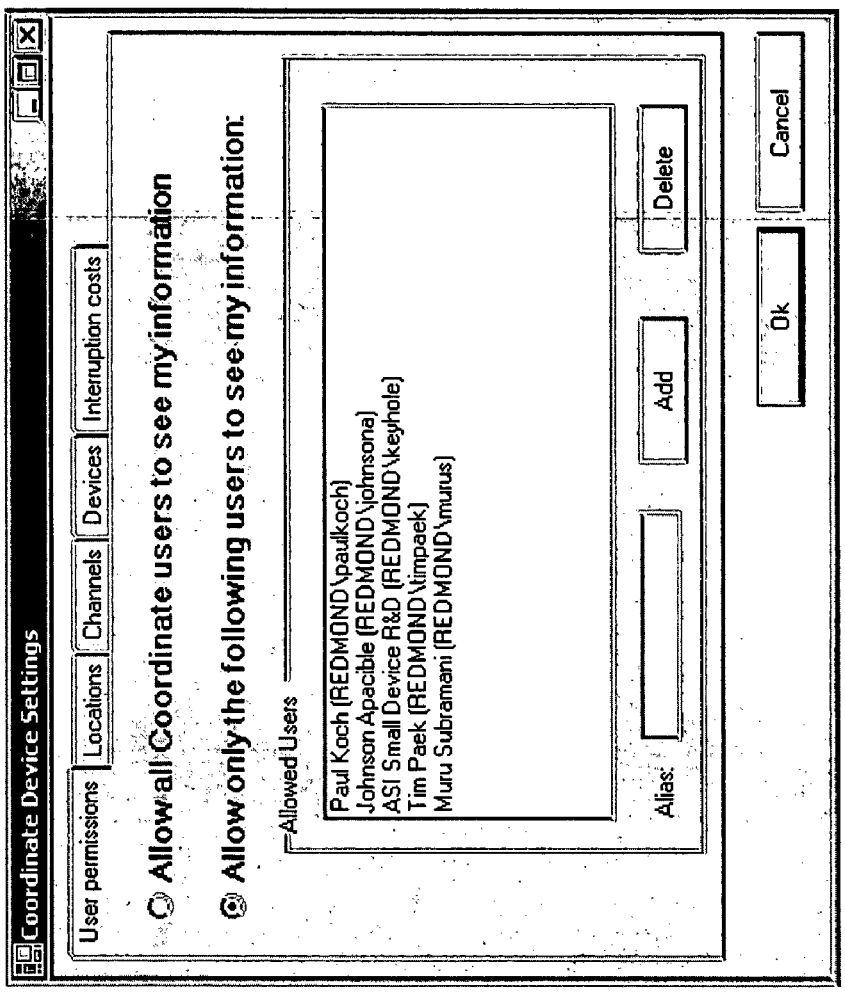

Referring to FIG. 20, privacy can be an important part of configuration of availability services. A user permission tab 2110 allows a user to configure settings on who can see what information. In this example, users can list user names or distribution lists of users that contain a set of users that they desire to allow access to all information (or a subset of information) about their sensed presence, availability, and cost of interruption. More detailed versions enable users to allow different people to view different channels of presence (e.g., voice, desktop computer, office presence, home presence, etc.), specifying who can see what information, either sensed or inferred. At FIG. 22, a user allows several individuals, and also a distribution list (e.g., ASI Small Device R&D), which is a list of people, to access the information that is sensed or inferred about the user's respective channels.

Figure 23:
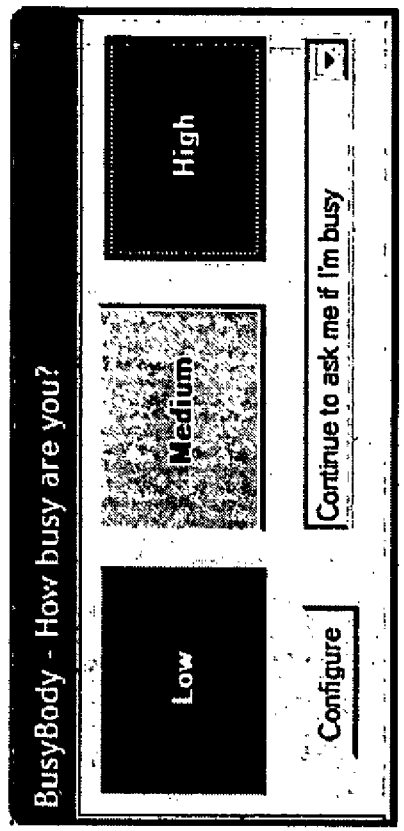
Figure 24:
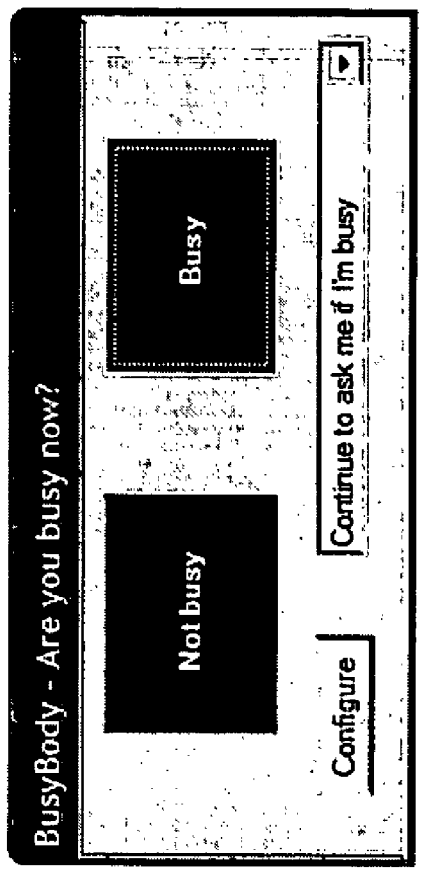
Figure 25:
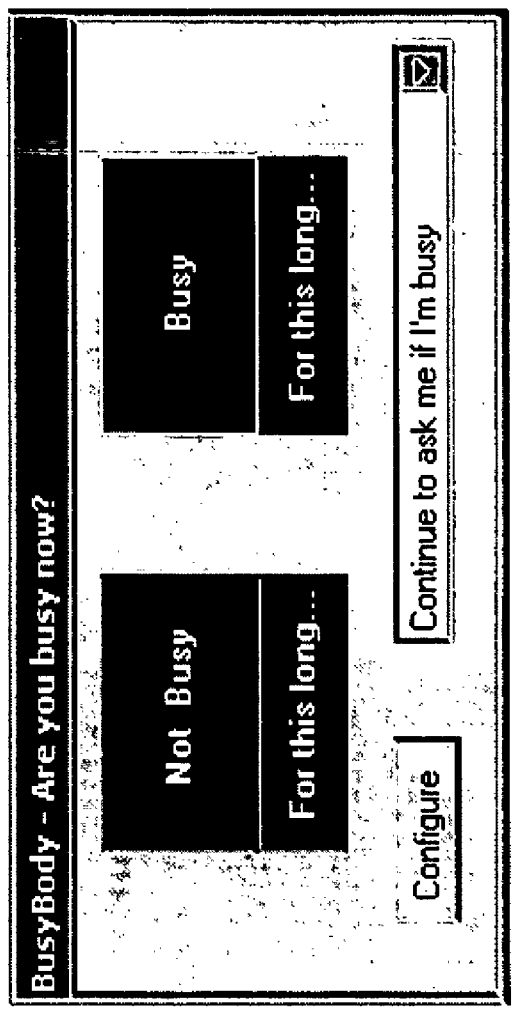
Figure 26:
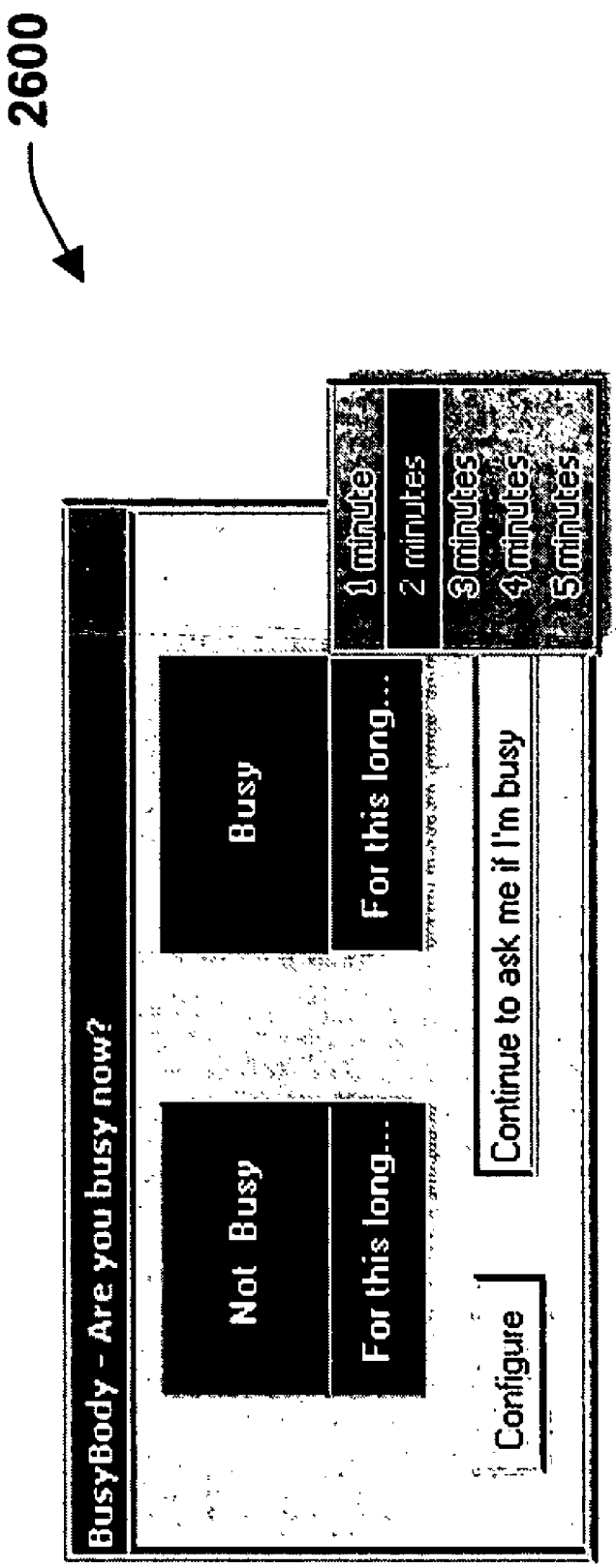
Figure 27:
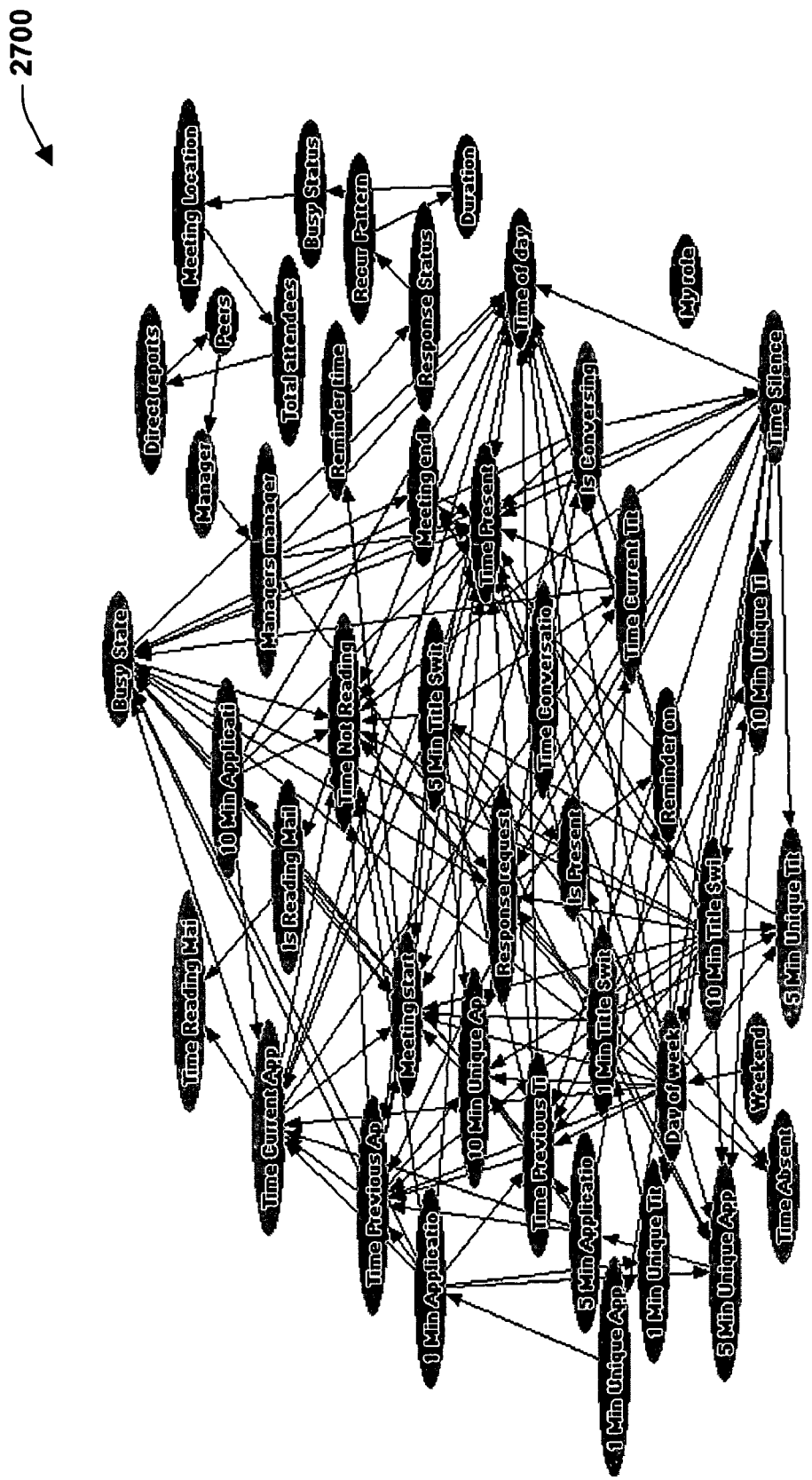

Turning to FIG. 23, it was noted previously that Coordinate can learn about channels and availability by building statistical models from ambient tagging of data (e.g., noting when a user is present at device), but also by initiating explicit probes of a situation, during a training phase. For the state of interruptability, the Coordinate system can intermittently seek to understand the current or recent state of users via a palette 2300 that seeks assessments during a training phase. The data acquired from such probes is used to tag streams of data from other channels so as to allow the construction of models of a user's cost of interruption. FIG. 24 illustrates more complex versions of the tools for probing users which allows users to specify more or fewer numbers of distinctions. For example, a slider, or a type-in box can be used that allows users to specify real numbers. Simpler versions of assessment involve a two-state palette 2400. With respect to FIG. 25, richer assessments allow for users to optionally specify how long they have been in a state. For example, in a training tool 2500, the user interface (UI) design allows users to either give a "now" assessment—answering the question, "how busy am I now," or to access a drop down menu, for asserting that they have been busy for a specified length of time. For example, an interface 2600 of FIG. 26 shows the specification that a user has been busy for at least the last 2 minutes.

Figure 28:
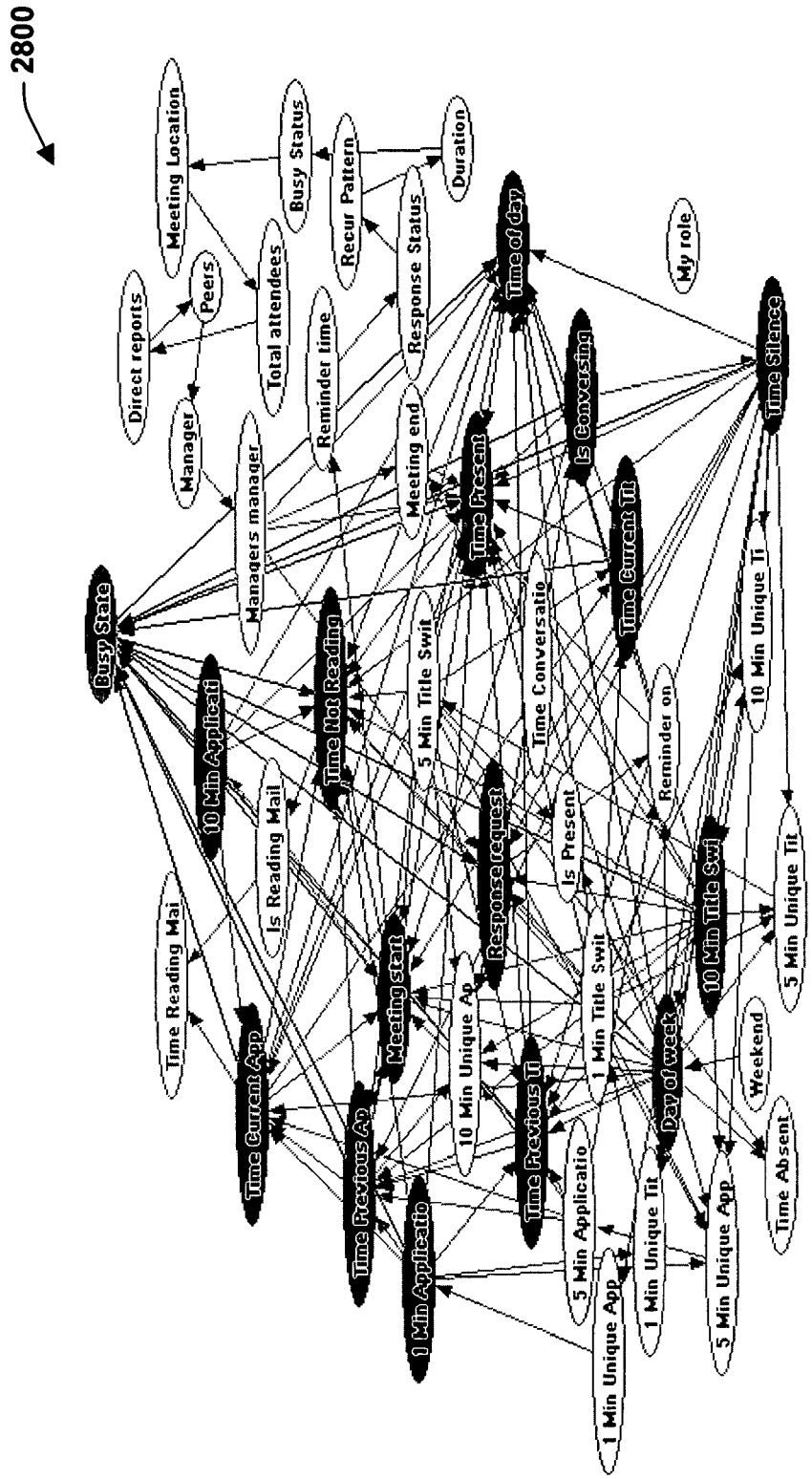
Figure 29:
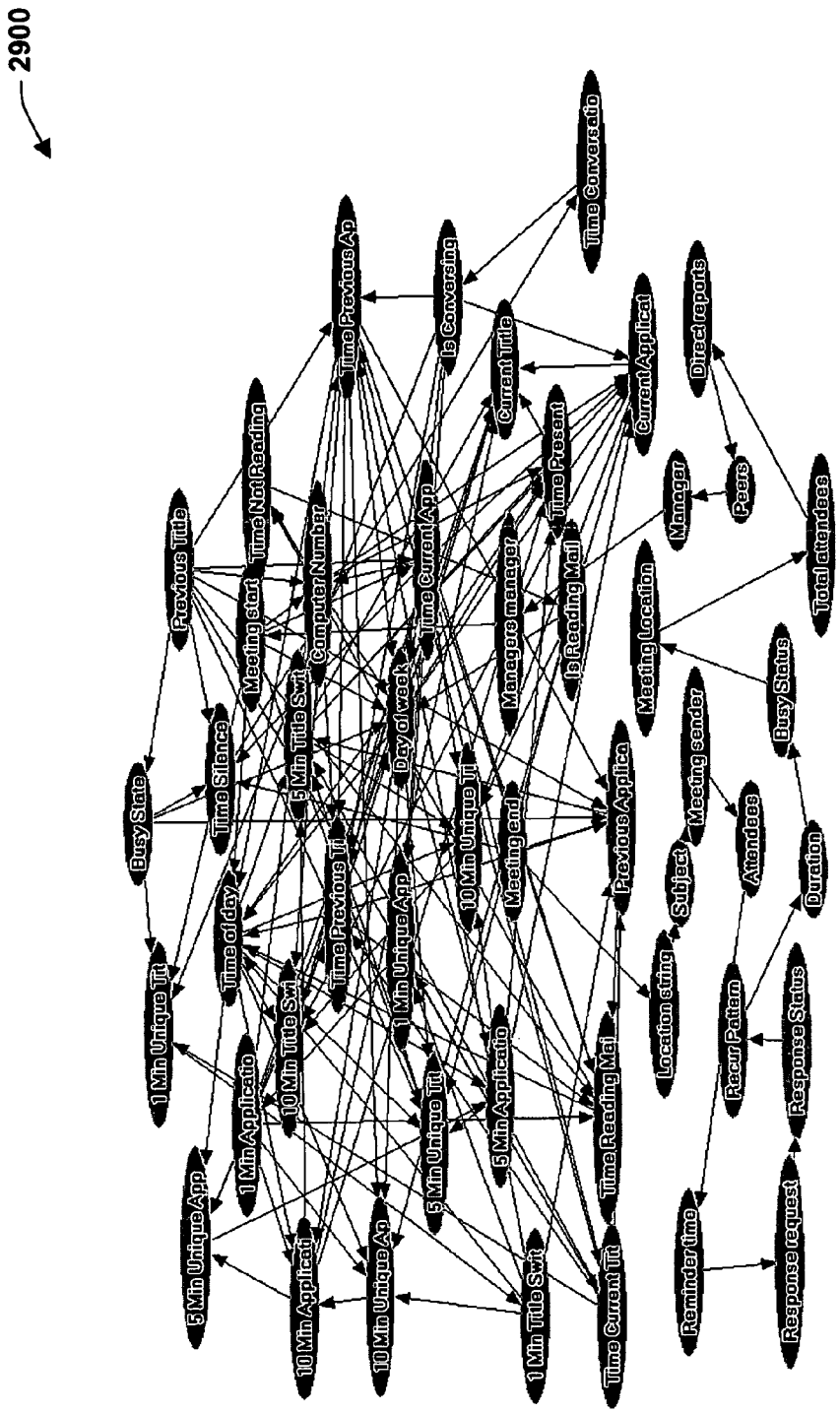

Referring now to FIGS. 27-32, various models are depicted. Coordinate builds probabilistic models for predicting overall interruptability, as well as models for forecasting the availability over time for channels (such as office presence, phone, email access, etc.) that take into consideration such tagged data described above (or ambiently tagged information), that consider distinctions about desktop computing, including the name of the window that has focus, the pattern of application usage (including different rates of application shifting, time in such applications as email), online calendar capturing key properties about meetings (e.g., including start and stop time relative to the current time, the organizers and attendees, the subject and duration of the meeting, etc.), advanced sensors such as whether or not conversation has been heard recently, and the duration of silence, as well as the detection of people and their head pose (e.g., looking at the computer) nearby. Time of day and day of week are also considered. FIG. 28 illustrates example strongest probabilistic dependencies for the state interruptability of a user that was modeled in FIG. 27. FIG. 29 is another user, showing different model structure.

Figure 30:
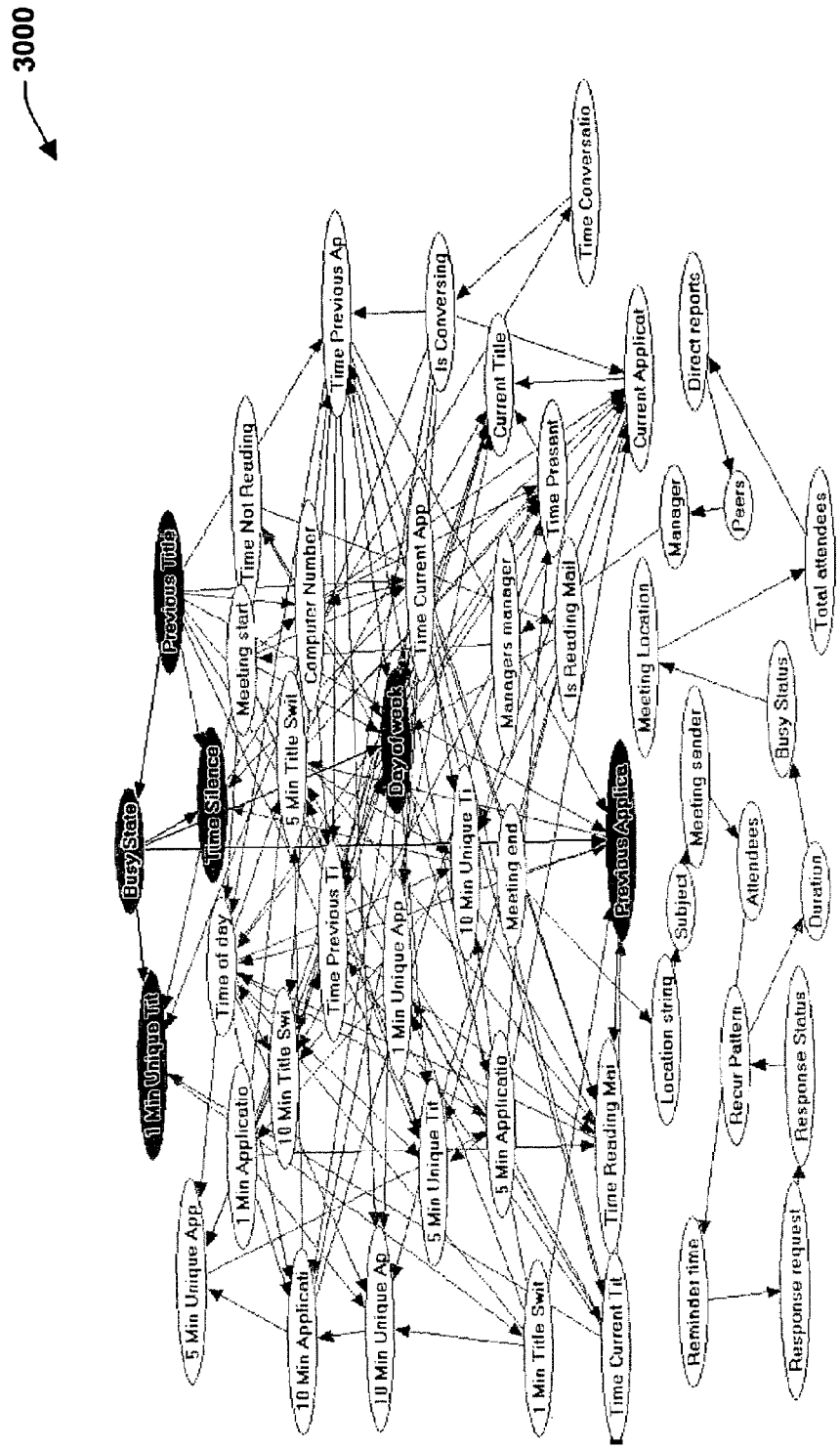
Figure 31:
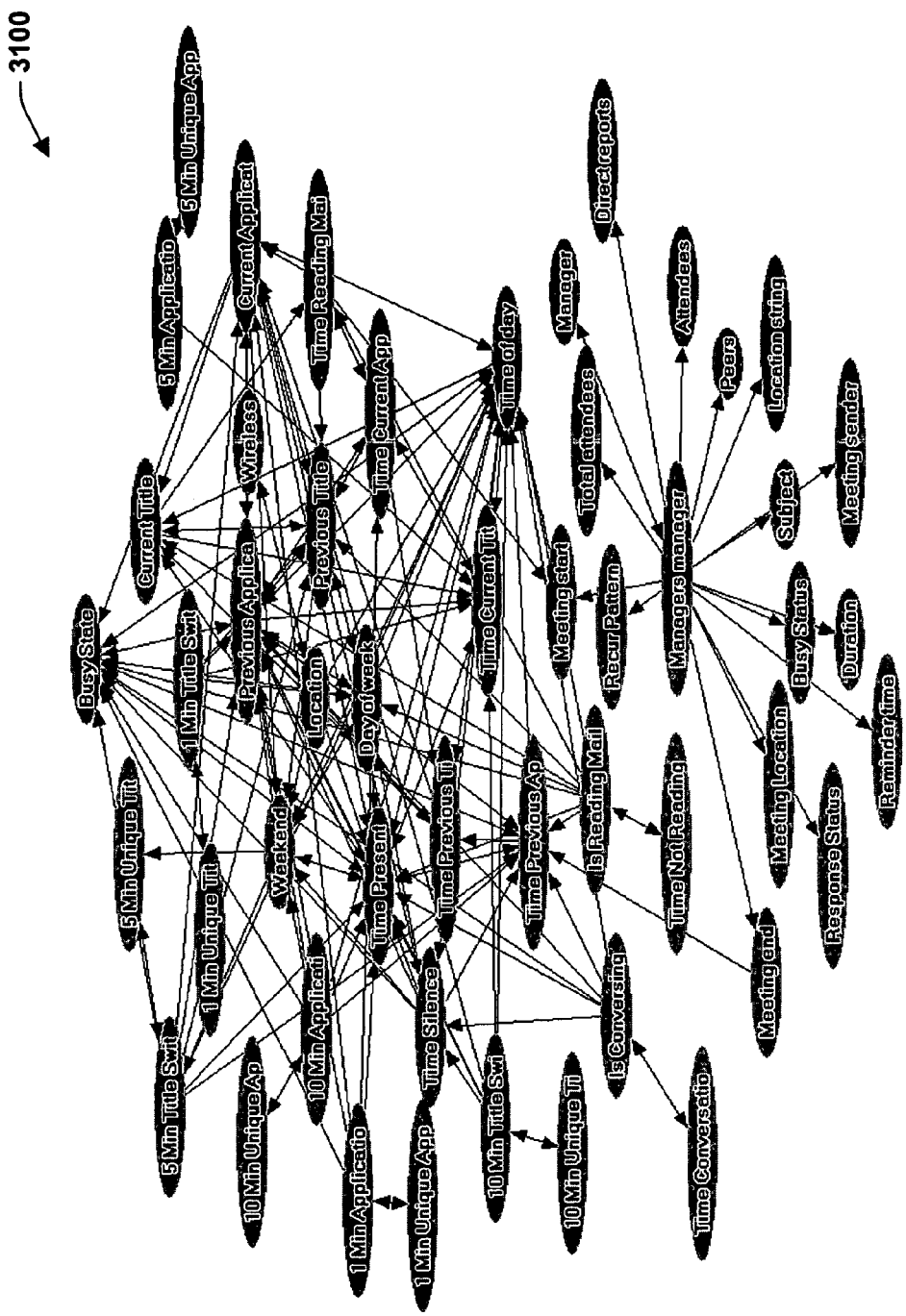
Figure 32:
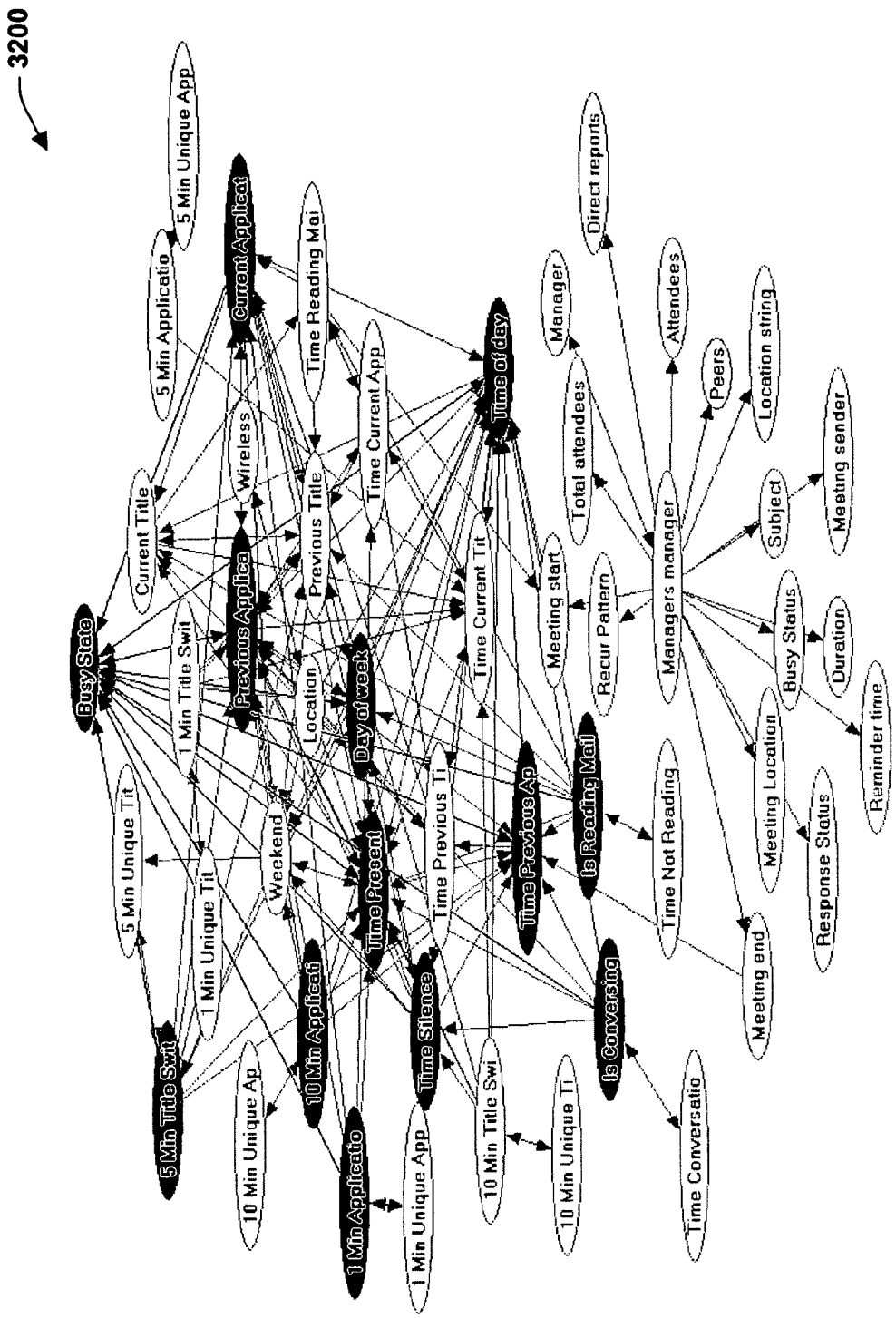

With respect to FIG. 30, such observations as the previous window title of the application and then name of the previous application that has been on top, as well as the time that a user has been silent, and the number of unique window titles that have been seen over the last minute, is a relevant influencer of a user's current workload. FIG. 31 depicts a model for yet a different user. At FIG. 33, In this case the current application, the previous application, the length of time that a user has been reading email, has been talking, and the application and title shifts over different time periods, influence the predicted workload of the user.

Models do not have to be built by a user from scratch. Models built for other users can be adapted, and can be gracefully extended to personalized models in a variety of ways. For example, in one approach, the personalized data is added to a training set collected from one or more users, and the data used initially can be replaced or aged out by the new personalized experiences. In another approach, a model mixture can be used for inference. For example, inferences from observations can be performed by a given generic model and a personalized model and these inferences can be folded together into a single inference. For example, consider the case of an interruptability filter that provides the probability that a user is in a high cost of interruption state versus a low cost of interruption state given a set of observations. A modeling weighting parameter, k, can be considered that ranges between 0 and 1 that is used to integrate the probability that a user is in a high cost of interruption state from both models. It can be assumed that k varies from 0 to 1 depending on the competency (e.g., as reflected by the amount of training that a personalized model has received), and compute the final interruptability as the weighted average where k serves as the weighting:

$p$(interruptability=high cost|observations)=

$(1-k)*p$(interruptability=high cost|observations, generic model)+

$k*p$(interruptability=high cost|observations, personal model)

Where k is set as a function of a measure of competency k=f(competency) where competency can be gleaned from the performance of the personal model on cases held out for testing. The parameter k can be made a function of proxies for competency, including estimates of the number of training samples used to build the personal model, k=f(number of training cases), where function f can be a nonlinear function. In the end, with the use of model mixtures, inferences from the generic model are washed out over time as the personalized model is weighted in as it becomes more competent.

Figure 33:
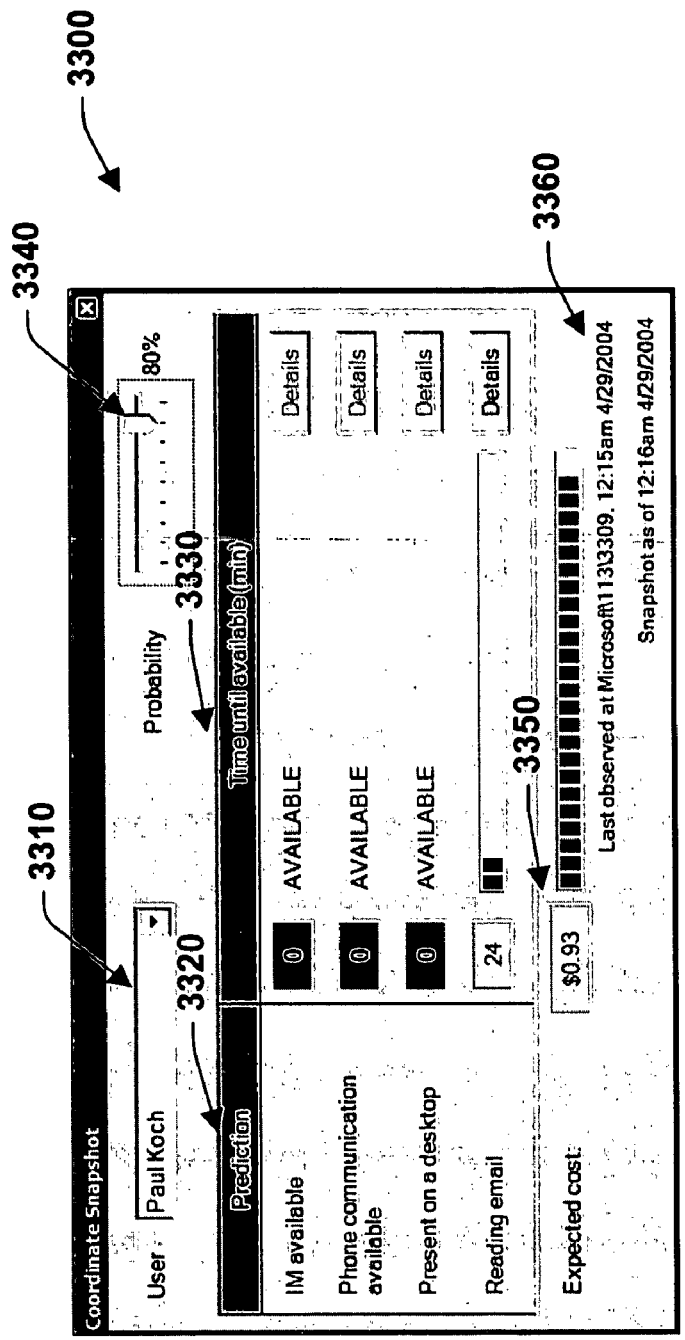

FIG. 33 illustrates an example interface 3300 that provides user availability predications according to the various configurations and sensed parameters previously described. This type of information can be shared with other users per a user's preferences (e.g., my friends can have all availability information, my co-workers can have availability information while I am at work). In this example, a user is selected at 3310. Availability with respect to particular communications channels is provided at 3320, wherein time until available with respect to a given channel is provided at 3330. In this example, it is illustrated that the user is currently available on three channels and is expected to read email within the next 24 minutes with a probability of 80%. A probability setting 3340 can be provided that enables receivers of the prediction information to adjust a probability threshold which determines how the availability information is presented. For example, if the setting is set for 50% probability, the predictions of availability are 50% likely to be accurate predictions, whereas an 80% setting would reflect more likely or accurate predictions.

When the system has been configured and models have been trained, users with privileges can view inferences in terms of high-level summaries as displayed, or via, drill down, into more specific views on probability distributions. The interface 3300 is a sample of a Coordinate "snapshot," a view also referred to as a "presence palette." Channels that are configured for reasoning are listed at the left hand column. A green square, 0 min. until available, means the user is now available at these channels. A time and bar graph represent the amount of time that must pass, until the probability that a channel will have become available in that time, is reached. In this case, the threshold is set to 80% chance, thus 24 min. by Reading Email, refers to the situation that the cumulative probability that a user will have read email sent to that user by 24 minutes is 80% (at set in the upper right-hand region of the presence palette at 3340).

Other views could include simply giving the maximum likelihood time that channels will become available. Also note that an expected cost of interruption is listed at 3350, in terms of a range for a bar graph between the minimum and maximum cost specified by the user, and a current computed expected value ($0.93 cents). Also, the lower right-hand portion of the palette at 3360 displays a summary of where the user was last seen as active on one of the devices being monitored by the system. A location can be given if a location was sensed via wireless, or a device that is registered at being at a particular location. An age of the current inference is also presented at 3360.

Figure 34:
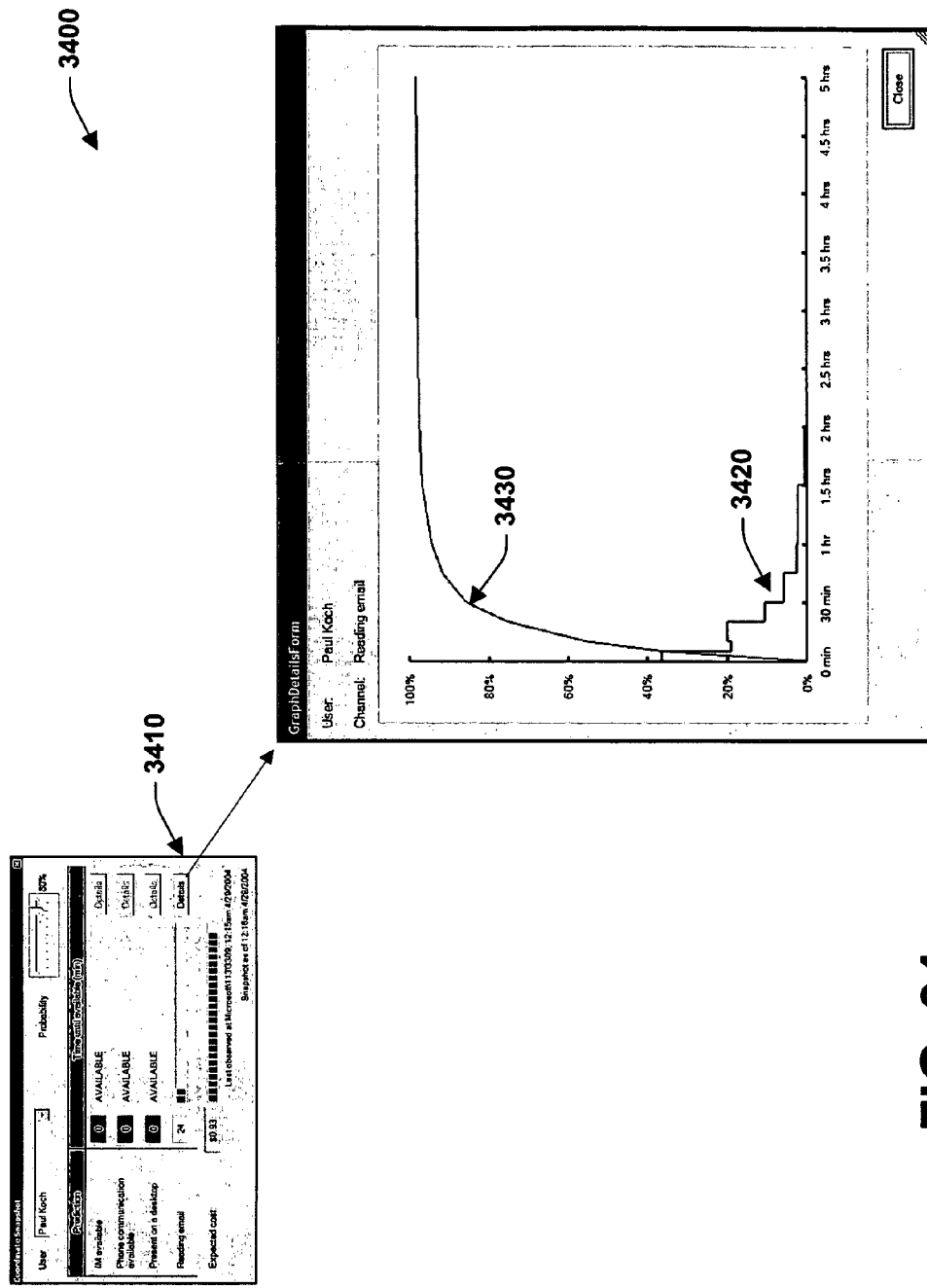

Referring to FIG. 34, by pressing a "details" button 3410 next to the email channel forecast, for example, a user with privileges can now view details of the inferred probability distribution, both base probability distribution 3420 (blue line) as well as cumulative probability distribution 3430 (red), revealing the probability of the channel being available over time. The base probability distribution 3420 for email review describes the probability that email will next be reviewed in different periods of time. The cumulative distribution 3430 describes the likelihood that email will have been read by each time on the x-axis.

Figure 35:
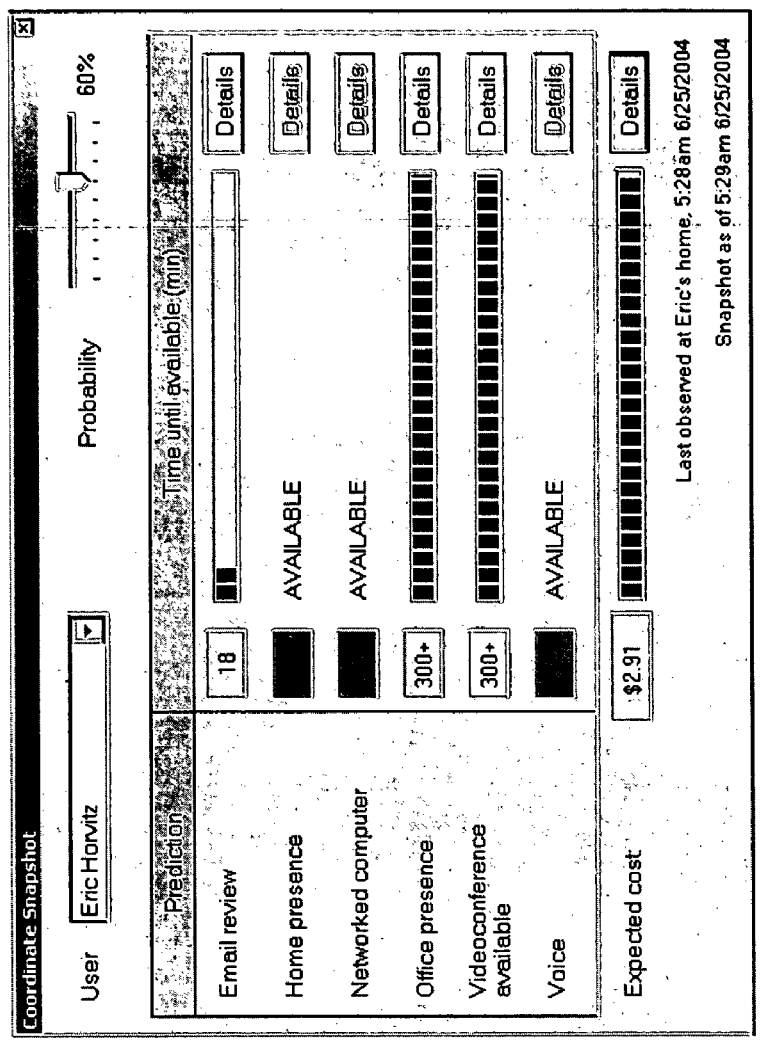
Figure 36:
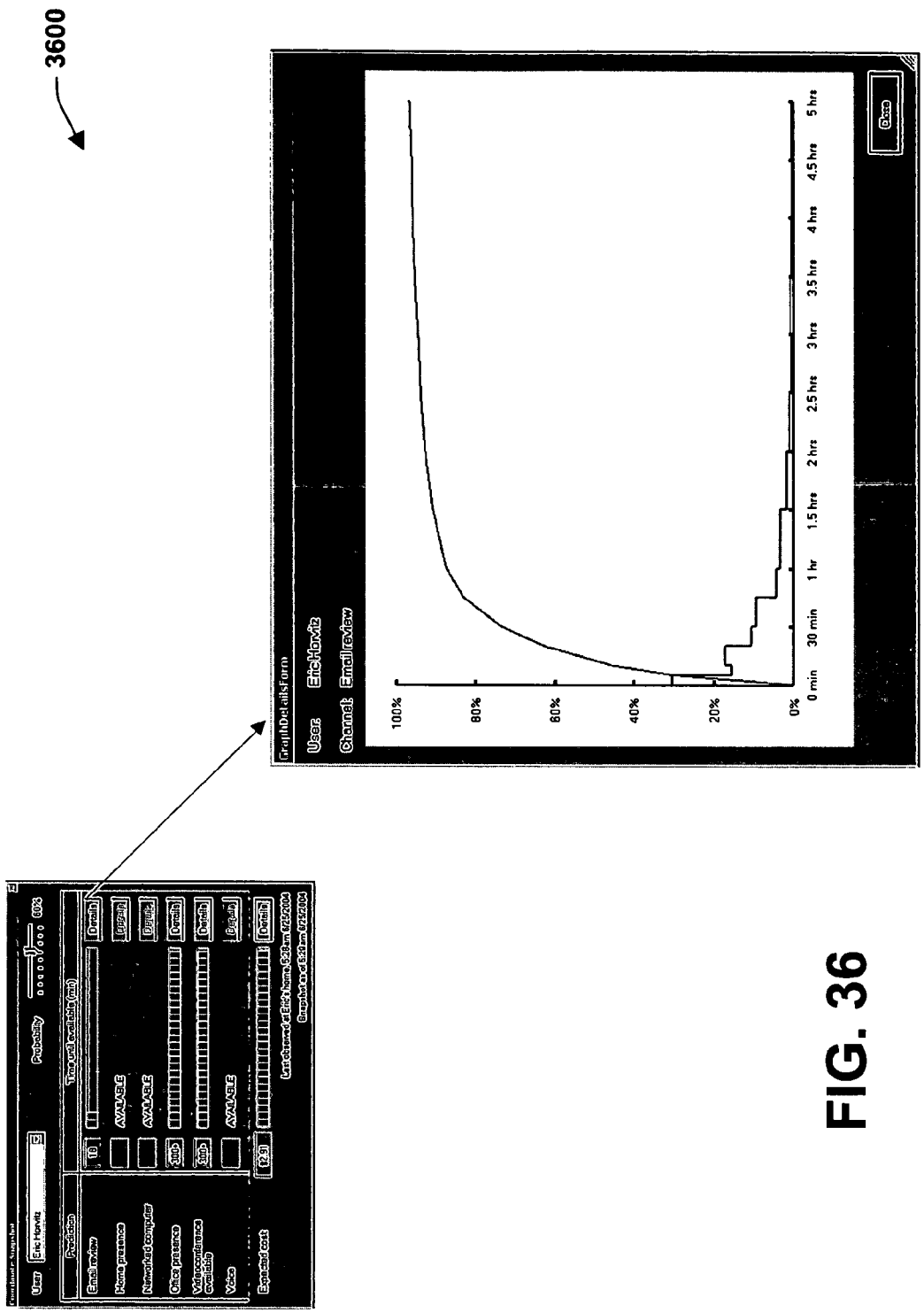
Figure 37:
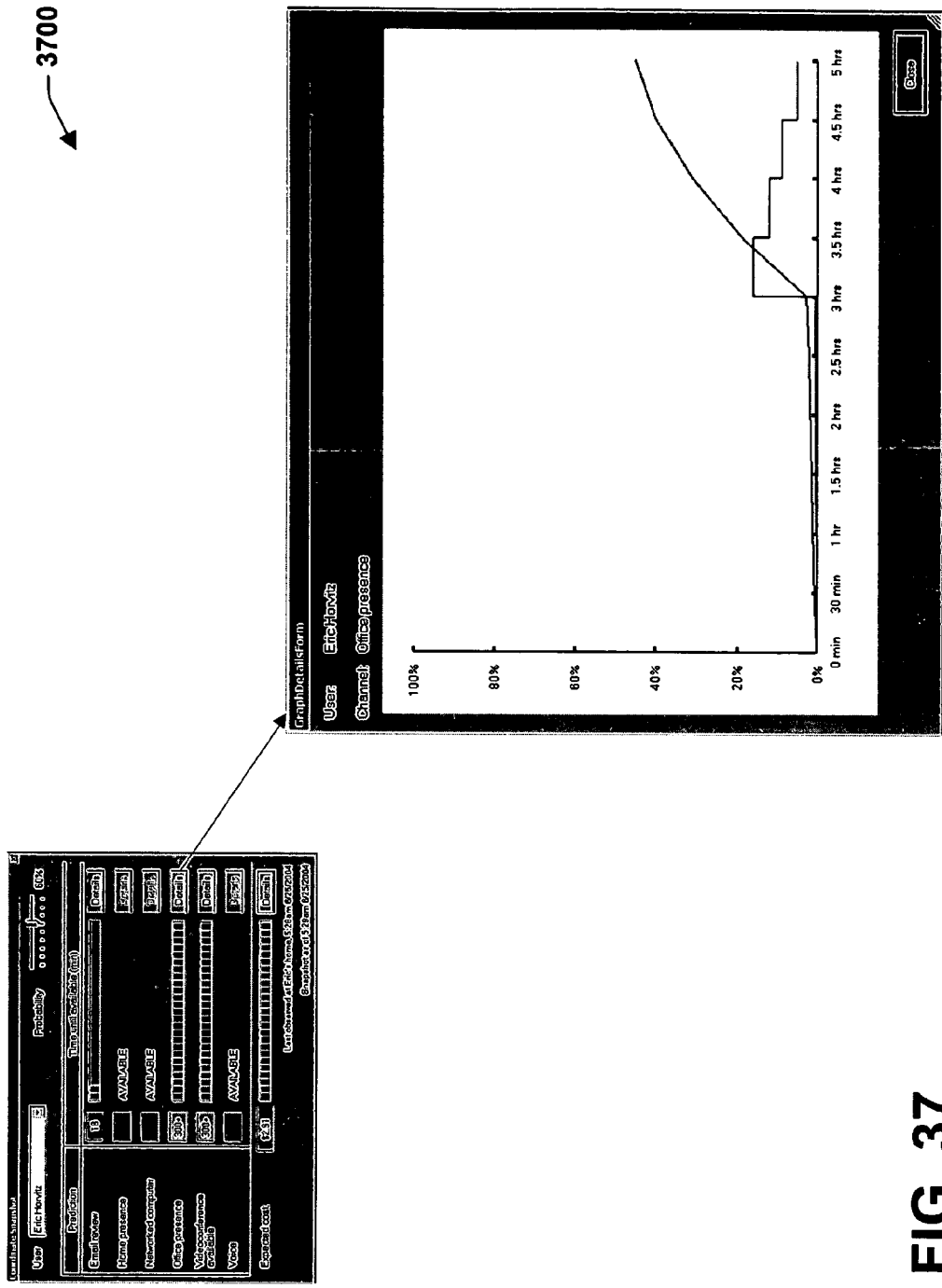

At FIG. 35, a presence palette 3500 for a user as viewed at 5:29 am. The system reports that the user was last observed at Eric's home at 5:28 am, and that he will read email within 18 minutes with a 60% probability, that it will be several hours before the user is in his office, or be in a situation that can support video conferences. However the user is on a networked computer, at home, and can be reached by telephone for a voice conversation. The expected cost is near the maximum indicated by the user at the current time, with a willingness to pay $2.91 to avoid an interruption at the current time. FIGS. 36 and 37 illustrate respectively details on the time until email will be reviewed for the last user and details on the time until available in the user's office at work.

Figure 38:
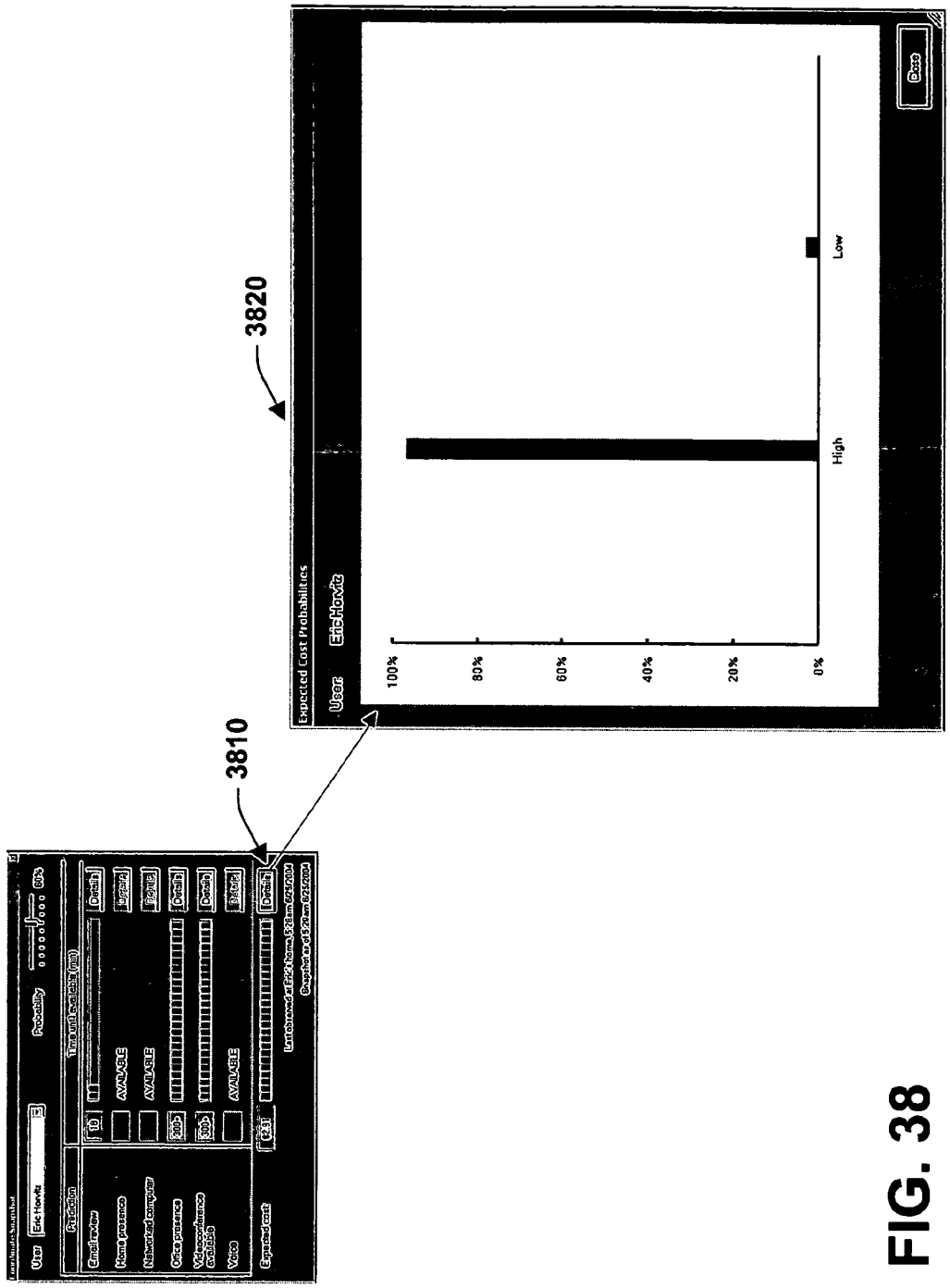

Referring to FIG. 38, by clicking details at 3810 about the expected cost of interruption, the system reveals the probability distribution over high and low workloads being inferred about the user's busy-ness at 3820. The probabilities are used, in conjunction with the costs assessed for each state to compute the expected cost of interruption by different disruption types ($A_j$) (e.g., visual alert, audio alert, audiovisual alert, phone call, etc.) by summing the different costs of interruption for the disruption type $A_j$ for each state of interruptability S, weighted by the likelihood of each state, given observations of evidence $E_1 \ldots E_n$, as follows:

$$\text{Expected cost}(A_j) = \Sigma_i p(S_i|E_1 \ldots E_n)\text{Cost}(S_i, A_j)$$

For models built from binary assessments about whether a user is in a state of high cost of interruption or a state of low (or normal) cost of interruption, and where the system performs inference with the learned statistical model about the likelihood that a user's state of cost of interruption is high versus low, the expected cost is simplified as follows Expected cost$(A_j)$=p(high cost$|E_1 \ldots E_n$)Cost(high, $A_j$)+[1−p(high$|E_1 \ldots E_n$)]Cost(low, $A_j$)

Figure 39:
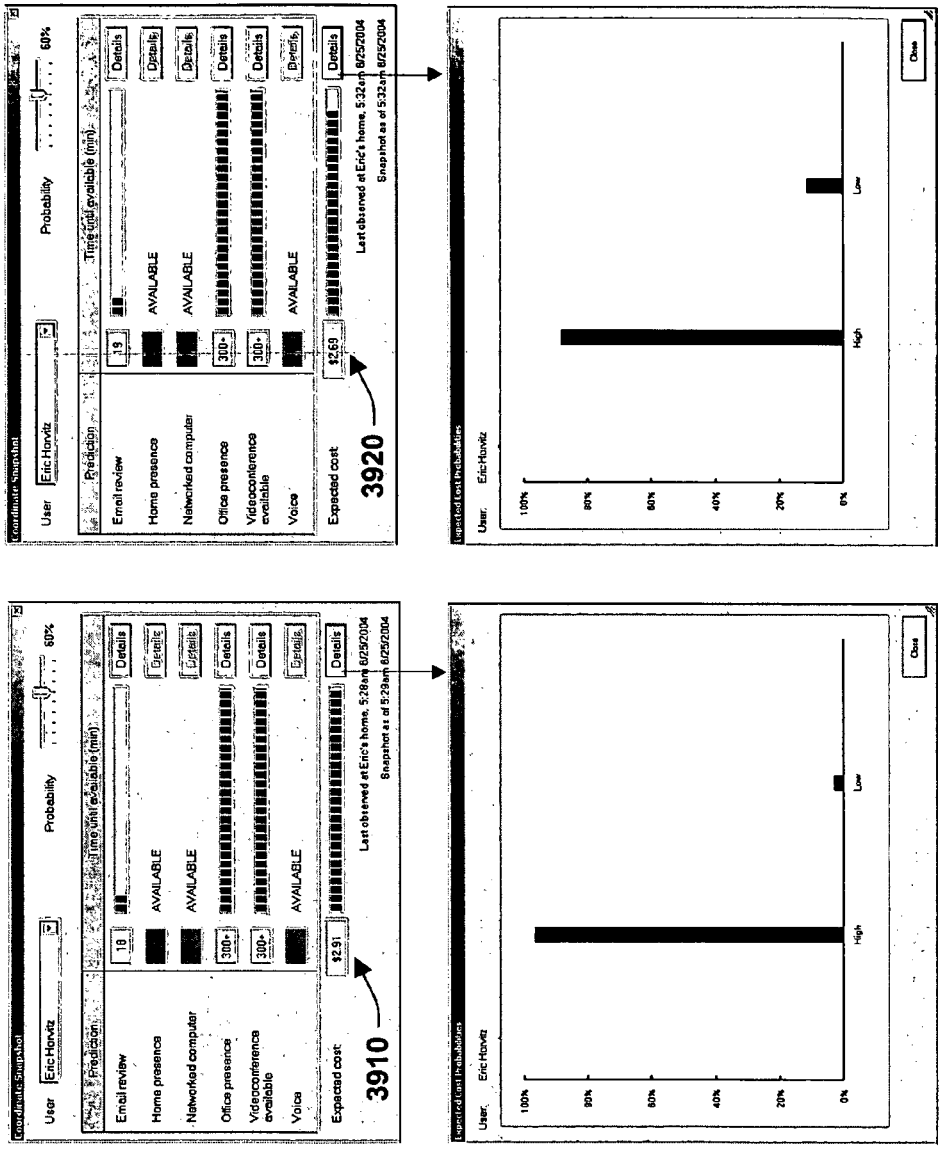

FIG. 39 illustrates a demonstration of time-varying cost of interruption, the cost drops from $2.91 at 3910 to $2.69 at 3920, as the probability of high cost falls at 3920.

Figure 40:
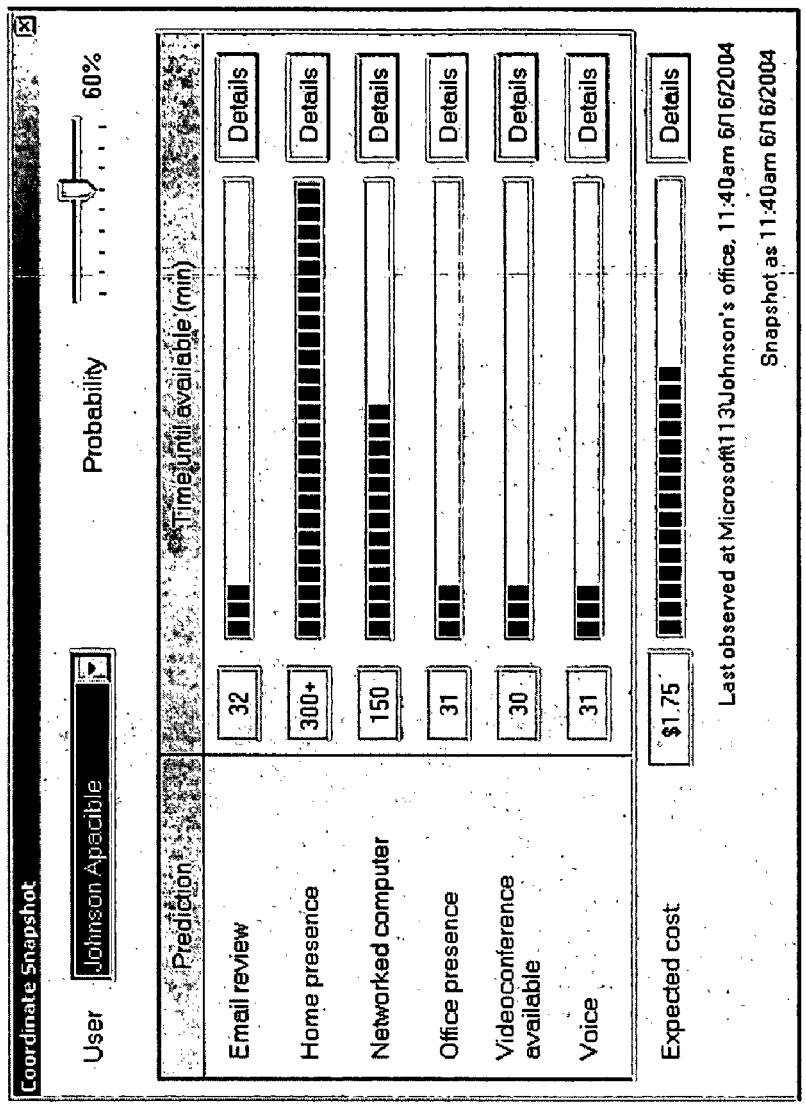
Figure 41:
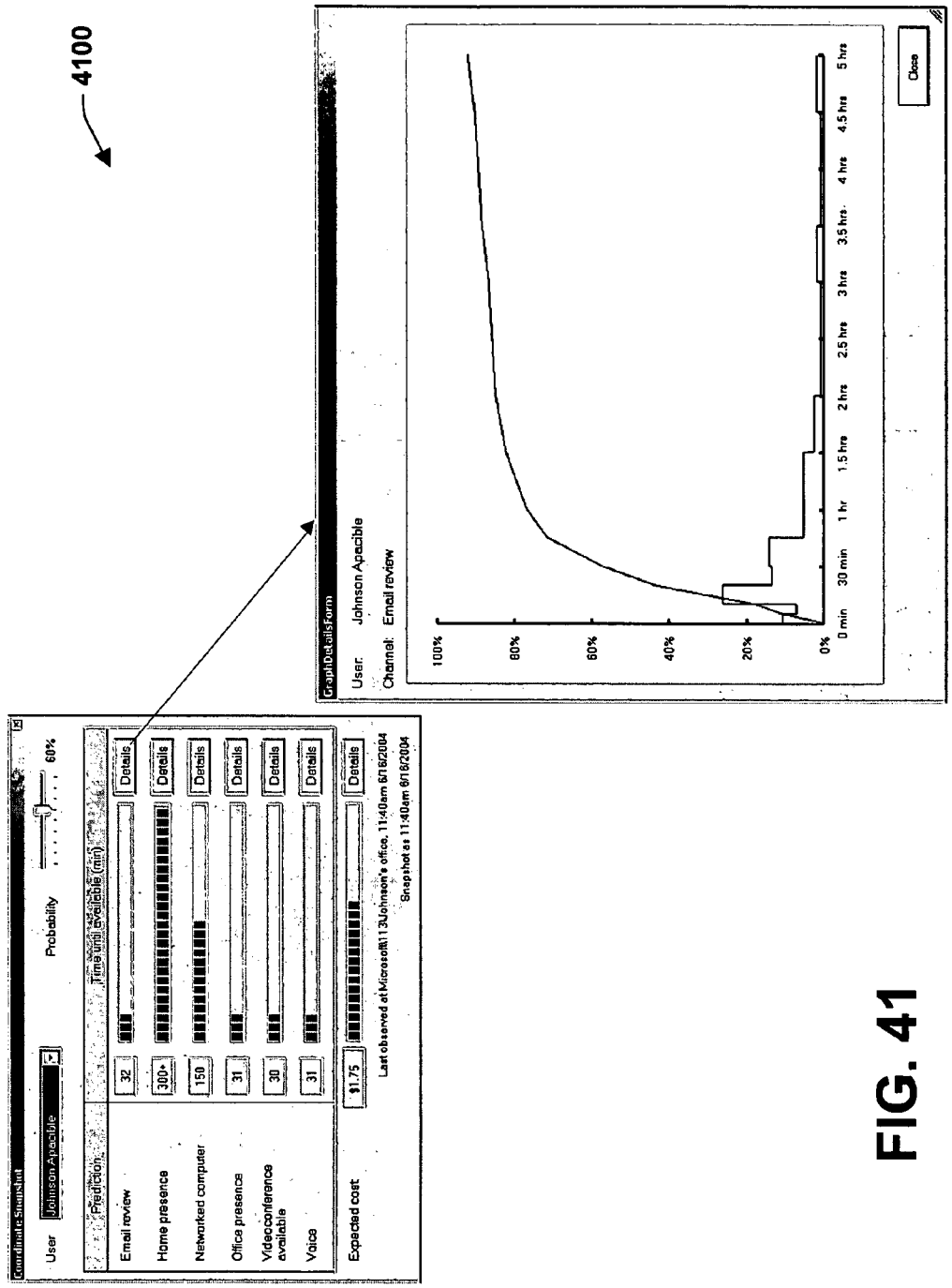
Figure 42:
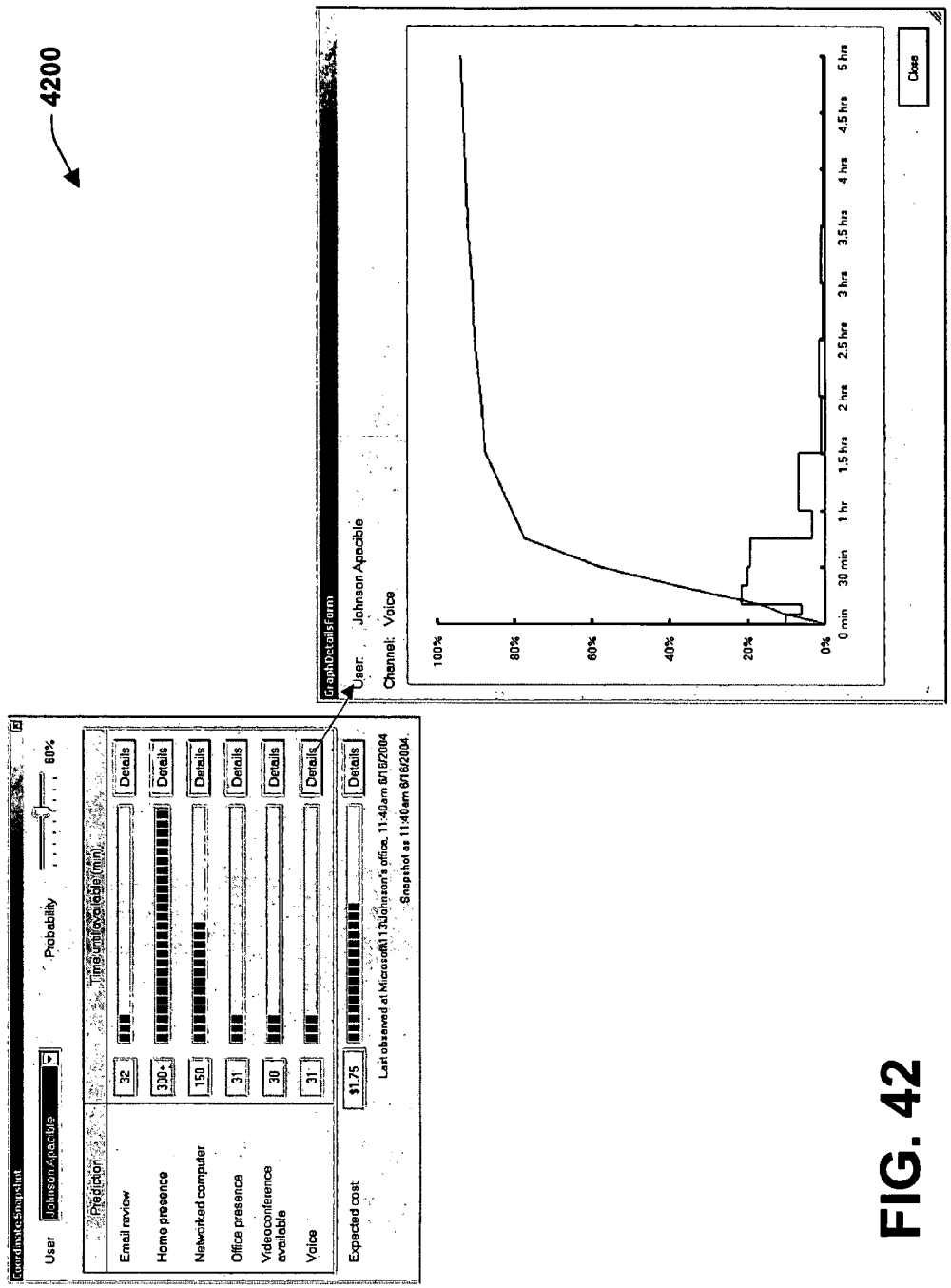
Figure 43:
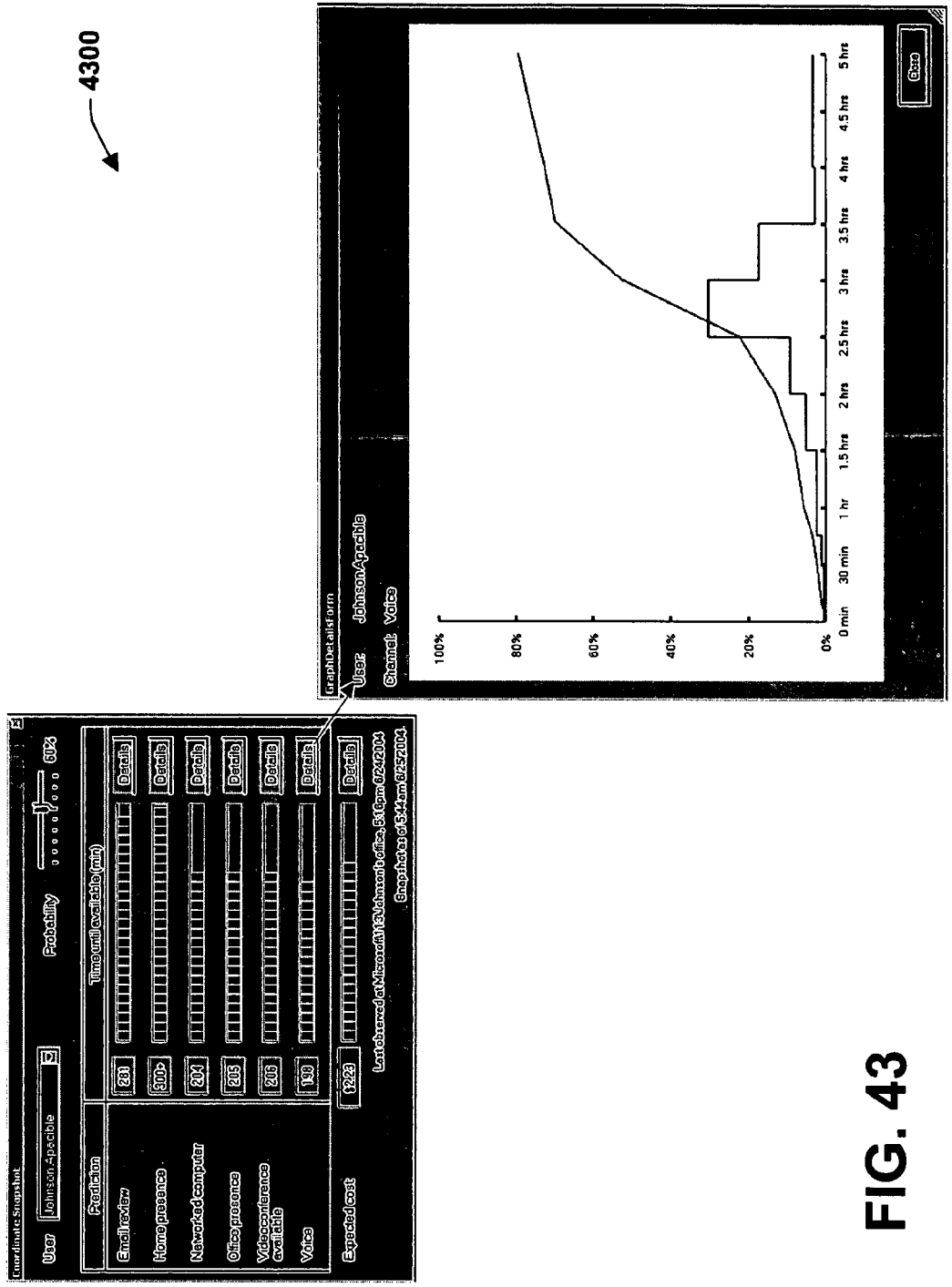

FIG. 40 illustrates another user, observed at 11:40 in the morning. FIG. 41 illustrates details about the time until the email channel will become available—that is, until the user reviews his email, whereas FIG. 42 illustrates time and details until the same user is available for a phone conversation. With respect to FIG. 43, the same user as FIG. 42 is viewed later in the afternoon. New forecasts for times until different channels will have become available, in this case of 60% chance. FIG. 43 also displays details on time until phone will have become available.

Figure 44:
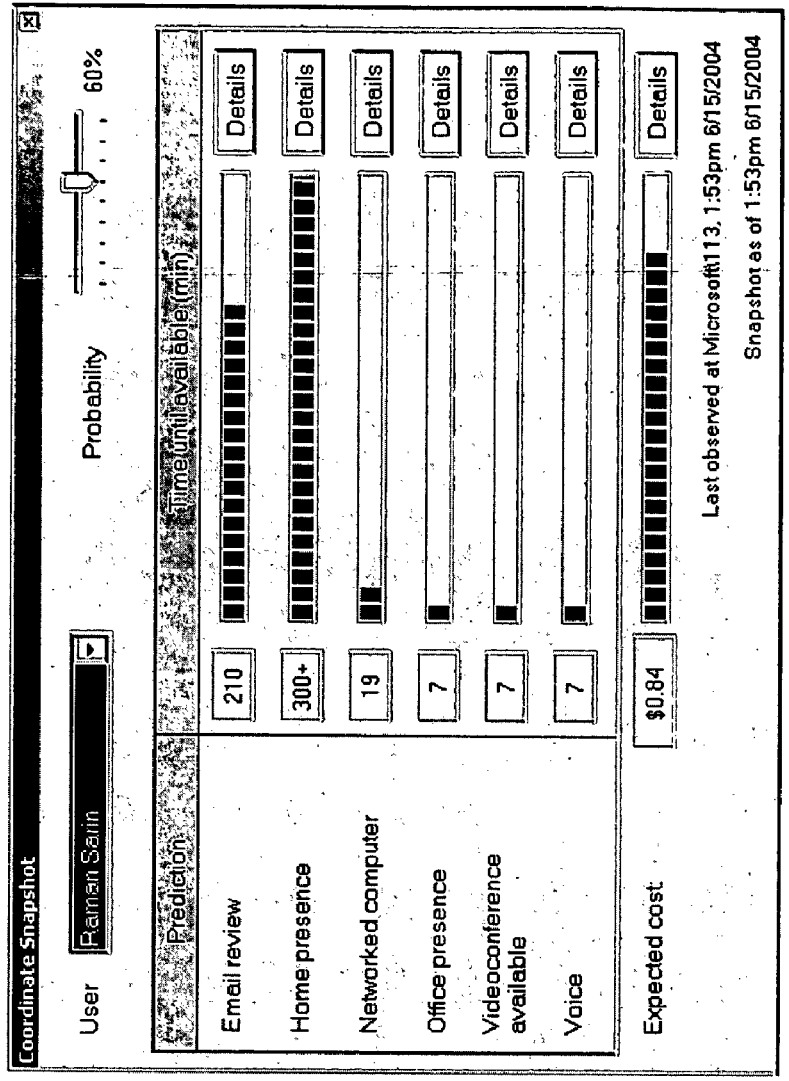
Figure 45:
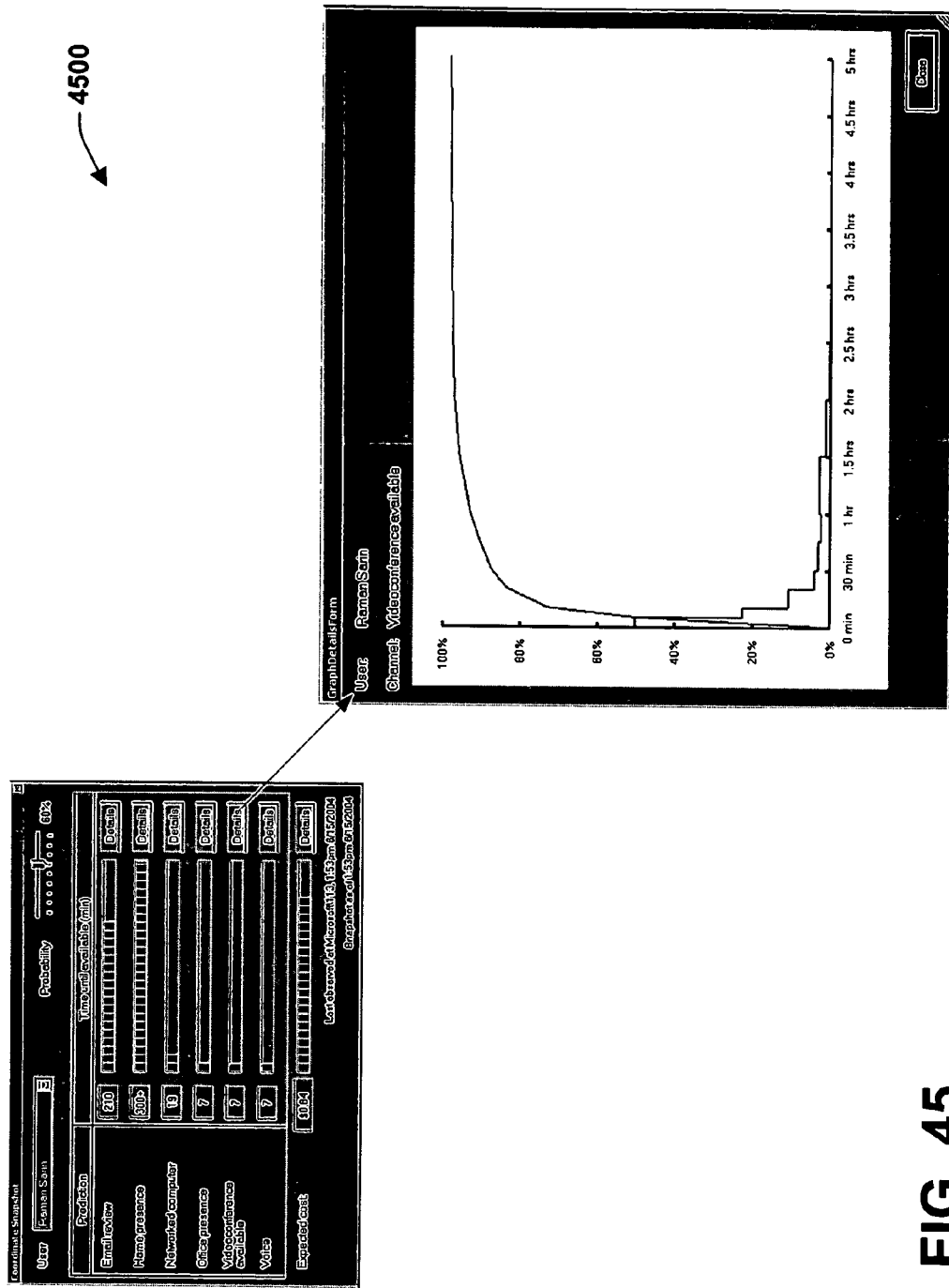
Figure 46:
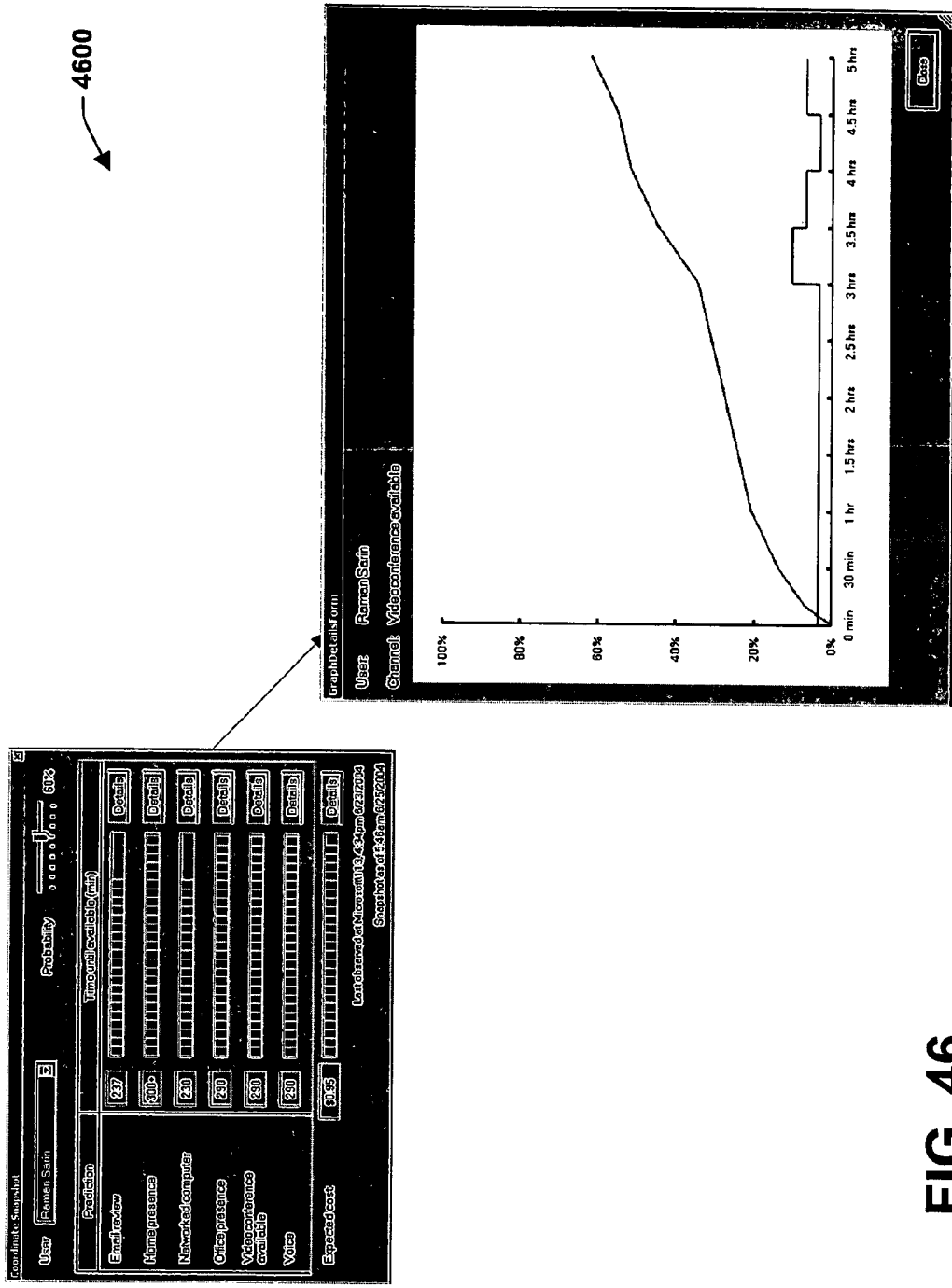

FIG. 44 illustrates yet another user as inspected at 1:53. The user is likely in or near his office, and near his computer. The user can be reached by phone shortly, but will not likely be available via email for several hours. FIG. 45 shows details on the time until this user will be able to accept a videoconference, per availability and hardware required, whereas FIG. 46 shows the same user and inference as FIG. 45 later in the day.

Figure 47:
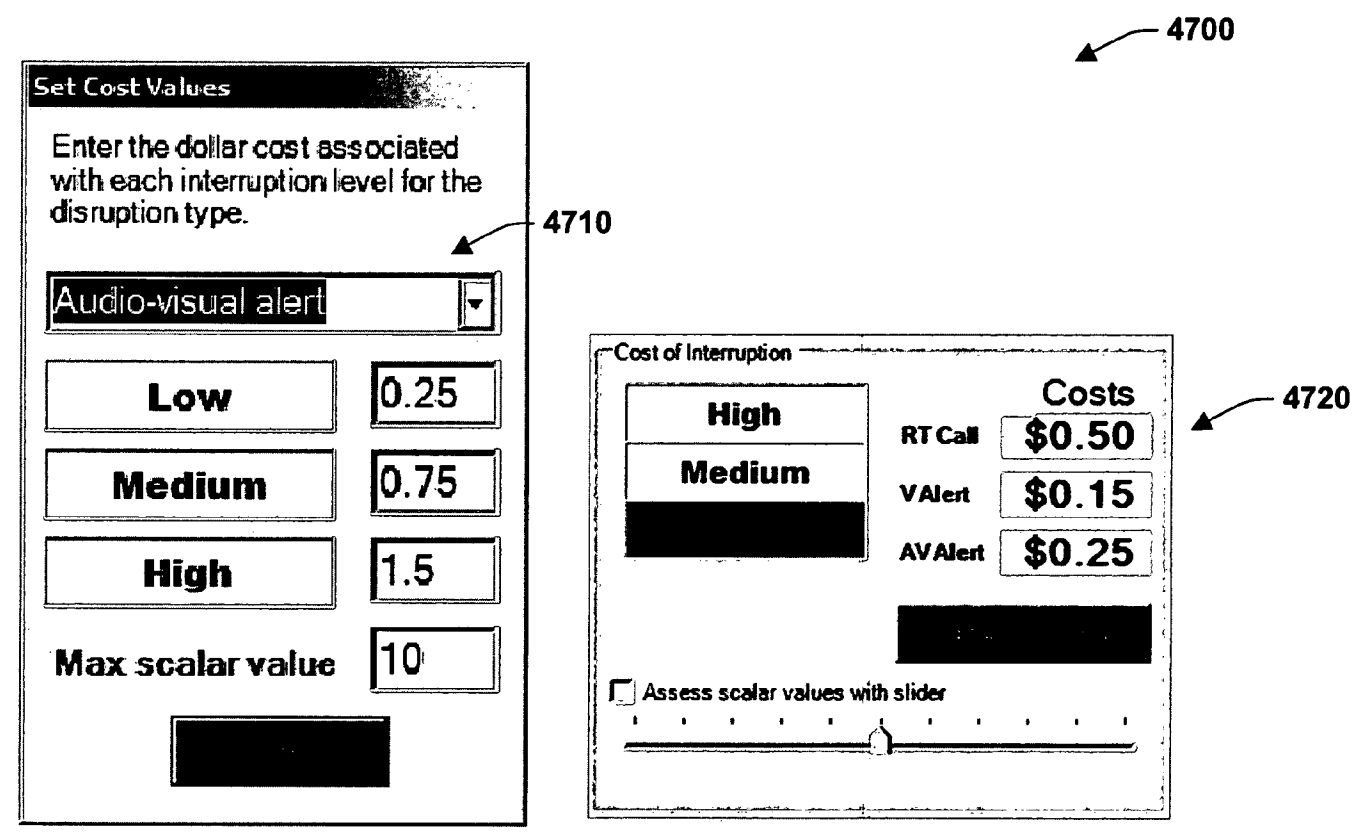

FIG. 47 illustrates an alternative aspect of the present invention. An interface 4700 displays a richer assessment of costs associated with being in a low, medium, and high cost of interruption. For instance, depending on the type of interruption, the interface 4700 can assign different high, medium, and low costs associated with the respective types. For instance at 4710, high, medium and low costs are assigned to an audio-visual alert. At 4720, differing costs are assigned to different types of alerts having differing cost of interruption levels. Thus, the present invention can go beyond consideration of a single cost of interruption, but can consider the cost of interruption associated with different types of interruptions, including a real-time call, a visual alert, and an audio-visual alert (and alert with both visual and audio components), for example. Also, assessments can be provided from the point of view of the alert types at 4710 or by reviewing the costs of different types of alerts at different states of interruptability at 4720.

Figure 48:
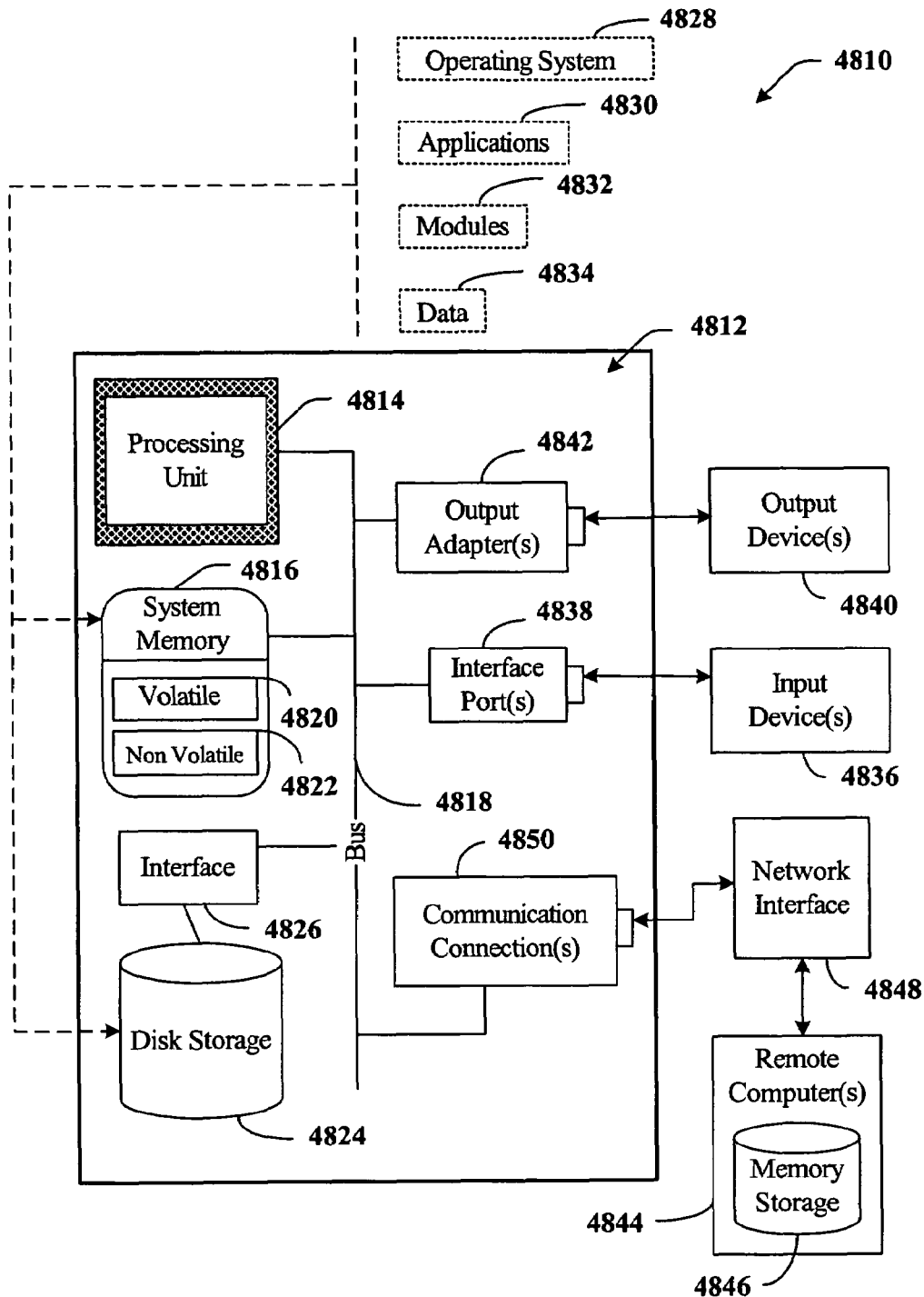
FIG. 48 is a schematic block diagram illustrating a suitable operating environment in accordance with an aspect of the present invention.

With reference to FIG. 48, an exemplary environment 4810 for implementing various aspects of the invention includes a computer 4812. The computer 4812 includes a processing unit 4814, a system memory 4816, and a system bus 4818. The system bus 4818 couples system components including, but not limited to, the system memory 4816 to the processing unit 4814. The processing unit 4814 can be any of various available processors. Dual microprocessors and other multiprocessor architectures also can be employed as the processing unit 4814.

The system bus 4818 can be any of several types of bus structure(s) including the memory bus or memory controller, a peripheral bus or external bus, and/or a local bus using any variety of available bus architectures including, but not limited to 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 4816 includes volatile memory 4820 and nonvolatile memory 4822. The basic input/output system (BIOS), containing the basic routines to transfer information between elements within the computer 4812, such as during start-up, is stored in nonvolatile memory 4822. By way of illustration, and not limitation, nonvolatile memory 4822 can include read only memory (ROM), programmable ROM (PROM), electrically programmable ROM (EPROM), electrically erasable ROM (EEPROM), or flash memory. Volatile memory 4820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 4812 also includes removable/non-removable, volatile/non-volatile computer storage media. FIG. 48 illustrates, for example a disk storage 4824. Disk storage 4824 includes, but is not limited to, devices like a magnetic disk drive, floppy disk drive, tape drive, Jaz drive, Zip drive, LS-100 drive, flash memory card, or memory stick. In addition, disk storage 4824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 4824 to the system bus 4818, a removable or non-removable interface is typically used such as interface 4826.

It is to be appreciated that FIG. 48 describes software that acts as an intermediary between users and the basic computer resources described in suitable operating environment 4810. Such software includes an operating system 4828. Operating system 4828, which can be stored on disk storage 4824, acts to control and allocate resources of the computer system 4812. System applications 4830 take advantage of the management of resources by operating system 4828 through program modules 4832 and program data 4834 stored either in system memory 4816 or on disk storage 4824. It is to be appreciated that the present invention can be implemented with various operating systems or combinations of operating systems.

A user enters commands or information into the computer 4812 through input device(s) 4836. Input devices 4836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 4814 through the system bus 4818 via interface port(s) 4838. Interface port(s) 4838 include, for example, a serial port, a parallel port, a game port, and a universal serial bus (USB). Output device(s) 4840 use some of the same type of ports as input device(s) 4836. Thus, for example, a USB port may be used to provide input to computer 4812, and to output information from computer 4812 to an output device 4840. Output adapter 4842 is provided to illustrate that there are some output devices 4840 like monitors, speakers, and printers, among other output devices 4840, that require special adapters. The output adapters 4842 include, by way of illustration and not limitation, video and sound cards that provide a means of connection between the output device 4840 and the system bus 4818. It should be noted that other devices and/or systems of devices provide both input and output capabilities such as remote computer(s) 4844.

Computer 4812 can operate in a networked environment using logical connections to one or more remote computers, such as remote computer(s) 4844. The remote computer(s) 4844 can be a personal computer, a server, a router, a network PC, a workstation, a microprocessor based appliance, a peer device or other common network node and the like, and typically includes many or all of the elements described relative to computer 4812. For purposes of brevity, only a memory storage device 4846 is illustrated with remote computer(s) 4844. Remote computer(s) 4844 is logically connected to computer 4812 through a network interface 4848 and then physically connected via communication connection 4850. Network interface 4848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 4850 refers to the hardware/software employed to connect the network interface 4848 to the bus 4818. While communication connection 4850 is shown for illustrative clarity inside computer 4812, it can also be external to computer 4812. The hardware/software necessary for connection to the network interface 4848 includes, for exemplary purposes only, internal and external technologies such as, modems including regular telephone grade modems, cable modems and DSL modems, ISDN adapters, and Ethernet cards.

Figure 49:
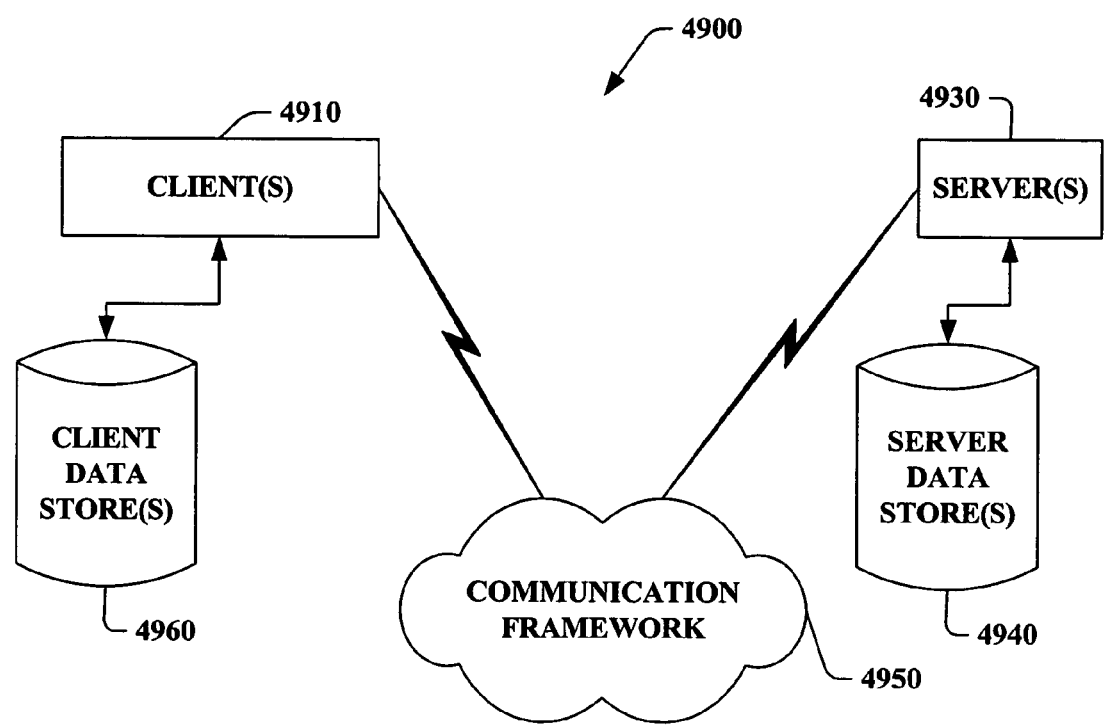
FIG. 49 is a schematic block diagram of a sample-computing environment with which the present invention can interact.

FIG. 49 is a schematic block diagram of a sample-computing environment 4900 with which the present invention can interact. The system 4900 includes one or more client(s) 4910. The client(s) 4910 can be hardware and/or software (e.g., threads, processes, computing devices). The system 4900 also includes one or more server(s) 4930. The server(s) 4930 can also be hardware and/or software (e.g., threads, processes, computing devices). The servers 4930 can house threads to perform transformations by employing the present invention, for example. One possible communication between a client 4910 and a server 4930 may be in the form of a data packet adapted to be transmitted between two or more computer processes. The system 4900 includes a communication framework 4950 that can be employed to facilitate communications between the client(s) 4910 and the server(s) 4930. The client(s) 4910 are operably connected to one or more client data store(s) 4960 that can be employed to store information local to the client(s) 4910. Similarly, the server(s) 4930 are operably connected to one or more server data store(s) 4940 that can be employed to store information local to the servers 4930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising computer-executable components stored on a computer-readable medium that, when executed on one or more processors, facilitates determining a user's presence and availability, comprising:
   a monitor component that assesses a user's pattern of availability by sampling the user's context at random time intervals and recording data relating to the user's present context and state of activity, the recorded data used to refine a predictive model that infers the user's future pattern of availability;
   a learning component that is trained according to the user's pattern of availability to infer an expected time until the user will be available to receive a communication via a particular device, channel, or location; and
   an interface component that interacts with the learning component to provide current and predictive presence information for the user with respect to the device, the channel or the location, the interface component configured to gather data and generate inferences about the availability of different communication channels, provide presence information with respect to different locations, or provide overall availability associated with a current cost of interruption, the gathered data including at least an elapsed time that a software application has been in use by a user.

2. The system of claim 1, the system of claim 1, the interface component includes configuration tools that allow a system to collect data from users in real time and to perform inference regarding a current and future availability of communication channels, a location of the user, a workload or cost of interruption of users.

3. The system of claim 1, the monitor component monitors ambient data and captures user tags on data.

4. The system of claim 3, the monitor component acquires information from users in one-shot assessment settings.

5. The system of claim 1, the interface component provides configuration option for devices having one or more communications channels including a time setting for communications availability.

6. The system of claim 1, the interface component includes options to configure user permissions and setting interruption costs.

7. The system of claim 1, the interface component includes configuration options to configure at least one location within at least one other location.

8. The system of claim 1, further comprising a wireless component or a global positioning component for automatically determining a location.

9. The system of claim 1, the interface component includes options for configuring explicit channels of communication.

10. The system of claim 9, the channels of communications provide distinctions for learning and reasoning to occur for use in coordinating and routing communications and collaboration.

11. The system of claim 9, further comprising a data collection component relating to availabilities of the channels over time and a forecast component that is created on demand of users or agents that use availability forecasts.

12. The system of claim 11, the channels are input to systems in an organization by default, or a base list of standard channels are included that are extended by users or administrators.

13. The system of claim 1, the interface component enables users with privileges to view inferences in terms of high-level summaries as displayed, or via drill down into more specific views on probability distributions.

14. The system of claim 13, the probability distributions are associated with a user-adjustable setting to control the prediction accuracy of the displayed inferences.

15. The system of claim 13, the interface component provides at least one of a maximum likelihood time that channels will become available, an expected cost of interruption in terms of a range for a bar graph between the minimum and maximum cost specified by a user, a current computed expected value, a summary of where the user was last seen as active on a device being monitored by the system, or an age of a current inference.

16. The system of claim 13, further comprising a details selection in order that a user with privileges can view details of an inferred probability distribution.

17. The system of claim 16, the probability distribution includes a base probability distribution and a cumulative probability distribution.

18. The system of claim 13, further comprising an expected cost indication associated with a willingness to pay to avoid an interruption at a current time.

19. The system of claim 13, further comprising a probability distribution over high and low workloads being inferred about a user's busy-ness state.

20. The system of claim 19, further comprising probabilities used in conjunction with costs assessed on a respective state to compute an expected cost of interruption, as $\Sigma_i p(S_i|E_1 \ldots E_n) \text{Cost}(S_i, A_j)$, where $p(S_i|E_1 \ldots E_n)$ are the probabilities of each state of interruptability $S_i$, given observations $E_1 \ldots E_n$ and where $\text{Cost}(S_i, A_j)$ represents the cost associated with being interrupted in the state by alert type $A_j$.

21. A computer-readable storage medium having computer-readable instructions stored thereon that, when executed on one or more processors, implements a schema to facilitate communications and collaboration between entities relating to a user's presence and availability, comprising:
   at least a first data field associated with a device parameter, a channel parameter, and a location parameter; and
   a second data field that binds the parameters in order to facilitate determination of a user's presence and inference of the user's future times of availability to receive a specified type of communication based on user activity information obtained from sampling a user's context at random time intervals, the user activity information includes at least an elapsed time that a previously used application had been used by the user, wherein the data fields are associated with at least one method for communications, the at least one method includes a method to allow for querying about time until use of a device or availability of a channel, a method to allow for querying about user presence: current and expected time of availability, a method to query for a user's cost of interruption (COI), or a method to query for a user's current available channels.

22. The schema of claim 21, the first data field associated with models that include Graph data, Sensing data, Location data, data relating to which application appears on Top, Keyboard data, Remote connection, Meeting data, and communications interface data.

23. The schema of claim 21, further comprising user preference data.

24. The schema of claim 21, further comprising a Users table having a UserId, an Alias, or a UserName field.

25. The schema of claim 21, further comprising a Computers table having a ComputerId, or a ComputerName field.

26. The schema of claim 21, further comprising a Locations table having a LocationId, a UserId, a ParentLocationId, or a LocationName field.

27. The schema of claim 21, further comprising a Devices table having a DeviceId, a UserId, a ComputerId, a LocationId, or a DeviceName field.

28. The schema of claim 21, further comprising a DeviceAvailability table having a DeviceId, a StartTimeTicks, or an EndTimeTicks field.

29. The schema of claim 21, further comprising a Bindings table having a BindingId or a BindingName field.

30. The schema of claim 29, the Bindings table associated with at least one of a user's Presence, Email, Remote Presence, and Presence and Connected status.

31. The schema of claim 21, further comprising a Channels table having a ChannelId, a UserId, a BindingId, or a ChannelName field.

32. The schema of claim 31, the Channels table associated with at least one of a user's IM (Instant Message), Email, Full screen, Video, Audio, and Phone status.

33. The schema of claim 21, further comprising a Device Channels table having a DeviceId, or a ChannelId.

34. The schema of claim 21, further comprising a Wireless Access table having a UserId, a WirelessAccessPoint, or a LocationId field.

35. The schema of claim 21, further comprising an Activity Types table having an ActivityTypeId, or an ActivityTypeName.

36. The schema of claim 35, the Activity type table associated with at least one of a Top application, a Location, an application running, an Audio, a Remote status, a Present status, or a Connected status; and further comprising a time that a currently used application has been used without pause greater than a predetermined number of seconds.

37. The schema of claim 21, further comprising a Computer Activity Log table having a UserId, a ComputerID, an ActivityTypeId, an EndTimeTicks, a StartTimeTicks, or Property field.

38. The schema of claim 21, further comprising a Meetings table having a UserId, a StartTimeTicks, a MeetingId, an Attended Meeting, a Landmark, an Interruptability, an Actual Location, a Subject, a Location, an Organizer, a Required Attendees, an Optional Attendees, a Meeting Sender, a Meeting Resources, an EntryId, a Busy Status, a Label, an Importance, a Response Status, a Recurrence Pattern, a Minutes Duration, a Minutes Reminder, an IsResponseRequested, an IsOnlineMeeting, an IsPatternException a MyName, a MyOfficeLocation, a MyOwnedAliases, a MyAliases, a MyManagersManager, a MyManager, or a MyDirectReports field.

* * * * *